(12) United States Patent
Chopra et al.

(10) Patent No.: US 7,865,857 B1
(45) Date of Patent: Jan. 4, 2011

(54) SYSTEM AND METHOD FOR IMPROVED VISUALIZATION AND DEBUGGING OF CONSTRAINT CIRCUIT OBJECTS

(75) Inventors: Amit Chopra, Uttar Pradesh (IN); Ian Gebbie, Edinburgh (GB); Donald O'Riordan, Sunnyvale, CA (US); Sumit Arora, New Delhi (IN); Jean-Daniel Sonnard, Lausanne (CH)

(73) Assignee: Cadence Design Systems, Inc., San Jose, CA (US)

( * ) Notice: Subject to any disclaimer, the term of this patent is extended or adjusted under 35 U.S.C. 154(b) by 655 days.

(21) Appl. No.: 11/657,659

(22) Filed: Jan. 23, 2007

(51) Int. Cl.
*G06F 17/50* (2006.01)
(52) U.S. Cl. .......................................... 716/11
(58) Field of Classification Search ................. 716/10, 716/11; 345/649–689
See application file for complete search history.

(56) References Cited

U.S. PATENT DOCUMENTS 6,609,236 B2 *  8/2003  Watanabe et al. .............. 716/8
7,418,683 B1 *  8/2008  Sonnard et al. ................ 716/5
2003/0014725 A1 *  1/2003  Sato et al. ...................... 716/10

\* cited by examiner

*Primary Examiner*—Vuthe Siek
*Assistant Examiner*—Aric Lin
(74) *Attorney, Agent, or Firm*—Schwegman, Lundberg & Woessner, P.A.

(57) ABSTRACT

Features are provided for graphically representing constraints on design objects in an Electronic Design Automation tool. A particular constraint on one or more circuit objects is displayed as a highlighted region that extends to each visible circuit object to which the constraint applies. Attributes of the highlighted region, such as density and thickness, may proportionally represent attributes of the constraint, such as a strength or distance specified by the constraint. The highlighted region is superimposed on or around circuit objects. The highlighted region may be a halo, which is a partially transparent region filled with a color. Multiple regions that represent the same type of constraint or relationship are connected by line segments, providing the ability to visualize groups of constrained objects, including groups that span levels of a hierarchical design. Intersecting highlighted regions are blended together using techniques such as alpha blending.

33 Claims, 47 Drawing Sheets

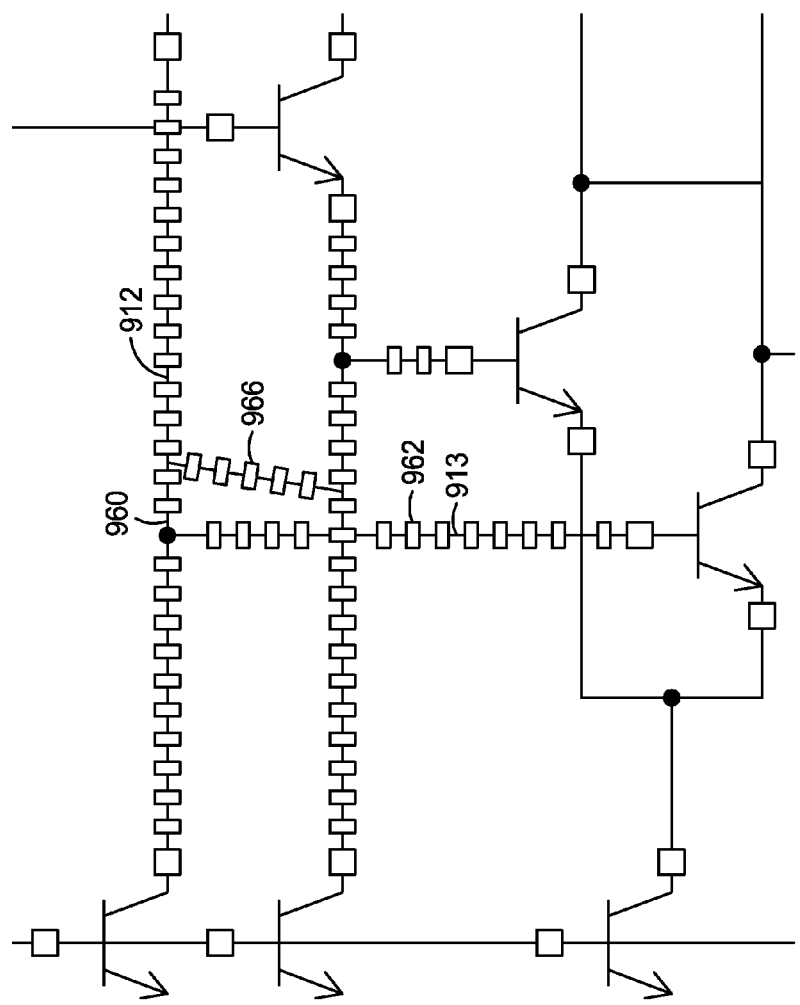

SYSTEM AND METHOD FOR IMPROVED VISUALIZATION AND DEBUGGING OF CONSTRAINT CIRCUIT OBJECTS

BACKGROUND OF THE INVENTION

1. Field of the Invention

The invention relates to the design of electronic circuits and more particularly to methods for visualizing constraints in electronic circuit designs.

2. Description of the Related Art

Electronic Design Automation (EDA) tools allow circuit designers to define constraints on the objects in a circuit design, such as transistors and wires. A constraint is associated with one or more design objects, and may represent relationships among design objects. For example, in the context of the EDA domain, constraints are ordinarily associated with design objects such as devices, pins, terminals, instance terminals, and interconnect wires to represent design parameters for the design objects, and to represent relationships or requirements imposed by the design specification on the objects.

Constraints allow designers to bring consistency into the design flow and achieve structures which are known to the designer to be viable, but which sometimes cannot be directly captured in design parameters, and which are generally beyond the process design rules. For instance, constraints help reduce second-order effects such as parasitics and increase the chance that a design will meet design specifications in a small number of design iterations. A simple constraint example is that of symmetry: when two symmetrically constrained objects are placed in a circuit layout, they generally should be placed symmetrically (about some axis) with respect to each other. Effectively, one object has to be the mirror image of the other. The symmetrical placement greatly increases the chances of these devices operating more identically in a practical integrated circuit manufacturing process that tends to include variations from one device to the next. Symmetrical placement is used to reduce the manufacturing variations, and is one of many constraint relationships that can be used to achieve high yielding, well-performing designs.

With the increasing complexity of circuit design technology, concepts such as constraint-driven, connectivity-driven, and design rule-aware layout have been adopted by EDA tools in both the integrated circuit and printed circuit board domains. This capability allows multiple designers to encode and respect design constraints at various stages of design flow, ensure correct connectivity, and prevent design rule errors automatically. However, smaller geometries, growth in complexity, design rules, and constraints all contribute to a deluge of information—too much to be managed manually.

To address the increasing number of constraints, a mechanism may be used to manage constraints from a central location and distribute them to different tools. However, as constraints may store and depict relationships between design objects, these constraint relationships often are not presented in a manner that makes such relationships readily apparent. In particular, constraints often are portrayed in a manner that does not sufficiently aid the designer in visualizing the relationships imposed. This inability to readily perceive what constraints have been annotated on the design may result in a designer's decision to run through and iterate on the design's physical realization in order to understand the constraint.

Thus, there is a need for an effective visualization mechanism that allows design constraints to be effectively visualized on the design canvas along with the design objects to illustrate relationships between objects or groups of objects so as to facilitate analysis and understanding of the circuit, even when the constraints are not being used to drive automated tools. The design objects should be clearly visible and accurately displayed along with the constraints. Visualization is especially important for analog designs, where sizes, shapes, spacing, and relative positioning of design objects in the circuit layout are especially important.

Prior approaches to visualizing constraints have involved the use of table-based widgets, which display the names of constraints and the names of design objects associated with the constraints in a tree or table format. These have been appreciated by users and are effective in listing constraints and their members. However, often this list is very long and difficult to unravel, and as constraint names are insufficient by themselves, a mental leap is required to locate the corresponding constraint members in the design. In addition, as the constraint relationships are not specially rendered or visualized on the canvas, the table-based widget approach also requires the designers to simultaneously keep track of the location and orientation of the actual design object and its proximity to other objects during interactive design editing. This problem becomes more severe as the number of design constraints increases, making it more difficult for the designer to manually locate the design objects and then keep track of them.

FIG. 1A is an illustrative drawing of circuit design objects highlighted according to a prior highlighting method. In FIG. 1A, an EDA application is displaying two constraints, named Constr_0 and Constr_5, which are being visualized on the design canvas using a prior highlighting method. A Constr_0 text label 150 is displayed in the same color as the design object(s) 154 associated with the constraint Constr_0. Similarly, a Constr_5 text label 168 is displayed in the same color as the design objects 156, 162 associated with the constraint Constr_5. In the prior method, each constrained design object, e.g., diode or transistor, is displayed in a highlight color, which is generally a unique color associated with a single constraint. Temporary objects such as textual annotations and shapes, also drawn in the highlight color, are also used to impart special meaning to the highlighted objects. Highlighting makes it easier to keep track of the constraint design objects, even while interactive design edits are being done. As highlighting allows the use of multiple colors, it is even possible to visualize different types of constraints in different colors.

Unfortunately, there have been shortcomings with prior constraint highlighting techniques. For example, in the above prior method, highlighting occurs on a separate graphics drawing plane over, i.e., above, the drawing plane used for rendering the design objects. Therefore, the prior highlighting approach often causes the actual device shapes to be obscured. If there are additional highlight objects (e.g., textual annotations for constraint and member names) in use to impart special meaning to highlighted design objects, they too obscure the visible design areas. This is often a problem when the constraint has to be visualized for a prolonged duration. Further, an attempt to highlight an object associated with multiple constraints in more than one color generally causes the object to be highlighted with the last applied color, which makes it difficult for the designer to see what other constraints apply to a design object. Moreover, the prior highlighting method typically draws the highlighted object shape in the same width as the un-highlighted object, which is often too narrow to visually stand out. Other limitations include the inability to visualize other forms of interconnection between devices (or group relationships) in a way that does not obscure the spatial and electrical relationships. The prior technique also fails to adequately show relationships that involve objects not displayed in the current view, such as relationships between objects on different levels of the design hierarchy. For example, a relationship that matches a transistor at the top level with a transistor several levels down a schematic hierarchy may coerce logic designers into either unnecessarily flattening a hierarchy or moving a first device which should be placed at a certain level for logical or electrical reasons to some other level so that the first device can be spatially close to a second device on the other level to which its properties are to be closely matched.

With reference to the prior highlighting method of FIG. 1A, if multiple constraints are associated with a single design object, the design object will be displayed in only one of the colors. Therefore, the circuit designer will not see a visual indication that multiple constraints are associated with a single design object. For example, the association of the label Constr_5 with two diodes 156, 162 is represented by changing the color of the diodes 156, 162 to the same color as the constraint Constr_5 text label 168. If the Constr_5 text label 168 is displayed in blue, then the diodes 156, 162 may be displayed in blue to indicate that Constr_5 is associated with the diodes 156,162. If a second constraint ConstrO of a different type than Constr_5 is also associated with the diodes 156,162, then the color of the diodes 156,162 will again be changed to the color associated with Constr_0, replacing the color associated with Constr_5, so that at most one associated constraint is visualized at a time. Note that changing the colors of the design objects interferes with the appearance of the circuit design and may result in loss of information or confusion. If the original, non-highlighted color of the design object conveys visual information about that design object, then replacing the color will result in loss of that visual information.

Other visual aspects of the prior highlighting method typically interfere with the appearance of the circuit design. The displayed design objects may be obscured and modified by, for example, rectangular boxes drawn around the devices to indicate association with a constraint. The constraint names, such as Constr_0, may overlap and obscure portions of the displayed design objects. For example, the constraint name Constr_0 partially overlaps a solder dot 166 near the transistor 154, and the constraint name Constr_5 partially overlaps a wire 152, thereby partially obscuring the wire 152.

Thus, there is a need for improved constraint visualization in the Electronic Design Automation context. The present invention meets the need.

SUMMARY OF THE INVENTION

In general, in a first aspect, the invention features a computer-enabled method to produce a display of a design constraint on a computer screen in an Electronic Design Automation tool. The method includes producing a display of a first highlight feature on the screen in the proximity of a first design object, where the first highlight feature represents the association of a constraint with the first design object, at least a portion of the first design object remains visible while the first highlight feature is displayed, and the visual appearance of the first highlight feature indicates an attribute of the constraint. Embodiments of the invention may include one or more of the following features. The first highlight feature may have a color that indicates the type of the constraint, and the first highlight feature may be transparent. The first highlight feature may have a fill style that indicates the type of the constraint. The fill style may include cross-hatching, randomized stippling, a dashed line style, or a combination thereof. The first highlight feature may be displayed as a transparent overlay on top of the design object. The first highlight feature may be displayed as a transparent underlay under the design object. The first highlight feature may be displayed adjacent to the design object. The first highlight feature may be superimposed on the design object, and may appear as a transparent underlay under the design object. The first highlight feature may surround the design object. The first design object may include a representation of a transistor, wire, resistor, diode, pin, terminal, net, or combination thereof. The first design object may include an active electrical component, a passive electrical component, a geometric shape, a representation of the physical form of an object in a circuit design, or a combination thereof. The first design object may include a cell instance that contains a constrained design object, where the constrained design object is associated with the constraint.

In general, in a second aspect, the invention features a computer-enabled method to produce a display of multiple design constraints on a computer screen in an Electronic Design Automation tool. The method includes generating a highlight feature on the screen in the proximity of a design object, where the highlight feature indicates that multiple constraints apply to the design object.

In general, in a third aspect, the invention features a computer-enabled method to produce a display of multiple design constraints on a computer screen in an Electronic Design Automation tool. The method includes generating a merged highlight feature on the screen in the proximity of a design object, where the merged highlight feature represents a first constraint and a second constraint, the first constraint and the second constraint are associated with the design object, and at least a portion of the design object remains visible while the merged highlight feature is displayed. The method also includes setting the color of the merged highlight feature by blending a first color that indicates the type of the first constraint with a second color that indicates the type of the second constraint. Embodiments of the invention may include one or more of the following features. Blending may include alpha blending the individual colors. The method may include producing a display of a second highlight feature on the screen in the proximity of a second design object, where the second highlight feature represents the association of the constraint with the second design object, at least a portion of the second design object remains visible while the second highlight feature is displayed. The method may also include generating an interconnect halo segment that visually connects the first highlight feature to the second highlight feature, where the visual appearance of the second highlight feature and the visual appearance of the segment indicate the type of the constraint. The second design object may include a representation of a transistor, wire, resistor, diode, pin, terminal, net, or a combination thereof. The first design object may include an active electrical component, a passive electrical component, a geometric shape, a representation of the physical form of an object in a circuit design, or a combination thereof.

The second design object may include a cell instance that contains a constrained design object, wherein the constrained design object is associated with the constraint. A first end of the segment may connect to a first interconnection point of the first design object, and a second end of the segment may connect to a second interconnection point of the second design object. The segment may include a horizontal line, a vertical line, a diagonal line, or a combination thereof. The first highlight feature may be generated in response to selection of the constraint from a list of constraints presented in a constraint list user interface component of the Electronic Design Automation tool. The thickness of the first highlight feature may be proportional to a strength attribute of the constraint. The fill density of the first highlight feature may be inversely proportional to a strength attribute of the constraint. The method may include, if the constraint is associated with a second design object, wherein the second design object is on a higher level of the design hierarchy than the first design object, producing a display of an up-connector on the screen, where the up-connector represents an association with the higher level of the design hierarchy, displaying the name of the constraint in association with the up-connector; and generating an interconnect halo segment that visually connects the first highlight feature to the up-connector, where the visual appearance of the up-connector and the visual appearance of the segment indicate the type of the constraint. The method may also include, if the up-connector is selected by a user, displaying the higher design hierarchy level.

The method may also include, if the constraint is associated with a second design object, and the second design object is on a lower level of the design hierarchy than the first design object: producing a display of a second highlight feature on the screen in the proximity of an instance that contains the second design object, where the second highlight feature represents the association of the constraint with the second design object, and at least a portion of the instance remains visible while the second highlight feature is displayed. The method may also include generating an interconnect halo segment that visually connects the first highlight feature to the second highlight feature, where the visual appearance of the second highlight feature and the visual appearance of the segment indicate the type of the constraint.

In general, in a fourth aspect, the invention features a computer-enabled method of generating an interconnect halo segment to join design objects in an Electronic Design Automation tool. The method includes determining a first set of interconnect points for a first design object; determining a second set of interconnect points for a second design object; generating line segments between each point in the first set and each point in the second set. The method further includes, if a first line segment between two points is the shortest line segment between those points, and the line segment is horizontal or vertical, choosing the first segment; otherwise, if a second segment between two points is the shortest line segment between those points, and the second segment does not pass over a pin, choosing the second segment; otherwise, choosing a third segment between two points, wherein the third segment is the shortest line segment between the first design object and the second design object; and drawing the chosen line segment.

In general, in a fifth aspect, the invention features a computer-enabled method of generating highlight features and interconnect halo segments to represent a relationship between design objects in an Electronic Design Automation tool. The method includes acquiring an input list of design objects; computing a bounding box of objects in the input list, generating a first list of objects fully inside a first portion of the box, wherein the first portion is separated from a second portion of the box by a bisector line that bisects the bounding box, generating a second list of objects fully inside the second portion of the box, generating a split list of objects, wherein the split list includes objects intersected by the bisector line, generating highlighted interconnect halo segments between objects in the split list, setting a first optimum object to an object fully inside the first portion of the box, setting a second optimum object to an object fully inside the second portion of the box; if the split list is empty, generating an interconnect halo segment to join the first optimum object to the second optimum object; if the split list is not empty, generating an interconnect halo segment to join the first optimum object with a nearest split object in the split list, where the nearest split object is the member of the split list closest to the first optimum object. The method also includes recursively invoking the method on the first list; and recursively invoking the method on the second list.

Embodiments of the invention may include one or more of the following features. If the length of the box is greater than the width of the box, bisecting the box vertically; otherwise, bisecting the box horizontally, to produce a bisector line. Generating a split list may include sorting the split list so that the objects in the split list are ordered based upon their positions in the split direction. Generating highlighted interconnect halo segments may include, for each split object in the split list, generating an interconnect halo segment between the split object and a nearest neighbor object, where the nearest neighbor object is the split list member closest to the split object. The method may further include highlighting each generated interconnect halo segment, and highlighting each object in the split list.

In general, in a sixth aspect, the invention features a system for producing a display of a design constraint on a computer screen in an Electronic Design automation tool. The system includes a first highlight producer to produce a display of a first highlight feature on the screen in the proximity of a first design object, where the first highlight feature represents the association of a constraint with the first design object, at least a portion of the first design object remains visible while the first highlight feature is displayed, and the visual appearance of the first highlight feature indicates an attribute of the constraint.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 27E is an illustrative drawing of a halo formed by a dashed line in a schematic diagram in accordance with some embodiments of the invention.

DETAILED DESCRIPTION OF THE EMBODIMENTS

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
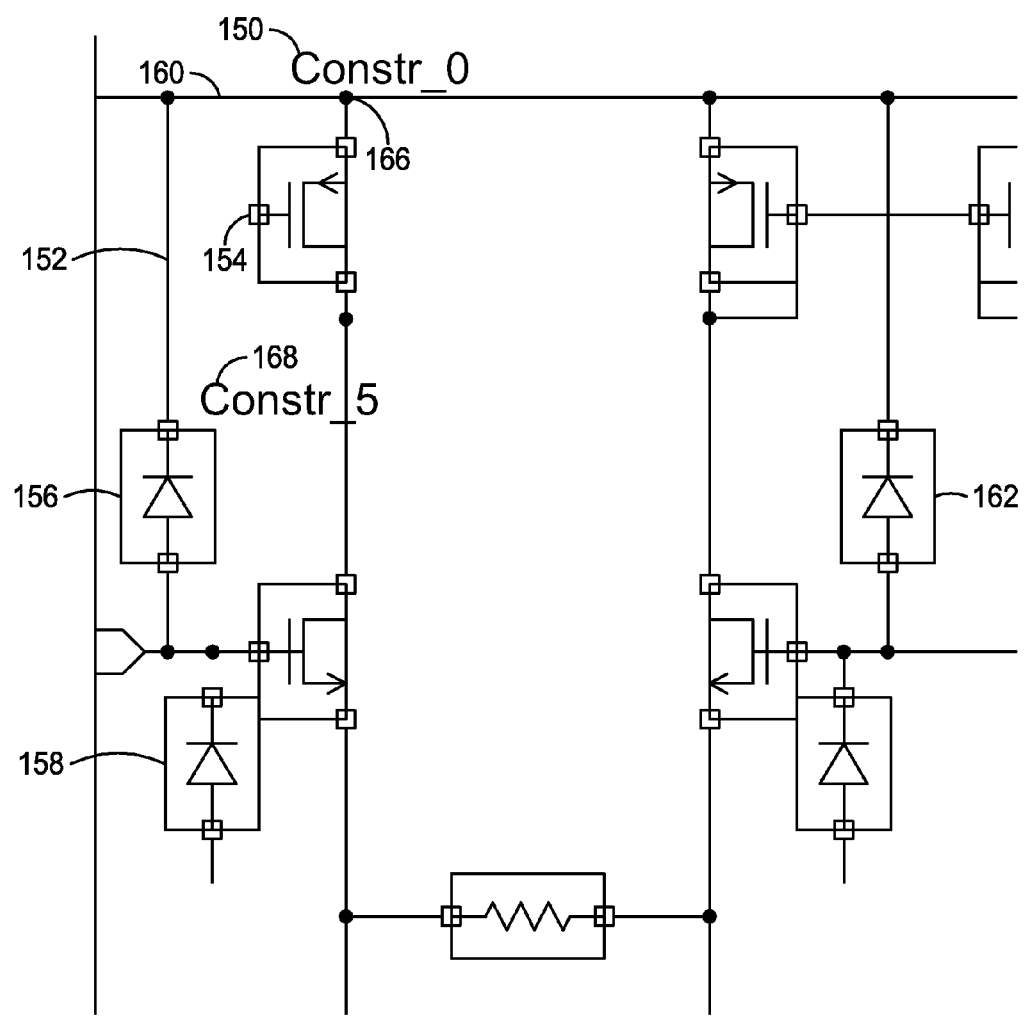
FIG. 1A is an illustrative drawing of circuit design objects highlighted according to a prior art highlighting method.
Figure 1B:
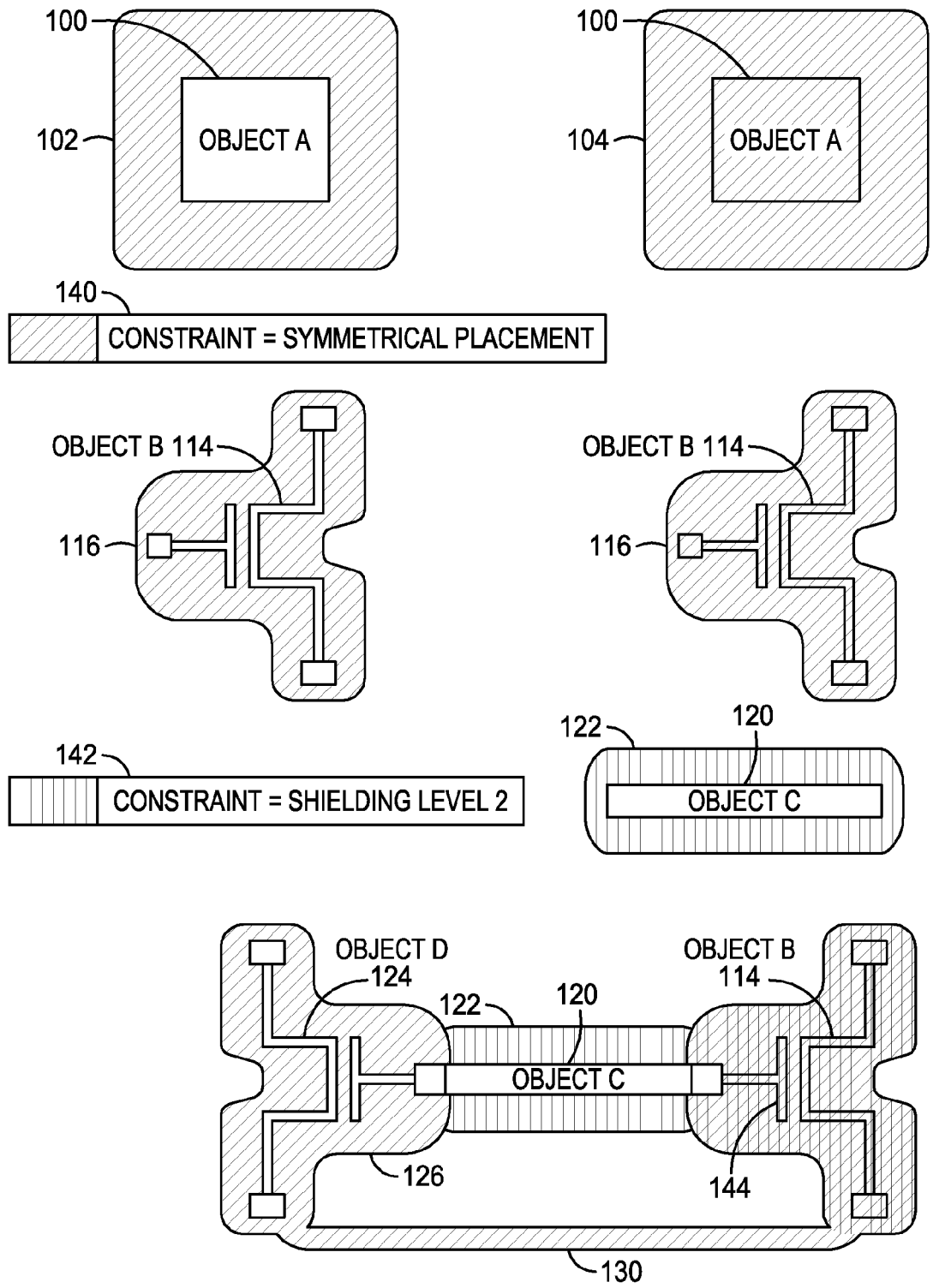
FIG. 1B is an illustrative drawing that uses fill styles to illustrate transparent halos for visualizing constraints in accordance with some embodiments of the invention.

FIG. 1B is an illustrative drawing of highlight features for visualizing constraints in accordance with some embodiments of the invention. Constraint visualization techniques allow a circuit designer to graphically visualize design constraints on a design canvas for the purpose of illustrating relationships between objects or groups of objects, and to simultaneously help the designer to analyze and understand the circuit regardless of whether the constraints are being used to drive automated tools.

In FIG. 1B, the color or shading of a highlight feature 102 may indicate a particular type of design constraint that applies to, i.e., is associated with, a design object 102. The highlight feature 102, which is displayed on a computer screen by an EDA tool software program, helps the designer to quickly comprehend the types of design constraints that apply to particular design objects by looking at the circuit design using the EDA tool. A highlight feature is ordinarily a shape 102 that highlights a design object 100 to indicate that the design object is associated with a particular design constraint 140. Design constraints typically include attributes, and establish an association between those attributes and one or more design objects. An attribute is typically a data value provided by a designer to specify information such as fabrication process parameters and layout hints for use in fabricating the circuit.

In this example, the constraint 140 is a symmetrical placement constraint, which specifies that the associated design objects are to be placed symmetrically in the placement phase of generating the circuit layout. A diagonal line fill style is associated with the constraint 140 in FIG. 1B. Note that the constraints 140,142 shown in FIG. 1B are displayed for illustrative purposes and are not necessarily shown on the canvas of the EDA tool. However, the designer knows through some user interface feature that design objects that have a diagonal line highlight feature, such as the feature 102, are subject to the symmetrical placement constraint.

In one aspect, the highlight feature 102 is displayed in the proximity of the design object 100. The term proximity specifies that the highlight feature 102 is displayed near or at the location of the design object 100. In one aspect, the term proximity means that the highlight feature 102 overlaps the design object 100 on the screen, or that the highlight feature 102 overlaps a bounding box defined by the outermost points of the design object 100. In another aspect, proximity means that the highlight feature appears to be adjacent to the design object, or that the highlight feature is superimposed on the design object.

The visual appearance of the highlight feature 102, e.g., the color or fill pattern, represents the particular type of design constraint with which the design object 100 is associated. FIG. 1B shows diagonal fill lines to illustrate the color or fill pattern. On a computer screen, colors may be used to represent the design constraints, so that a first constraint would be represented by a corresponding color, such as a green color. The color may be partially or fully transparent. Transparency and alpha blending are two separate attributes, both achieved by using image processing techniques. Transparency is a see-through effect used in displaying images such as halos, as described below. Transparency allows underlying design objects to be clearly visible.

Displaying the highlight feature 102 in a partially transparent color allows the highlight feature be displayed without obscuring other design objects. This display technique is known as an overlay. In one aspect, the highlight feature 102 is displayed as a halo. Halos are drawn on a drawing plane which is above the drawing plane on which design objects are rendered. The halo color is alpha blended, at different places, with the different colors of the design objects. Partial transparency causes the underlying objects to be made partially visible. Displaying the highlight feature 102 in a fully transparent color allows the highlight feature be displayed without obscuring other design objects. This display technique is known as an underlay. The halos are either drawn on a drawing plane that is below the normal drawing plane on which design objects are rendered or, more preferably, the halos are drawn on a drawing plane which is above the normal drawing plane on which design objects are rendered, but made to appear as if they drawn on a drawing plane that is below the normal drawing plane on which design objects are rendered. Generating an underlay is computationally more expensive as it requires use of expensive image processing operation, but is still preferred as it avoids the need for a separate drawing plane, which is even more expensive, to render underlay.

Transparency allows the design object 100, and other design objects, such as wires connected to the design object 100, to remain substantially visible in the presence of the highlight feature 102. The highlight feature 102 may overlap some design objects, in which case the overlapped design objects will be displayed in a slightly different color that has been filtered by the transparent highlight feature 102. Transparency allows the highlight feature 102 to be superimposed on the design object 100 so that aspects of both the highlight feature 102 and the design object 100 are visible. Transparency is described in more detail below.

A highlight feature 102 that is displayed in a particular color, where the color is partially transparent, is referred to herein as a transparent halo, or simply a halo. When more than one halo is displayed in the same location, the colors of the halos are blended together using a blending technique such as alpha blending. As is known to those skilled in the art of computer graphics, alpha blending is a combination of two colors to produce a third color that appears to be a transparent rendition of one of the original colors superimposed on the other original color.

Alpha blending is used to combine two different halos to produce a third halo that appears to be a combination of the first two. Alpha blending may also be used to blend the halo or a combination of blended halos with design objects on the circuit design, such as wires or transistors, to produce a resulting image in which the halo appears to be partially transparent and overlaid on the design objects. Alternatively, rendering the halo image as an underlay (i.e., on a graphics plane below the design object) or as an overlay (i.e., on a graphics plane above the design object) may also be employed. With the alpha-blending technique, the design object remains clearly visible in the presence of the halo, and the color of the original design object does not change. Since the color of the design object also conveys certain visual semantics to the user, the preferred embodiment uses this latter overlay or underlay approach with respect to design objects. Halos that overlap each other are alpha-blended with each other, and halos that overlap design objects are overlaid on or underlaid below the design objects.

Alpha blending combines two colors C1 and C2 to produce a blended color C3, where C1, C2, and C3 represent a single red, green, or blue value of a red, green, blue combination that defines a color. C1, C2, and C3 may also be vectors with red, green, and blue components. A factor named "alpha" is used to scale each of the colors. As the value of alpha varies from 0 to 1, the blended color ranges from an opaque C1 through a blend of C1 and C2, to an opaque C2. C1 appears to be a background color, and C1 appears to be a foreground color blended onto C2. For example, in some embodiments, the value of the blended color C3 is given by the following formula:

$$C3=C2*alpha+C1*(1-alpha)$$

Because of their transparency, which may be implemented using underlay, overlay, or alpha blending techniques, halos may be superimposed on the design objects without obscuring the design objects or otherwise hiding design information. Fill patterns such as the diagonal fill pattern shown in FIG. 1B are used herein for illustrative purposes to represent colors of highlight features. However, such fill patterns, e.g., lines, dashes, or stipples, may also be displayed on the computer screen to indicate design constraints in place of or in addition to colors.

The design object 100 may be associated with more than one design constraint, in which case a highlight feature for each constraint is displayed in the proximity of the design object 100. Such multiple highlight features are typically displayed in the same location and superimposed so that the presence of all features can be discerned by the user.

To achieve transparency, the highlight feature 102 may be displayed as an underlay or an overlay of the design object. In FIG. 1B, the highlight feature 102 is displayed as an underlay under the design object, i.e., on a graphics plane below the design object 100, so that the highlight feature 102 appears to be behind the design object 100 and does not obscure or hide, portions of the design object 100 that the highlight feature 102 overlaps. Underlay display is suitable for schematic displays, since the design objects are typically displayed using narrow lines that appear to be one-dimensional. The highlight feature 104 is displayed as an overlay above the design object 100, i.e., on a graphics plane above the design object, so that the highlight feature 104 appears to be in front of the design object 100, and so that the design object 100 appears to be less prominent than the highlight feature 104. Overlay display is suitable for layout displays, since the design objects are generally two-dimensional shapes, i.e., relatively wide rectangles or polygons.

The thin lines of the design objects 100 in a schematic view may be drawn directly on top of the thicker halos 104, and both the lines and the halos will be clearly visible. That visual effect may be achieved by drawing the halos as underlays on a drawing plane below the schematic objects. The thin lines of the schematic objects are not obscured because the lines are drawn on top of the halos. Conversely, for layout views, the design objects are typically displayed as rectangles or polygons, and the halo images are displayed using thin lines. The halo images in layout diagrams are typically displayed as thin lines that correspond to the outline or perimeter of the rectangles that form the design objects in the layout view. In the layout view, the halos are drawn as an overlay, i.e., thin lines-that form the halo are drawn on top of the wider design object rectangles. Consequently, both the halos and the design objects are, ordinarily, clearly visible. Both schematic objects and layout objects can be clearly seen in the presence of halos, and the original colors of the schematic and design objects are preserved when the halos are displayed.

A further technique to achieve transparency between highlight features 104 and design objects 100 would be to alpha blend the resultant halo color of the highlight feature 104 with the color of the design object 100 and display the overlapping regions in the blended color. However this technique is not chosen in the preferred embodiment because it may change the perceived color, and therefore possibly the perceived semantics, of the design object 100.

The shape of the highlight feature 102 is typically an outline around the corresponding design object, where the outline has rounded corners. For example, the highlight feature 102 is a square with rounded edges, which is an outline of the square highlight feature 102. A highlight feature 116 for a transistor object 114 is shaped as an outline of the transistor object 116. The highlight feature 116 visually indicates that the symmetrical placement constraint applies to the transistor object 114. Note that highlight features appear as constraints are applied to displayed design objects by the user of the EDA tool, and disappear as constraints are removed from design objects. The highlight feature 116 is displayed as an underlay, while a highlight feature 118 is displayed as an overlay superimposed upon the design object 114.

Another example of a highlight feature being displayed as an outline of the shape of a design object is shown with respect to a wire design object 120. The wire object 120 is shown with a highlight feature 122 with a vertical line fill style, which indicates that a shielding level 2 constraint 142 applies to the wire object 120. Note that the value 2 is an example of an attribute value of the constraint 142, and shielding is the type of the constraint 142.

In one example, when a design object is associated with multiple constraints, the highlight features for the constraints are displayed in the same location, so that multiple highlight features are superimposed. In FIG. 1B, this superimposed highlighting can be seen on a transistor object 114, which is associated with two constraints, the symmetrical placement constraint 140 and the shielding level 2 constraint 142. The highlighting feature 144 for the transistor object 114 is displayed by superimposing vertical line fill style for the constraint 142 on the diagonal line fill style for the constraint 140. Similarly, for color halos, the color associated with the constraint 142 would be blended with the color associated with the constraint 140 using a technique such as alpha blending. For example, if the color associated with the constraint 142 were blue, and the color associated with the constraint 140 were green, the color of the highlight feature 114 would be a shade of purple. Any number of colors can be blended together, so any number of overlapping constraints can be displayed as a blended color.

FIG. 1B also shows an example of highlight features displayed for a constraint associated with multiple design objects. In general, a constraint can be associated with one or more design objects. In this example, the symmetrical placement constraint 140 is associated with the transistor object 114 and another transistor object 124. When multiple design objects are associated with a constraint, a highlight feature is displayed in the proximity of each design object, and an interconnect halo segment 130 is generated to visually connect the individual highlight features or halos. That is, the interconnect halo segment 130 connects the halos 126, 144 around the design objects 124, 114. In one aspect, the segment 130 is a straight line segment, and the ends of the segment appear to seamlessly join the halos 126, 144. In this example, the highlight features 126, 144 are centered on the design objects 124, 114, respectively, to which the constraints represented by the highlight features apply. The shapes of the highlight features 126, 122, 144 are outlines of the design objects 124, 120, and 114, respectively. The objects 114,124 are displayed with the diagonal fill style that corresponds to the symmetrical placement constraint 140, and an interconnect halo segment 130 has been generated to connect the objects 114,124. The interconnect halo segment 130 is also filled with the diagonal fill style that corresponds to the common constraint of the highlight features being connected. In another aspect, the design objects associated with a particular constraint may be highlighted using fill patterns that correspond to the constraint, such as cross hatching, stippling, or the like. Such highlighting patterns may be superimposed upon one another to show that multiple constraints apply to a single design object.

An interconnect halo segment 130 indicates that the two design objects 124, 114 at either end of the segment are associated with the same constraint. An interconnect halo segment 130 is ordinarily not an electrical connection or other actual circuit design object. When a constraint applies to multiple design objects 124, 114, highlight features or halos 126, 144 are produced and displayed around, i.e., overlapping or in the proximity of, each of those design objects. An interconnect halo segment 130 is then drawn between the highlight features 126, 144 to indicate that the design objects 124, 114 are associated with the same constraint. The interconnect halo segment 130 is drawn in the same style as the highlight features or halos. Therefore, a single larger halo appears to cover each of the design objects 124 and the interconnect halo segment 130. A designer can clearly see the design objects 124, 114 that are associated with a particular constraint because the larger halo covers the design objects 124, 114. Furthermore, if some of the design objects associated with the constraint are not displayed on the screen, e.g., because the circuit is too large to fit in the display window, or because some of the objects are located on different levels of the design hierarchy, the interconnect halo segments indicate that the unseen design objects are present because the segment connection leads from the visible design objects toward the unseen design objects. The designer can follow the segment connection to find the unseen objects, e.g., by scrolling, panning, or zooming the window, or by switching the display to the hierarchy level on which an unseen object is located. Although halos represent constraints in this example, other types of relationships could be visualized using halos in a similar manner.

In FIG. 1B, although the design object D 124 and the design object B 114 are connected by a design object C 120, and the halo 122 connects those design objects 124, 114, the object C 120 is not associated with the same constraint (symmetrical placement) as object D 124, so a separate interconnect halo segment 130 is drawn between object D 124 and object B 114. The halo segment 130 indicates that those objects 124, 114 are both associated with the same symmetrical placement design constraint, as illustrated by the use of the same (diagonal) shading pattern for objects 124, 114, and 130.

In one aspect, for highlight regions that are displayed as transparent halos, the halo outline is generated by applying two two-dimensional transformations in order on the image of objects to be highlighted. The first transformation is called dilation, and results in the objects appearing thicker or inflated. The second transformation is called box blurring, and results in smoothing of the jagged boundary of the dilated image. The smoothing happens in a controlled and non-uniform way such that the outer regions of the halos are less dense as compared to the inner regions. This density variation generates a fadeout effect. The two transformations produce a halo image outline. Next, the halo image is imposed onto the image displayed on computer screen. In one embodiment, a bit-blitting process is used to impose the halo image. In the process, alpha blending, overlay drawing, or underlay drawing techniques may be used as described above to generate the transparent effect. The halo may be imposed or drawn by invoking a graphics application programming interface (API). In the graphics API, the transparency is defined by defining a drawing pen. The drawing pen is actually a graphics context through drawing attributes such as fill color, line style, alpha for transparency, and the like may be set. The halo type and the halo color are set by setting these attributes.

Figure 1C:
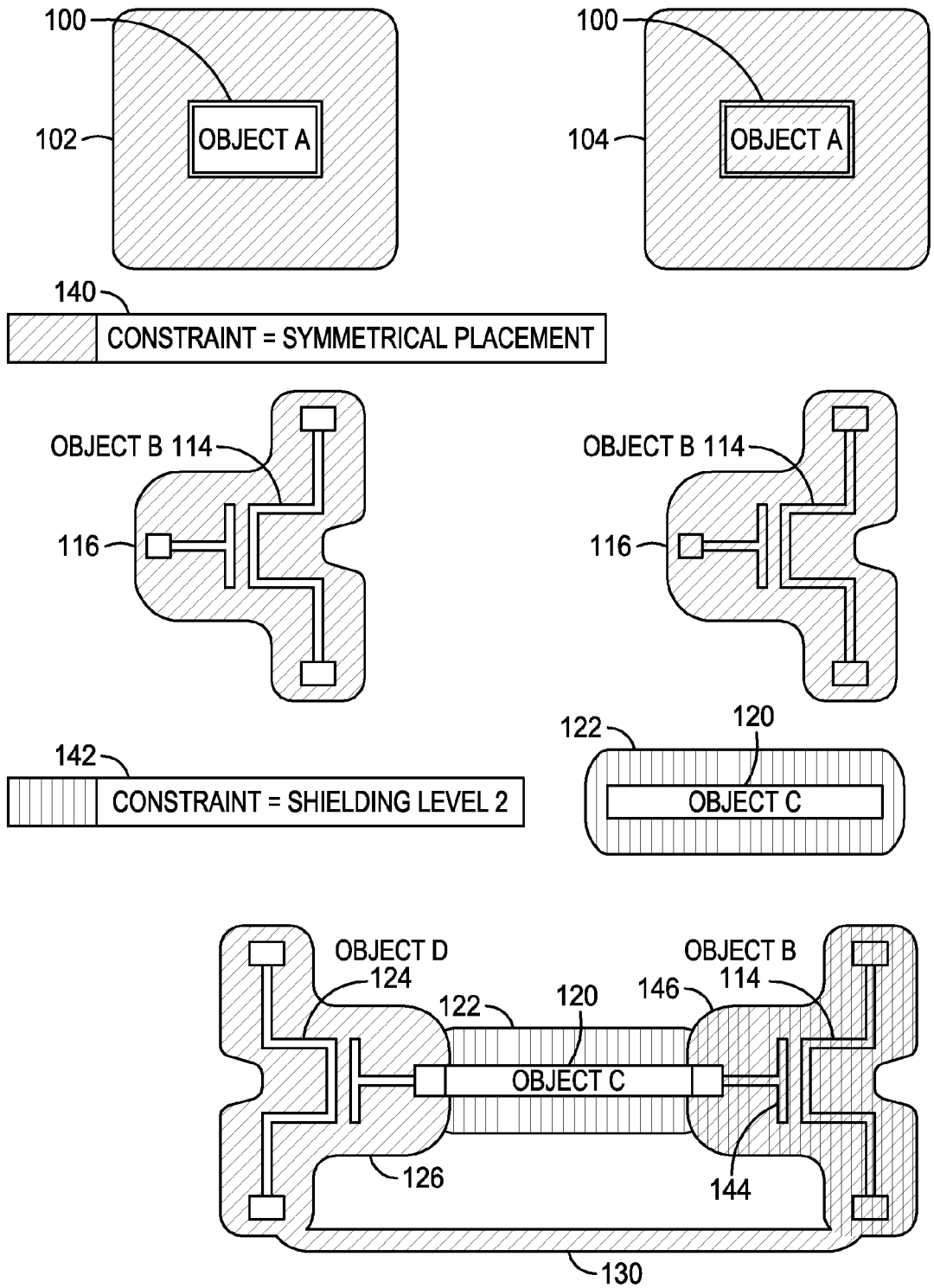
FIG. 1C is an illustrative drawing of transparent halos for visualizing constraints in accordance with some embodiments of the invention.

FIG. 1C is an illustrative drawing of transparent halos for visualizing constraints in accordance with some embodiments of the invention. FIG. 1C shows the same halos as FIG. 1C. However, in FIG. 1C, the halos are shown using shading instead of fill styles. The shading more closely approximates the appearance of the halos in the Electronic Design Automation tool. In FIG. 1C, the highlighting feature 144 for the transistor object 114 is displayed by blending the shading associated with the symmetrical placement constraint 140 with the shading associated with the shielding constraint 142, because the transistor object 114 is associated with both of those constraints.

Figure 1D:
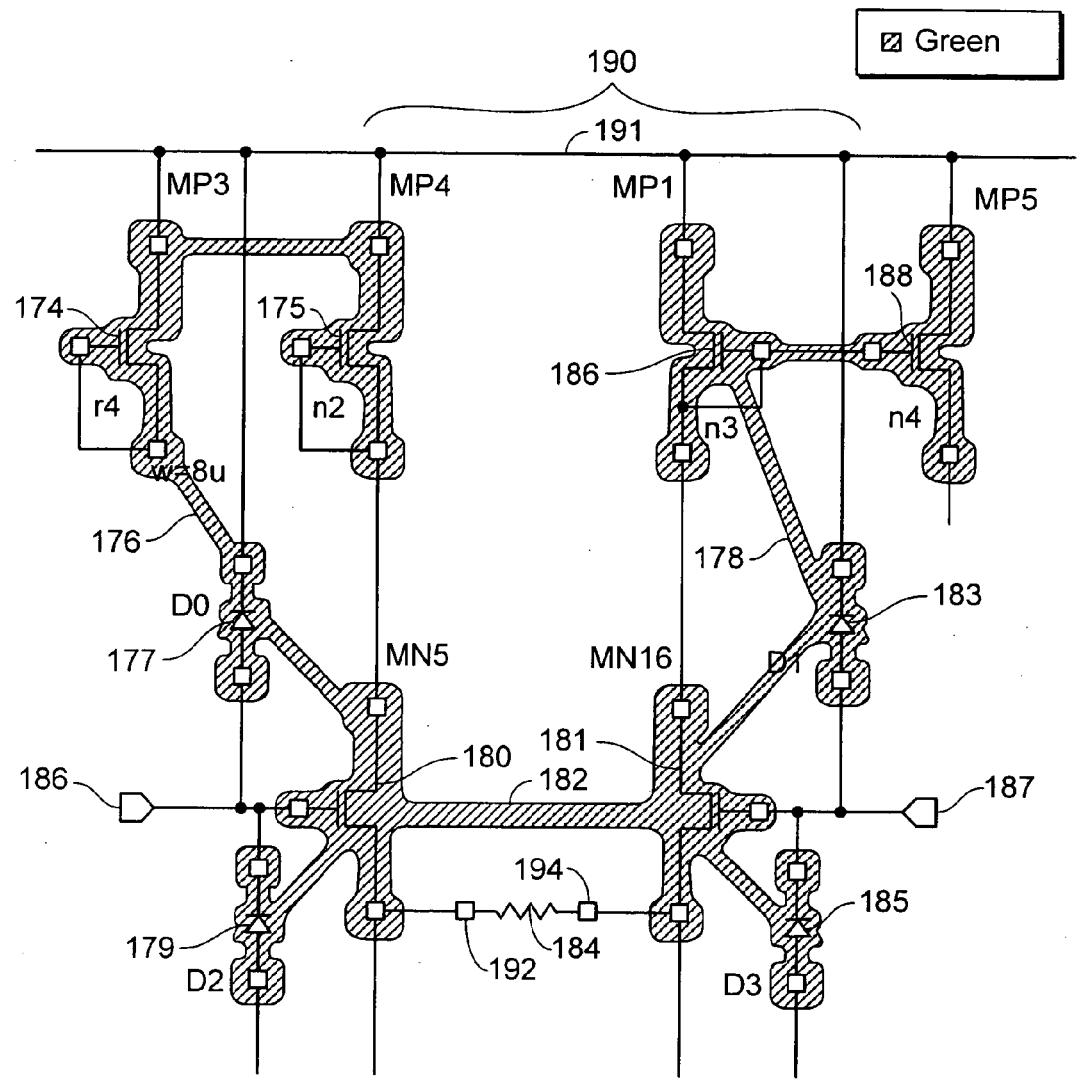
FIG. 1D is an illustrative drawing of interconnected transparent halos for visualizing constraints in accordance with some embodiments of the invention.

FIG. 1D is an illustrative drawing of interconnected transparent halos for visualizing constraints in accordance with some embodiments of the invention. A transparent halo highlighting effect, shown in green color (i.e., diagonal fill style), is shown over and around design objects that are associated with a constraint. The design objects associated with the constraint include transistors 174, 175, 180, 181, 186, 188, diodes 177, 179, 183, 185. The halo includes interconnect halo segments between each portion of the halo that covers a design object. An interconnect halo segment signifies that the two design object halos connected by the segment are related. In one aspect, an interconnect halo segment signifies that the two design object halos connected by the segment are associated with the same constraint. An interconnect halo segment is typically displayed in the same style, i.e., color, transparency level, pattern, width, or density, as the design object halos to which it is connected. Therefore, the interconnect halo segment visually joins two design object halos that are separated by a distance, and creates an appearance that the design object halos are part of a larger single halo. If two or more design objects are associated with the same constraint, interconnect halo segments will be generated to connect the separate halos, thereby forming a single larger halo. An interconnect halo segment 176 joins the portions of the halo that cover the transistor 174 and the diode 177. Similarly, an interconnect halo segment 182 joins the halos that cover the transistor 180 and the transistor 181. The halo does not cover or extend to design objects that are not associated with a constraint. The design objects not associated with a constraint include a resistor 184, design pins 186,187, and instance pins 192, 194.

The types of design objects that may be highlighted include devices, such as transistors and diodes, wires, nets, and terminals. An example net 190 includes three pins on the wire 191. The pins are associated with the device names MP4, MP1, and MP5. The term "net" ordinarily refers to a single connecting wire. The term "net" has a broader meaning as well, which is an abstract object that stores connectivity information. For example, a net may store the name of the net, signals of a net (different unique and single bit members), shapes or figures associated with the net, instance pins associated with the net, and the like. Design elements that depict connectivity on the design canvas are shapes, e.g., the lines that represent wires and the rectangles and polygons that represent pins. Each net may be associated with more than one shape, so a net may include more than one connecting wire. When a user selects a constraint that has a net member, some or all associated shapes or figures of the net are haloed and grouped together, i.e., joined with interconnect halo segments.

In one aspect, a terminal is an abstract object that is associated with a net in a hierarchical design module. A terminal is typically exported for use in establishing connections between the associated net and other nets or design objects. A terminal may also be associated with a pin. A pin may in turn be associated with a shape, and the shape may be displayed on the design canvas to represent the pin. A terminal may be understood as a connector, on a net, to which a pin may be connected. A terminal has a name, and the terminal's name may be different from the associated net's name. If a terminal is a member of a constraint, the terminal's membership in the constraint is visualized using an indirect procedure. Because the terminal is an abstract object, the only perceivable entities are the pins that are associated with the terminal. Thus to visualize terminal type constraint members, the highlighting method highlights and interconnects the shapes or figures that represent each of the terminal's pins to generate a transparent halo around the terminal pins.

In one aspect, a pin is a design object that is ordinarily associated with a terminal. The pin may be further associated with a shape or figures that may be drawn on the design canvas to represent the pin. A pin also has a name, which can be different from the associated terminal's name. If a pin is a member of a constraint, the associated figures of the pin, with the specified pin name, may be interconnected and visualized using halos.

A cell is, in one aspect, a template from which a set of design objects, called instances, can be replicated on the design canvas multiple times. A cell is typically stored in a cell library, which contains a set of commonly-used or standardized cells. The pins of cells are referred to as design pins, and the pins of cell instances are referred to as instance pins.

In one aspect, the halos are transparent and are displayed as an underlay. That is, the transparent highlight occurs below the design object, in order to preserve the displayed image of the design object. As can be seen in the image of FIG. 1D, devices have been specially highlighted using transparent halos which do not obscure the design objects such as wires, instances, text annotations, and the like. The shapes for the highlighted objects, such as its pins, are clearly visible because the halos are partially transparent. For example, the instance name label D1 for the diode 183 overlaps with the interconnect halo segment between the diode 183 and the transistor 181, but is clearly visible and has not been obscured, because of the transparency of the interconnect halo segment. Note that the effect is not completely illustrated in FIG. 1D, because the drawing is not in color. On a computer screen, where thousands or millions of different colors can be displayed, the transparent effect, achieved by drawing on multiple graphics planes or by color blending, allows design objects and text labels to be visible simultaneously with the halo effect. Similarly, the label "w=8u" on transistor 174 is also clearly visible. The fact that the halos do not obscure the actual design objects prevents loss of displayed information which may be of use to the designer during design creation and debugging of circuit designs. The fact gains more importance when the degree of constraint relationship is strong and the halo width is proportionately increased. The device pins and shapes are clearly visible through the halo, and so are the wires that connect these haloed transistors.

In some embodiments, while visualizing constraints, the thickness or density of the halo shape and connecting segments is used to indicate the degree or strength of the relationship represented by a constraint visualized through the halo. Different halo densities are typically achieved during the dilation and box-blurring transformations used to produce the halo shapes. Wider dilations result in wider or lower-density halos.

Figure 2A:
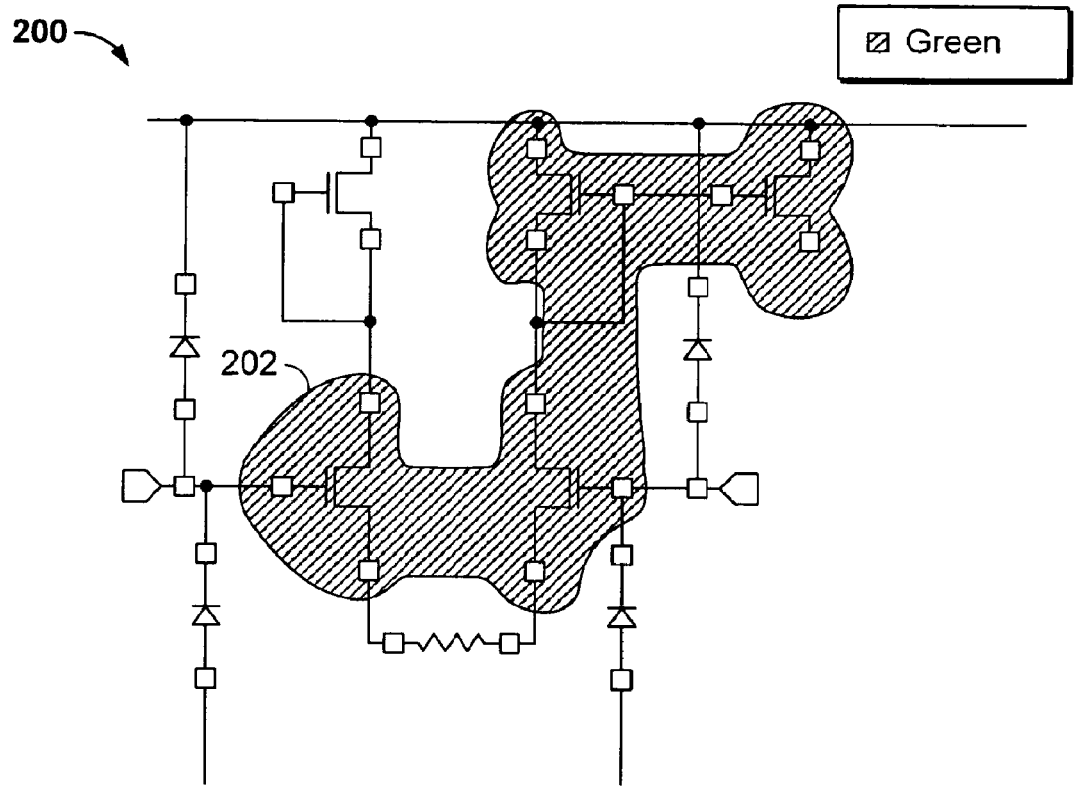
FIG. 2A is an illustrative drawing of thick halos that depict strong matching between parameters of member transistors in accordance with some embodiments of the invention.
Figure 2B:
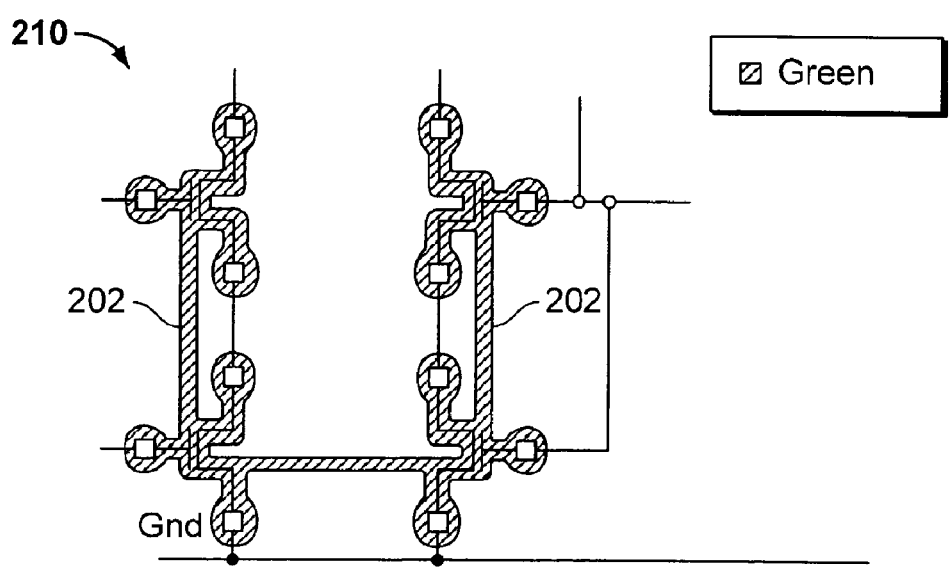
FIG. 2B is an illustrative drawing of thin, dense halos that depict weak matching between parameters of member transistors in accordance with some embodiments of the invention.

FIG. 2A is an illustrative drawing of thick halos that depict weak matching between parameters of member transistors in accordance with some embodiments of the invention. FIG. 2B is an illustrative drawing of thin, dense halos that depict strong matching between parameters of member transistors in accordance with some embodiments of the invention. That is, in one aspect, the thickness of the halo is proportional (or, more specifically, inversely proportional) to a strength attribute of the matching constraint, and the fill density of the halo is proportional to a strength attribute of the matching constraint. The halos, even though quite thick, do not obscure any part of the design. Other "degree" visualization methods could also be used without departing from the spirit of the present invention, but the density approach is adopted in the preferred embodiment for its intuitive visual effect. A stronger relationship (for example, tightly matched transistors) may be depicted using thinner width (and, optionally, more dense) interconnect halo segments, whereas a weaker relationship is depicted using thicker (and, optionally, less dense) interconnect halo segments. Alternatively, in another aspect, a stronger relationship may be depicted using thicker width segments, and a weaker relationship may be depicted using thinner width segments.

Figure 3:
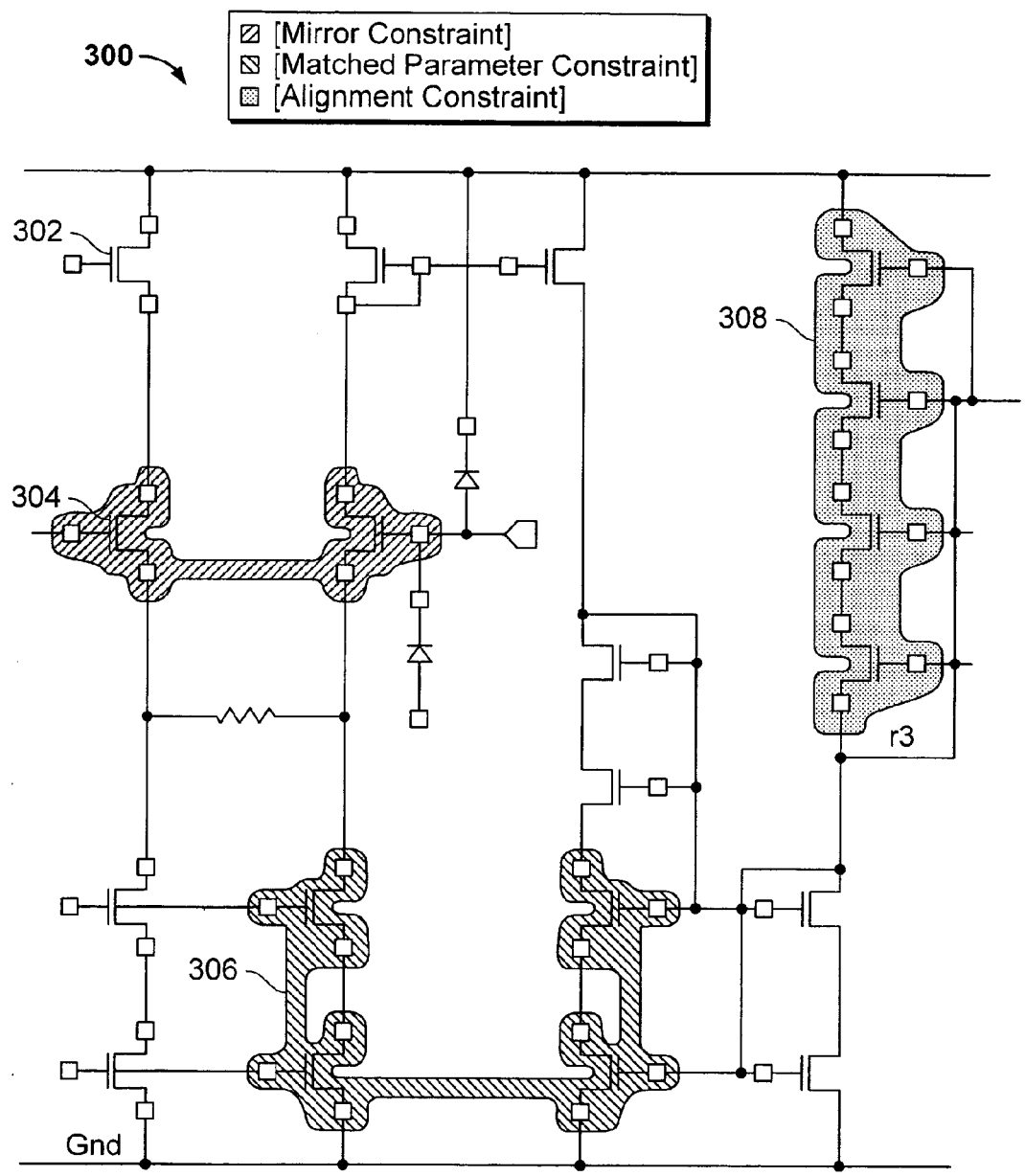
FIG. 3 is an illustrative drawing of different color transparent halos that depict constraints of different types in accordance with some embodiments of the invention.

FIG. 3 is an illustrative drawing of different color transparent halos that depict constraints of different types in accordance with some embodiments of the invention. In one aspect, the halo color is indicative of a specific constraint type, and constraints of different types are visualized in different colors. In FIG. 3, a matched parameter constraint is being visualized in lilac color as a halo 306, the mirror constraint is being visualized in cyan color as a halo 304, and the alignment constraint is being visualized in brown color as a halo 308. Other visual effects such as stipple patterns may also be used.

Figure 4:
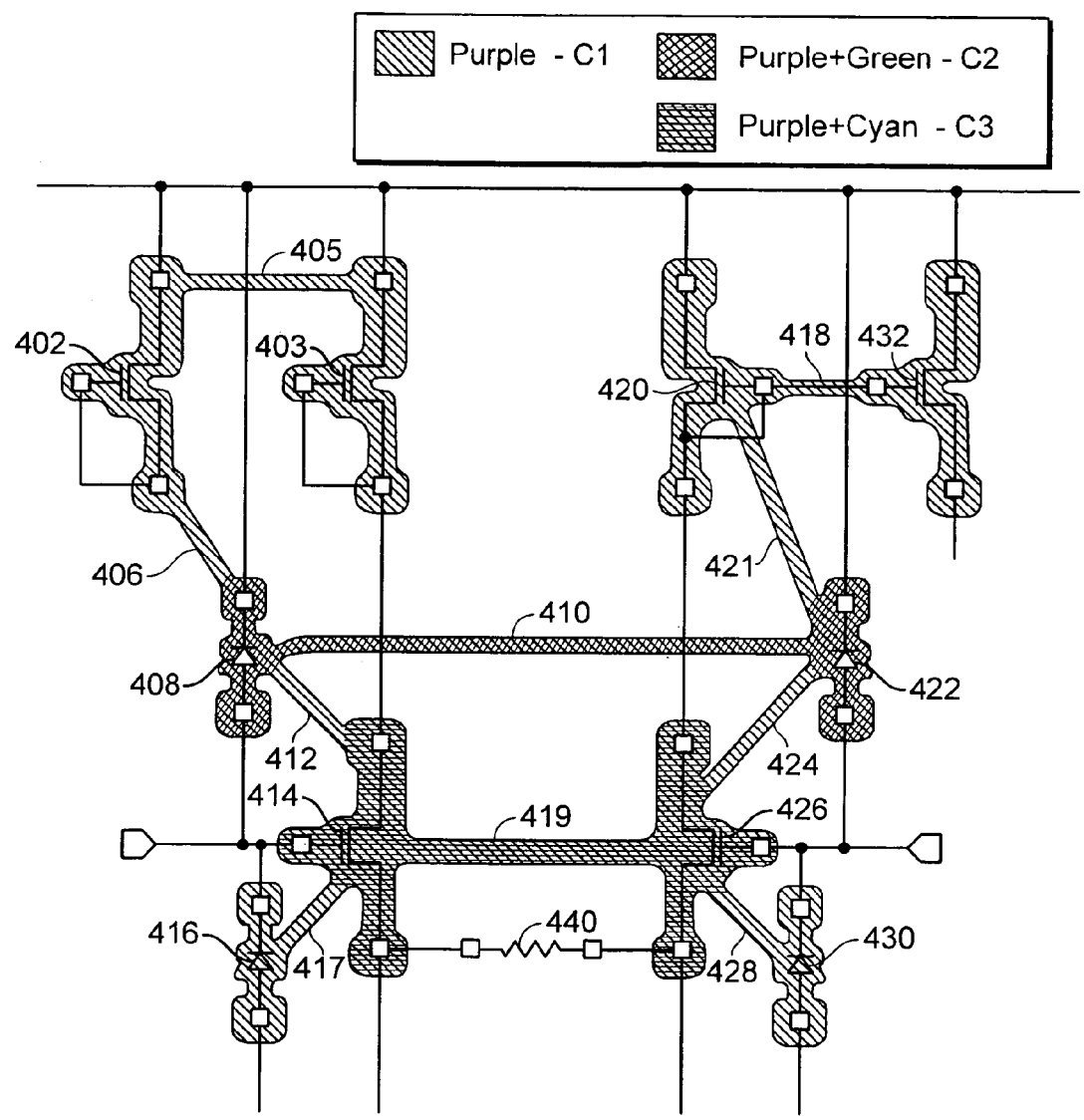
FIG. 4 is an illustrative drawing of color blending of different color transparent halos that depict constraints of different types in accordance with some embodiments of the invention.

FIG. 4 is an illustrative drawing of color blending of different color transparent halos that depict constraints of different types in accordance with some embodiments of the invention. FIG. 4 shows a simple example with three constraints, each between two or more schematic instances that have been haloed and interconnected by transparent interconnect halo segments displayed in a different color that corresponds to the constraint. The colors are obtained using alpha blending. Alpha blending results in colors that a designer will understand represent multiple constraints applied to an object.

In one aspect, a design object halo is drawn around each design object. For example, the halo around the transistor design object 402 extends around the design object, and covers the three pins of the design object 402, but does not extend to other design objects. That is, the design object halo around the design object 402 does not include the interconnect halo segments 405, 406; those segments join the design object halo around the transistor 402 to other design object halos around a transistor 403 and a diode 408. The combination of the design object halos around the design objects 402, 403, 408, and the interconnect halo segments 405, 406 is referred to in this specification as a larger halo. Furthermore, a "halo around a design object" refers to the design object halo, and does not include any interconnect segments joined to that design object halo. These terms are used for explanatory purposes. Alternatively, a halo that covers multiple related design objects, and connects the design objects, may be referred to as a single halo, and may be formed by methods other than those described herein.

FIG. 4 shows halos of three different colors that represent three different constraints. Where multiple constraints are associated with a single design object, the color of the halo around that design object is a blend of the colors of the individual halos. A purple color represents a constraint C1, a green color represents a constraint C2, and a cyan color represents a constraint C3. A resistor design object 440 is not associated with any constraint, so no halo has been drawn around the resistor 440. The constraint C1 (purple) is associated with every transistor and diode in FIG. 4. Therefore, an interconnect halo segment drawn in purple, or in a blend of purple and another color, joins each transistor or resistor to its nearest neighbor transistor or resistor. The halo around a transistor 403 is joined to a halo around a transistor 402 by a halo segment 405. Each transistor or diode has a corresponding halo, and the interconnect segments join the halos. The halos around the transistors and diodes are not labeled with reference numerals, but the halos are easily identified in FIG. 4 because they cover the corresponding transistor or diode. The halo around the transistor 402 is joined to a halo around a diode 408 by an interconnect halo segment 406. The halo around the diode 408 is joined to a halo around a diode 422 by an interconnect halo segment 410. The halo around the diode 408 is joined to a halo around a transistor 414 by an interconnect halo segment 412. The halo around the transistor 414 is joined to a halo around a diode 416 by an interconnect halo segment 417. The halo around the transistor 414 is joined to a halo around a transistor 426 by an interconnect halo segment 419. The halo around the transistor 426 is joined to a halo around a diode 430 by an interconnect halo segment 428. The halo around the diode 422 is joined to a halo around a transistor 420 by an interconnect halo segment 421. The halo around the transistor 420 is joined to a halo around a transistor 432 by an interconnect halo segment 418.

The interconnect halo segments 405, 406, 410, 412, 417, 419, 424, 428, 421, and 418 join the transistors and diodes as described above to form a larger halo that represents the constraint C1. The interconnect halo segments 410 and 419 are drawn in blended colors of purple-green and purple-cyan, respectively, to indicate that the associated transistors or diodes are also associated with the constraints C2 and C3, respectively.

The halos around the diodes 408 and 422 are drawn in a purple-green blended color because those two diodes are associated with constraints C1 (purple) and C2 (green). The interconnect halo segment 410, which joins those two diodes 408, 422, is also drawn in the purple-green color. The interconnect halo segment 410 therefore connects the halos around the diodes 408, 422 to a form a larger halo that represents design objects associated with both constraints C1 and C2.

The halos around the transistors 414, 426 are drawn in a purple-cyan blended color because those two transistors are associated with constraints C1 (purple) and C3 (cyan). The interconnect halo segment 419, which joins those two transistors 414, 426, is also drawn in the purple-cyan color. The interconnect halo segment 419 therefore connects the halos around the transistors 414, 426 to form a larger halo that represents design objects associated with both constraints C1 and C3.

In one aspect, care is taken to draw a minimum number of interconnect halo segments, as described in more detail below. The number of interconnect halo segments is substantially minimized by drawing an interconnect halo segment from each design object to the design object's neighbor design object(s) so that all design objects associated with the halo are interconnected. Therefore, as shown in FIG. 4, the segment 405 has been drawn from the transistor 403 to the nearest neighbor 402 of the transistor 403. Similarly, the segment 406 has been drawn from the transistor 402 to the nearest neighbor 408 of the transistor 402, and so on, for each design object associated with the constraint. To avoid visual clutter, no interconnect segment has been created between transistor device 403 and diode device 408.

Figure 5:
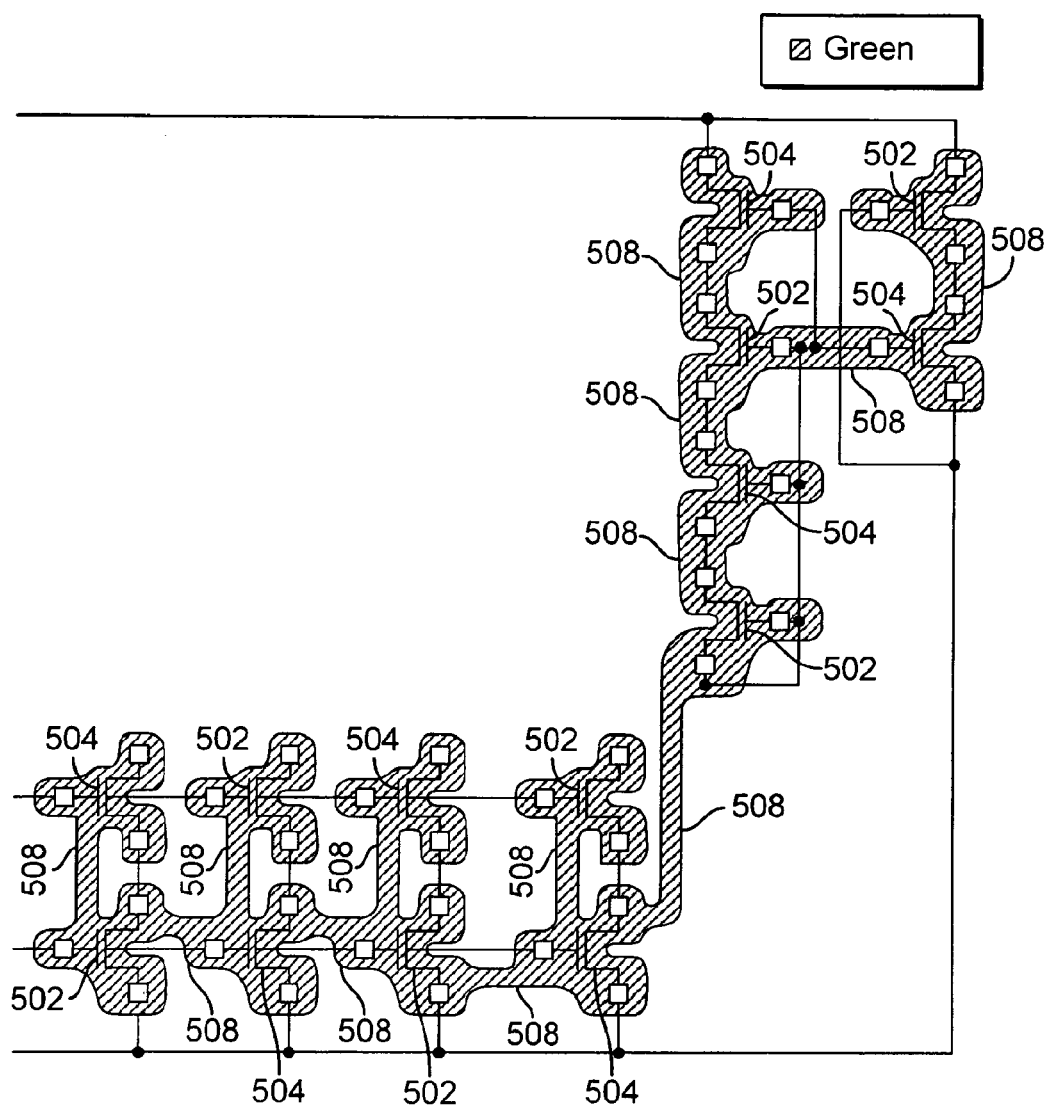
FIG. 5 is an illustrative drawing of halos displayed around design objects, with connecting segments joining each object to its nearest neighbor in accordance with some embodiments of the invention.

FIG. 5 is an illustrative drawing of halos displayed around design objects, with interconnect halo segments joining each object to its nearest neighbor in accordance with some embodiments of the invention. As described above, joining each object 502 to a nearest neighbor 504 with an interconnect segment 508 minimizes the number of interconnect segments.

In FIG. 5, a halo is displayed around each design object 502. The halos around the design objects are joined together by interconnect halo segments 508. The halo around each design object 502 is joined by an interconnect halo segment 508 to a halo around a nearest neighbor design object 504. The group of halos joined by the interconnect segments 508 appears to be a single larger halo. A halo of a single, uniform color is drawn around every transistor shown in FIG. 5, which means that every transistor shown is associated with the same constraint. The interconnect halo segments 508 are calculated and created dynamically depending on the constraints that are shown and depending on the current design level being displayed in the EDA tool.

There are exceptions to the rule that interconnect halo segments join nearest neighbor objects. In one aspect, if the design objects are instances of symbols, the connecting segments do not begin from and end at instance pins. In addition, care is taken that the interconnect halo segment does not overlap with the instance pins of the two constraint objects, if any, as shown in FIG. 2B. Overlapping is avoided where possible to avoid coincidence of device instance interconnect halo segments with electrical connectivity wires, which typically tend to run from instance pin to instance pin, but may not be part of the constrained group of objects. Visual separation of instance interconnect halo segments from electrical wire interconnects that are part of the constrained set is beneficial because it avoids the improper perception that unconstrained wires are part of a constraint group. A segment generation process automatically computes a set of optimum join points, other than the pin locations, and draws an optimum connecting segment by drawing a segment between the optimum join points.

Figure 6A:
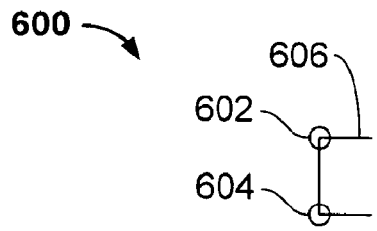
FIG. 6A is an illustrative drawing of interconnect points for a wire object in accordance with some embodiments of the invention.

FIG. 6A is an illustrative drawing of interconnect points for a wire object in accordance with some embodiments of the invention. Interconnect points on wire objects are placed at the vertices of the wire. A wire 601 has two interconnect points, 602, and 604. Interconnect halo segments are connected to wires at the interconnect points, so, if the wire 601 is to be joined to another design object by an interconnect halo segment, the segment will connect to the wire 601 at one of the interconnect points 602, 604.

Figure 6B:
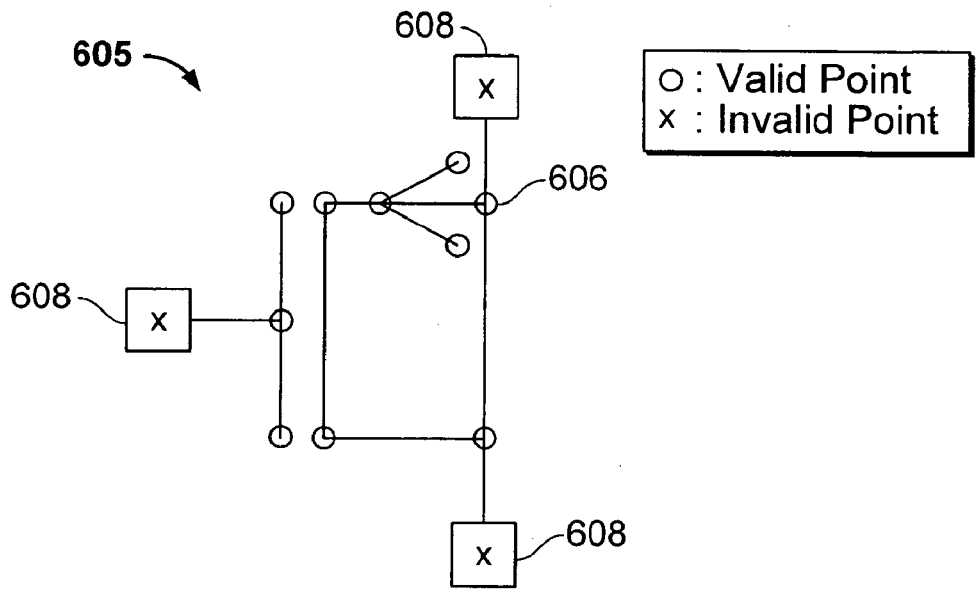
FIG. 6B is an illustrative drawing of interconnect points for a transistor in accordance with some embodiments of the invention.

FIG. 6B is an illustrative drawing of interconnect points for a transistor in accordance with some embodiments of the invention. A transistor 605 has several valid interconnect points, to which interconnect halo segments may be connected, and three invalid interconnect points, to which interconnect halo segments may not be connected. The valid interconnect halo segments are encircled, such as a point 606. The invalid points, which correspond to the instance pins 608, are shown as X's.

Figure 6C:
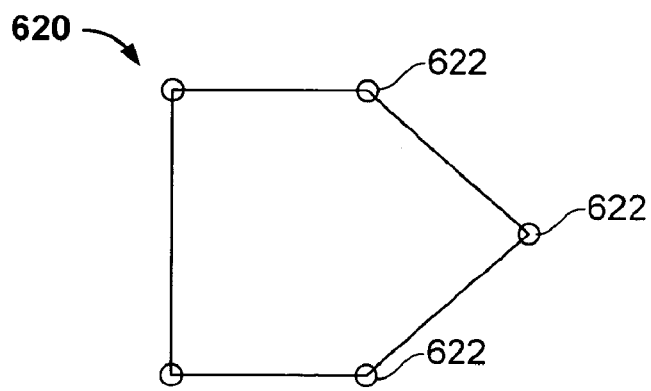
FIG. 6C is an illustrative drawing of interconnect points for a pin in accordance with some embodiments of the invention.

FIG. 6C is an illustrative drawing of interconnect points for a design pin in accordance with some embodiments of the invention. A pin 620 has five valid interconnect points 622, which are encircled for illustrative purposes. An interconnect point 622 is shown. A halo segment may be connected to the pin 620 at any of the encircled points 622.

Figure 7A:
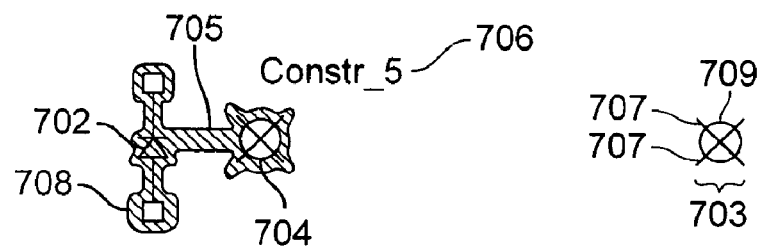
FIG. 7A is an illustrative drawing of a design object and an up-connector highlighted with a halo in accordance with some embodiments of the invention.

FIG. 7A is an illustrative drawing of a design object 702 and an up-connector 704 highlighted with a halo 708 in accordance with some embodiments of the invention. In some cases, some of the design objects associated with a constraint are not all displayed on the same screen or window. In such cases, an up-connector 704 may be displayed to indicate that a design object 702 visible on the currently-displayed level of the design hierarchy shares an associated constraint with a design object (not shown) on a higher level of the design hierarchy. The up-connector 704 is displayed as a visual feature 703 with a distinctive shape, such as a circle 709 superimposed on diagonal lines 707 that intersect at the center of the circle 709. The design hierarchy in essence comprises a data structure encoded in a computer-readable medium that represents an integrated circuit.

The up-connector 704 is connected to the design object 702 by an interconnect halo segment 705 to indicate that the design object 702 is associated with a constraint. A name 706 of the constraint may be shown near or in association with the up-connector 704. To improve ease-of-use, a menu may be displayed when the user clicks the mouse over the up-connector. The menu may allow the user to traverse or navigate to a reference point, such as the location of the higher-level design object (not shown) to which the up-connector 704 refers.

A constraint may be associated with multiple design objects, and design objects may be placed on different levels of a design hierarchy. The EDA tool typically displays the design objects that are located on a currently-selected hierarchy level. If a displayed design object 702 is a member of, i.e., associated with, a constraint that is also associated with other design objects (not shown) on one or more other levels of the design, then an up-connector 704 will be displayed for the design object 702 to indicate that the constraint associated with the design object crosses hierarchy levels. In one aspect, if constraints are being visualized in a window that only shows some of the design objects associated with the constraint, the an up-connector is attached to the top-most visualized design object in the window.

The location of the automatically generated and placed up-connector is not fixed. In some embodiments, an up-connector is dynamically placed on the design canvas and is ordinarily connected by a segment to the topmost-rightmost design object in the set of design objects associated with the constraint. The up-connector is placed just above the object or towards its right if there is enough free space. A region-query operation is employed in the database to produce instances/shapes in a given area. If enough free space is not present the up-connector may be placed on the top or right extreme of the design boundary, depending upon which position generates a shorter joining segment.

The up-connector may be used to show that a constraint on a design object in the currently displayed hierarchy level also applies to another design object in a higher level. The design objects may be any type of design object such as a net, pin, terminal, transistor, or the like.

Constraint names may be displayed on the design canvas. In one aspect, a constraint name is ordinarily displayed as a separate label in the same style or color as the constraint's highlighting or halo features. With reference to FIG. 7A, a label 706 appears adjacent to an up-connector 704 if an up-connector is present. If no up-connector is present, a different approach may be used to display the name label. In one aspect, legend symbols 703 are used to avoid the need to find free space near the design object(s) 702 for label placement. If an interconnect halo segment is present on the constraint halo, a circular legend symbol 703 is placed over the interconnect halo segment. If there is no interconnect halo segment, the legend symbol is placed at the interconnect point at the top-right of the design object. A similar circular legend symbol is placed in a legend area on the right side of the design along with a label that describes the constraint. In one aspect, each location where a circular legend symbol has been placed is remembered, and if more than one circle is to be placed on a segment, the label generation process searches for available locations on alternate interconnect halo segments or interconnect points of the top-right constraint object so that the circular legend symbols are non-overlapping.

Figure 7B:
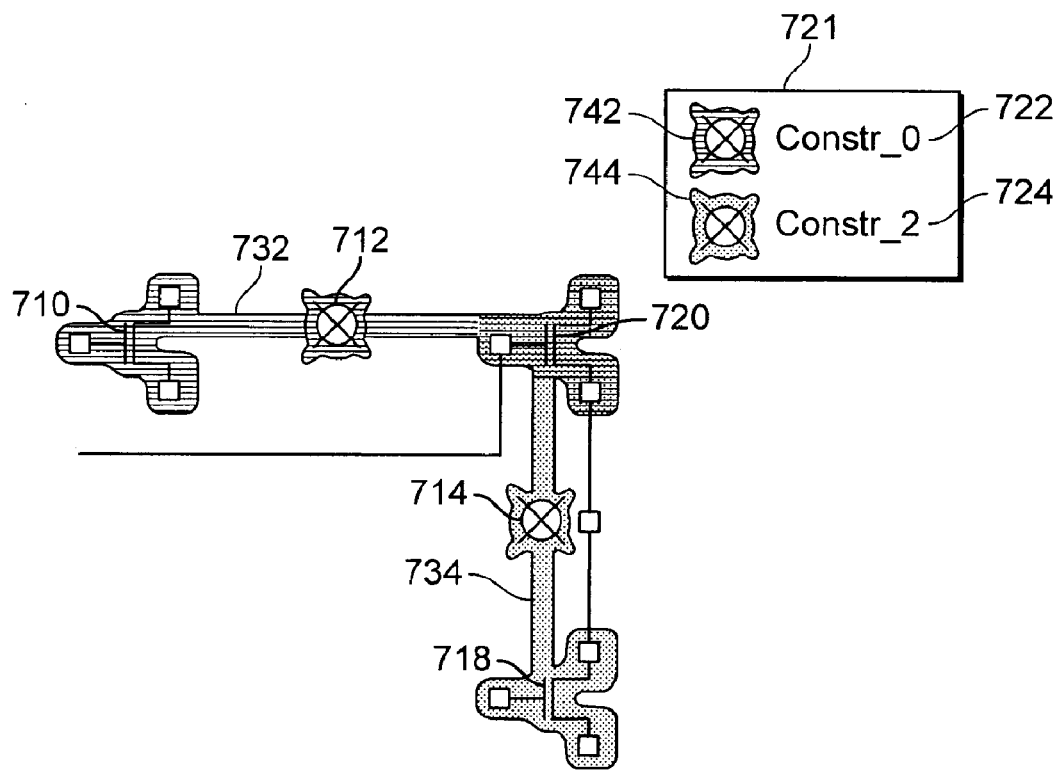
FIG. 7B is an illustrative drawing of circular legend symbols and associated constraint names in accordance with some embodiments of the invention.

FIG. 7B is an illustrative drawing of circular legend symbols and associated constraint names in accordance with some embodiments of the invention. A halo 732 is displayed over two design objects 710, 720. The halo 732 indicates that a constraint named Constr_0 applies to those two design objects. The constraint name Constr_0 is associated with the halo 732 by a circular legend symbol 712 displayed adjacent to the design objects 710, 720 and also adjacent to the halo 732, and a similar symbol 742 displayed adjacent to the constraint name Constr_0. Similarly, another halo 734 indicates that a constraint named Constr2 applies to two design objects 718, 720. The constraint name Constr_2 is associated with the halo 734 by circular legend symbols 714, 744.

Circular legend symbols 742, 744 that have the same appearance, e.g., color and shape, as the circular legend symbols 712, 714 are shown in a legend area 721, which is typically displayed along the periphery of the design canvas. Each circular legend symbol 712, 714 is shown in the same color as the corresponding halo over which the symbol is displayed. The constraint name Constr_0 722 is displayed adjacent to the symbol 742. Similarly, the constraint name Constr_2 724 is displayed adjacent to the symbol 744. The phrase "displayed over" expresses one possible way in which the circular legend symbols may be displayed in association with halos.

The symbols need not be displayed over the halos. Instead, the symbols could be drawn or displayed as part of the halos, or displayed under the halos.

Figure 7C:
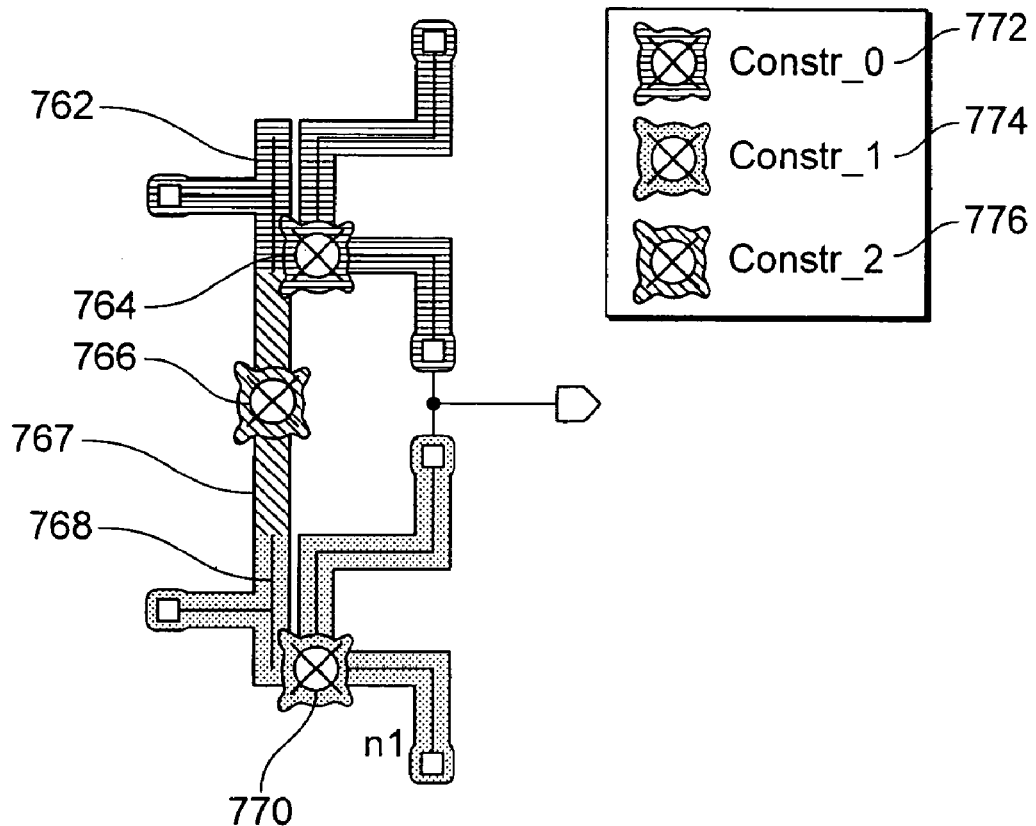
FIG. 7C is an illustrative drawing of three circular legend symbols placed on interconnection points in accordance with some embodiments of the invention.

FIG. 7C is an illustrative drawing of three circular legend symbols placed on interconnection points according to some embodiments of the invention. Two transistors 762,768 are associated with a constraint named Constr_2. An interconnect halo segment 767 joins the halos associated with the transistors 762,768. A circular legend symbol 766 is displayed on the interconnect halo segment 767. Also note that as the transistor 762 is associated with a constraint named Constr_0, for which the transistor 762 is the only member being visualized. Therefore a circular legend symbol 764 with the same color as Constr_0 has been placed on an interconnect point of the transistor 762. Similarly, the transistor 768 is associated with a constraint named Constr_1, and a circular legend symbol 770 with the same color as Constr_1 has been placed on an interconnection point of the transistor 768.

Figure 7D:
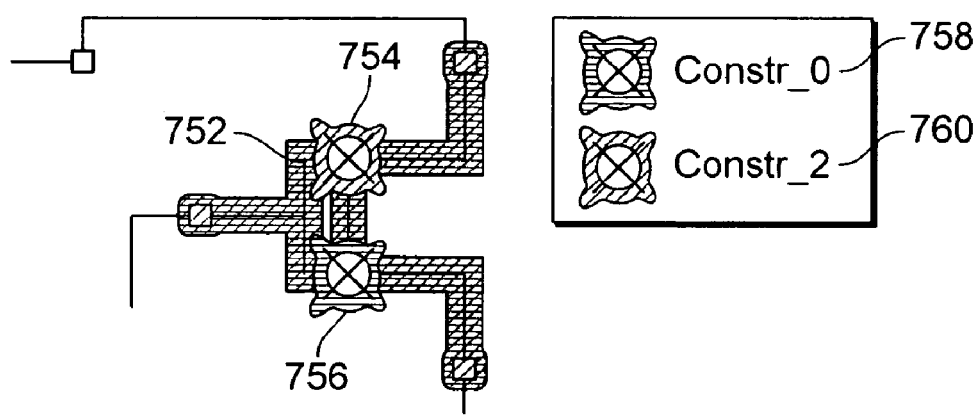
FIG. 7D is an illustrative drawing of two design constraints being visualized using transparent halos in accordance with some embodiments of the invention.

FIG. 7D is an illustrative drawing of two design constraints being visualized using transparent halos in accordance with some embodiments of the invention. A transistor 752 is associated with two separate constraints, Constr_0 and Constr_2. The transistor 752 is the only displayed member of those two constraints. Therefore the circular legend symbols 754,756 for the two constraints have been placed on two different interconnect points of the transistor 752. Constr_0 is associated with a first color, which is represented by a horizontal line fill style. Constr_2 is associated with a second color, which is represented by a diagonal line fill style. Constr_0 is associated with the circular legend symbol 756, and Constr_2 is associated with the circular-legend symbol 754. The transistor 752 is displayed in a blended color produced by blending the first color with the second color. The blended color is illustrated in FIG. 7D as a fill pattern that includes both horizontal and diagonal lines.

Figure 8A:
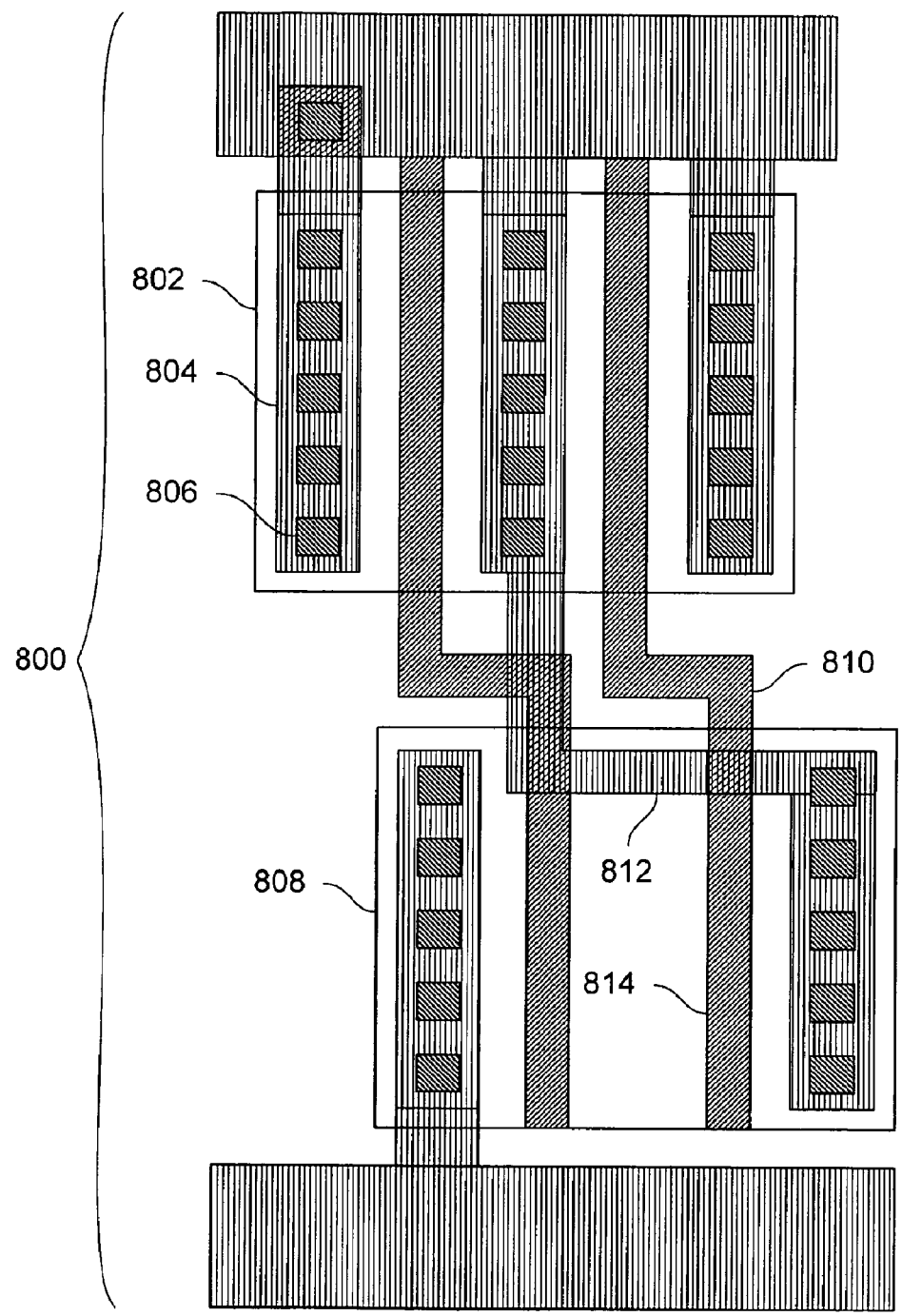
FIG. 8A is an illustrative drawing of a prior art circuit layout image.

FIG. 8A is an illustrative drawing of a prior art circuit layout image. The layout image 800 includes circuit features such as polysilicon wires 810,812,814. Other features shown include contact vias 806, metal wires 804, active area implants 802, 808, which are features known to those skilled in the art of circuit layout. The image 800 is of a layout displayed without halos or highlighting.

Figure 8B:
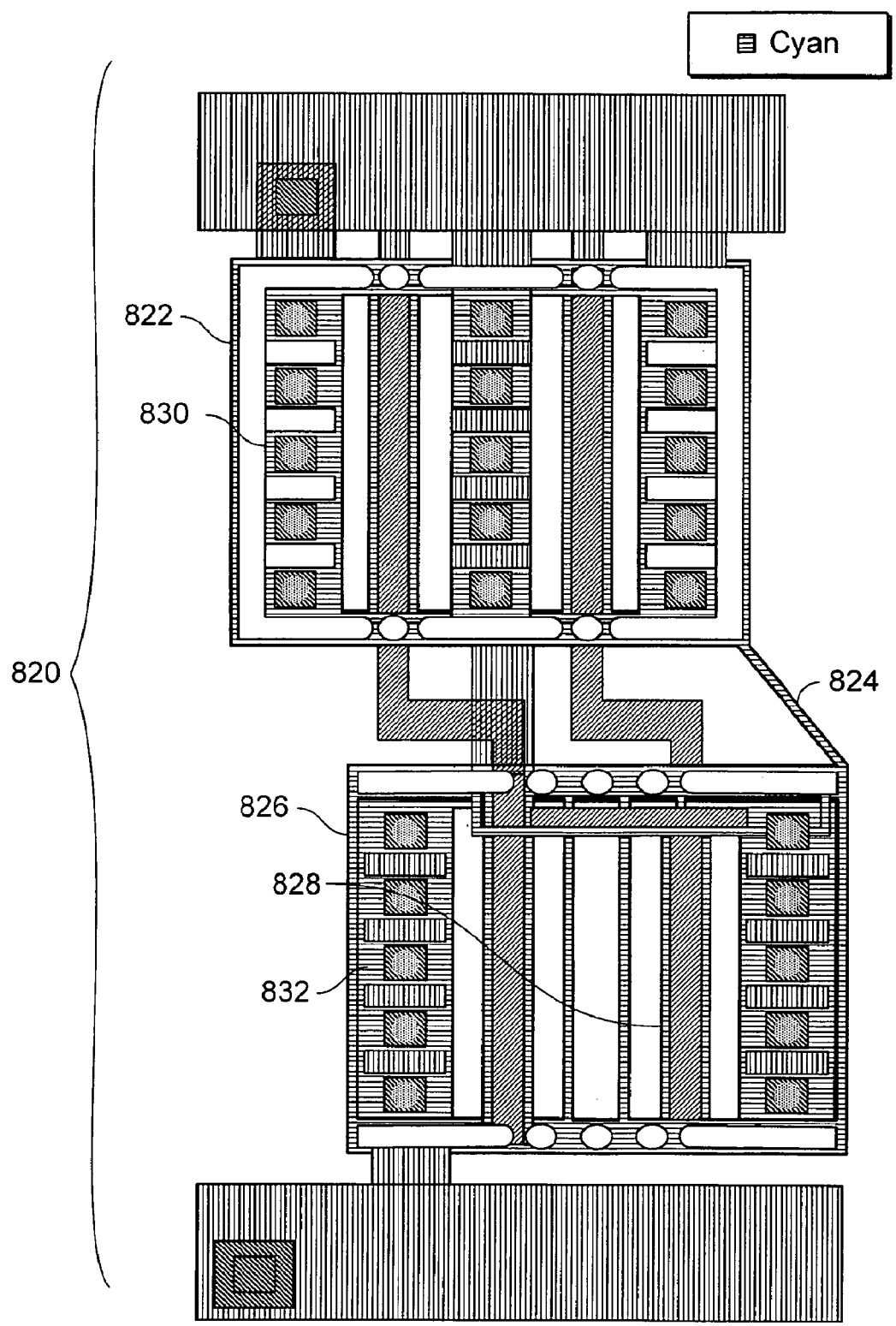
FIG. 8B is an illustrative drawing of interconnected transparent halos that appear as on overlay in a layout diagram in accordance with some embodiments of the invention.

FIG. 8B is an illustrative drawing of interconnected transparent halos that appear as on overlay in a layout diagram in accordance with some embodiments of the invention. FIG. 8B shows a pair of parallel connected PMOS transistors (uppermost large rectangle) and a pair of series-connected NMOS transistors (lowermost large rectangle), along with some interconnecting wires and contact vias (small squares), as known to those skilled in the art. Both the NMOS pair and the PMOS pair have been constrained. Each rectangular shape (e.g., vias and gates) comprising the transistor pairs is drawn surrounded by a constraint halo, with each shape halo 822, 826 being drawn as an overlay just outside the corresponding original shape peripheries. As in schematic displays, the layout instance halos 822, 826 are connected by an interconnection segment 824. Drawing the halos 822,826 outside the periphery of the selected instance shapes, and on a drawing plane above (overlay) those of the selected instance shapes, allows the designer to see the original layout shapes as well as the halo outline.

Figure 9A:
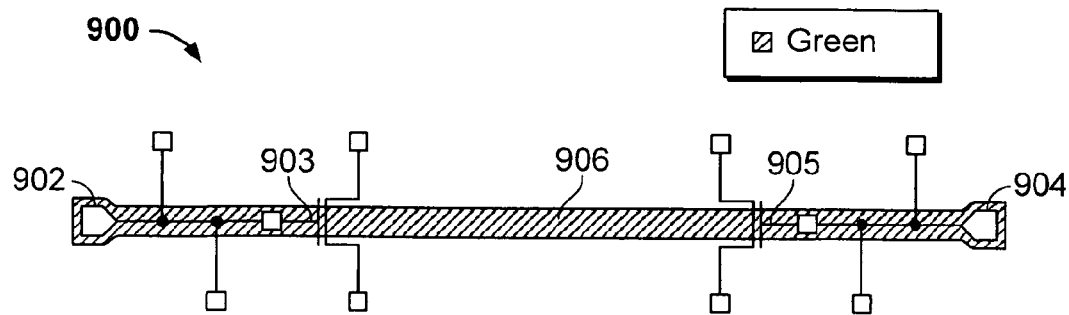
FIG. 9A is an illustrative drawing of a halo between two pins associated with a distance constraint in a schematic diagram in accordance with some embodiments of the invention.

FIG. 9A is an illustrative drawing of a halo 906 between two pins 902, 904 associated with a distance constraint (not shown) in a schematic diagram in accordance with some embodiments of the invention. Constraints may be applied to design objects of various types, such as device instances, terminals, pins, nets, and shapes such as lines, paths, and boundaries. In one aspect, the constraint visualization techniques described herein are similar in nature and are applied to the various types of design objects in the same way. For example, instances, terminals, pins, and nets may be highlighted on the canvas using transparent halos along with a minimum set of interconnect halo segments joining the members of the constraint group. The transistors 903, 905 are not associated with the constraint, so the halo is not drawn around the transistors 903, 905. Instead, the halo partially covers the transistors 903, 905 because the transistors 903, 905 intersect the interconnect halo segment between the pins 902, 904.

Figure 9B:
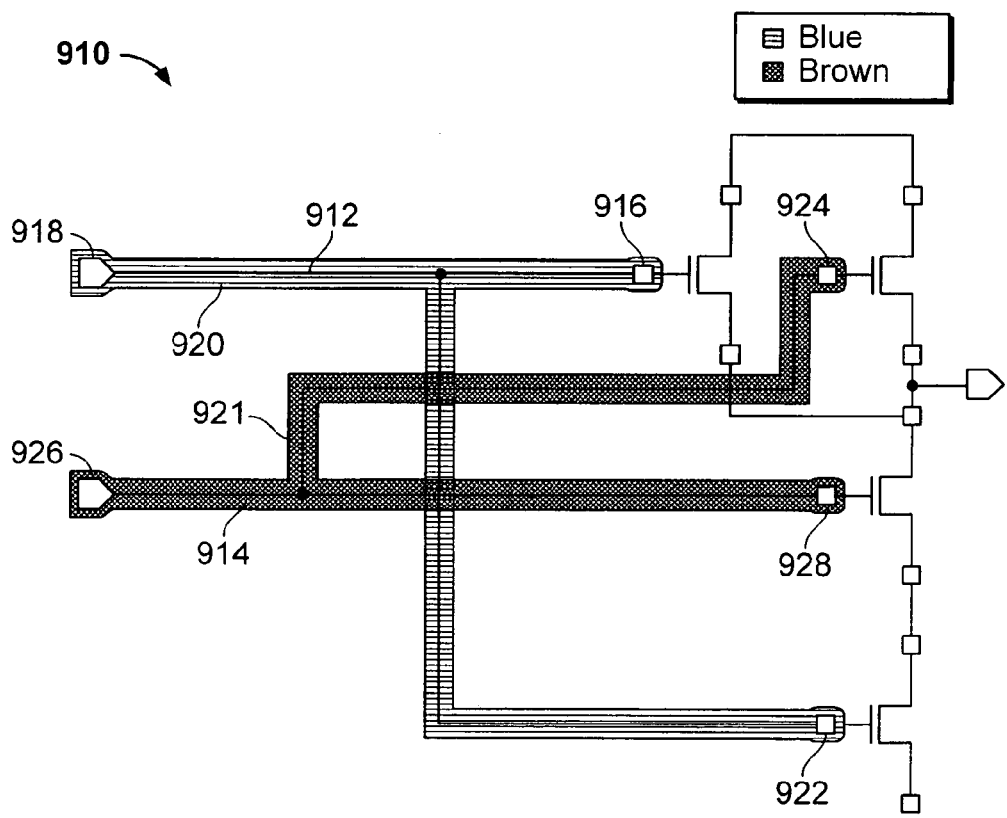
FIG. 9B is an illustrative drawing of a halo around two nets associated with constraints in a schematic diagram in accordance with some embodiments of the invention.

FIG. 9B is an illustrative drawing of halos 920, 921 around two nets associated with constraints in a schematic diagram in accordance with some embodiments of the invention. A net is, in one aspect, a connection between two design objects, such as a wire that connects two devices. Constraints on nets may be shown as halos around the nets. A blue halo 920 is displayed on a net 912. The net 912 joins the pins 918, 916, 922. A brown halo 921 is displayed on a net 914. The net 914 joins the pins 924, 926, 928.

Figure 9C:
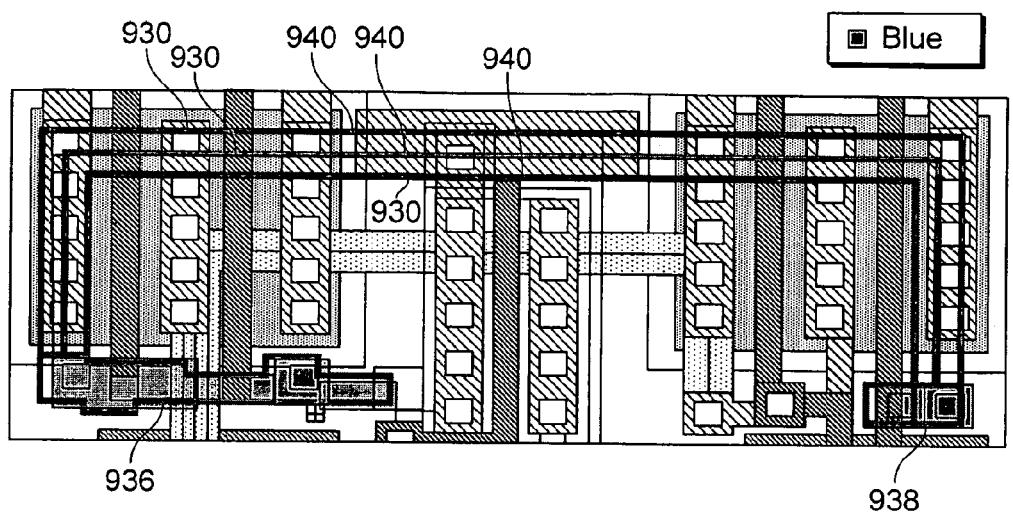
FIG. 9C is an illustrative drawing of a halo around a net associated with a constraint in a layout diagram in accordance with some embodiments of the invention.

FIG. 9C is an illustrative drawing of halos 940 around a net 930. The net 930 is associated with a constraint (not shown) \in a layout diagram in accordance with some embodiments of the invention. The layout diagram shows the physical components of the circuit design. In this example, net 930 connects a set of design objects 936 with another set of design objects 938. The halo 940 is displayed around the net 930 and the design objects 936,938 to show that a constraint is associated with the net 930 and the design objects 936,938. The halo 940 covers the net 930 and also covers the design objects 936, 937. The halo 940 has a color, e.g., blue, and is displayed as an overlay above and around the design objects 930, 936, 937 on the layout diagram.

Figure 9E:
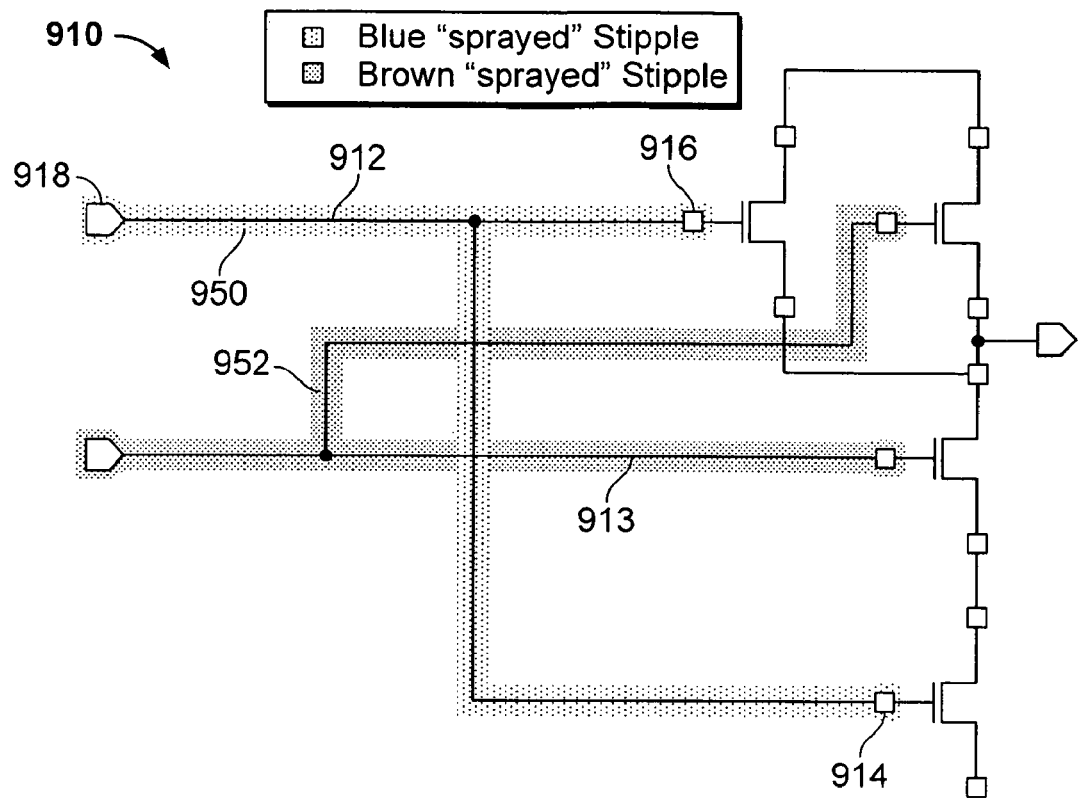
FIG. 9E is an illustrative drawing of a halo formed by a dashed line in a schematic diagram in accordance with some embodiments of the invention.
Figure 9D:
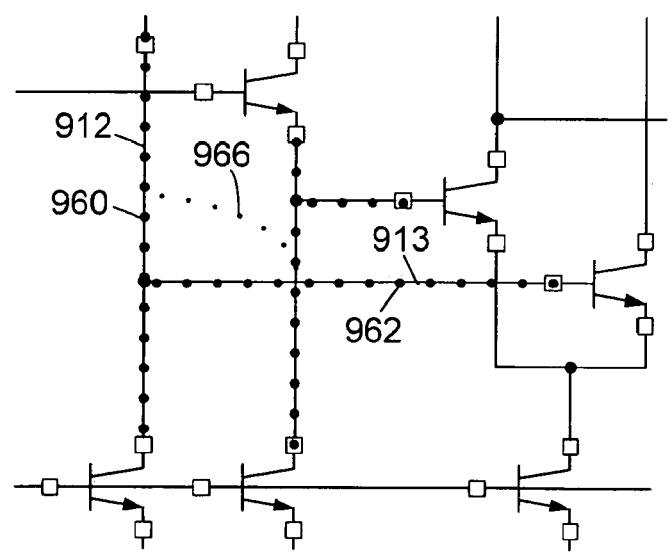
FIG. 9D is an illustrative drawing of a halo formed by randomized highlighting in a schematic diagram in accordance with some embodiments of the invention.

FIG. 9D is an illustrative drawing of halos 950, 952 around nets 912, 913 in accordance with some embodiments of the invention. The nets are associated with a constraint (not shown). The halos 950, 952 around the nets 912, 913 are displayed in a randomized highlighting style. The randomized highlighting style uses randomly-placed dots to create a visual appearance in which the dots appear to be sprayed onto the image.

FIG. 9E is an illustrative drawing of halos 960, 962 formed by a dotted line in a schematic diagram in accordance with some embodiments of the invention. All segments of the net may have halos, even if there are several disjoint, i.e., unconnected, segments. An attempt may be made to join these disjoint segments. An interconnect halo segment 966 that joins the two net halos 960, 962 is shown as an arc 966 in a dashed line style. In one aspect, when drawing the arcs, the longest co-linear segment of the first net is joined to the longest co-linear segment of the second net, with the arcs starting from the centers of these segments. In another aspect, the name of the constraint may be placed on the arc 966 between the nets 912,913.

Different styles may be used for highlighting nets because, when displaying a halo around a net, and in particular, joining haloed nets together with connecting segments, it becomes difficult to visually distinguish net halos from halos of other design objects such as transistors. Also, since nets tend to be vertical or horizontal straight lines, two nets are likely to be co-linear, and the halo around the two nets will appear to be around a single net. Furthermore, the interconnect halo segments between two instances may actually run along a net, giving the net the appearance of being a net halo. Therefore, in one aspect, the net halos use a different line style, e.g., dashes or randomized highlighting, and the joining segments between them are replaced by arcs 966, which may also be displayed using dashed or randomized highlighting.

In one aspect, when a constraint applies to a currently displayed net object and to a member higher in the design hierarchy than the currently displayed net object, an up-connector is drawn. The up-connector may be a pin-like up-connector joined by arcs, or a circle of a fixed size, or other symbol of similar intent. When a constraint applies to a currently displayed net object and to a member deeper in the design hierarchy than the currently displayed net object, the instances which contain the members are haloed and joined to the net via an arc in a similar manner to it being part of an instance constraint.

Figure 10:
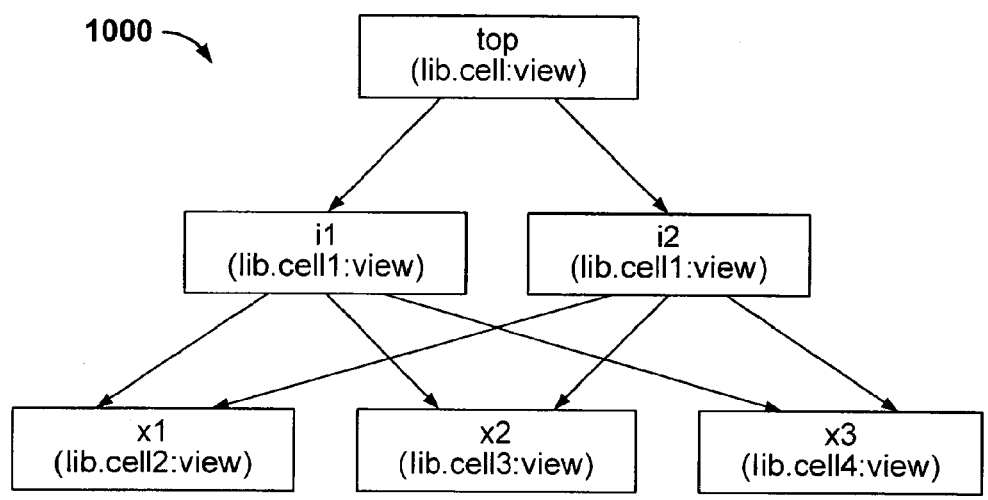
FIG. 10 is an illustrative drawing of a design hierarchy of a circuit in accordance with some embodiments of the invention.

FIG. 10 is an illustrative drawing of a design hierarchy of a circuit in accordance with some embodiments of the invention. The design hierarchy in essence comprises a data structure encoded in a computer-readable medium. In the top level design, which is referred to as a cellview, there are two instances, i1 and i2, and each of these are of the same master cellview, so they both include three instances x1, x2 and x3. If the user navigates from the top level of the design into instance i1, the fully qualified hierarchical path of the instance x1 is denoted as /i1/x1. Similarly, if the user navigates from top design into instance i2, the fully qualified hierarchical path of the instance x1 is denoted as /i2/x1. As can be seen, an instance can have more than one unique path. The path depends upon the instances that have been traversed to reach a particular instance, and each such path denotes an occurrence of an instance. If i1 or i2 happen to be instances of a schematic or layout, the application may allow the user to visually perceive the instance x1 directly, without having to explicitly navigate down (also known as a descend operation) into either of i1 or i2. Whether or not the user is able to visually perceive the instance x1 depends upon how the hierarchy is being rendered. An EDA application typically renders the first few levels of a design hierarchy. The start level for a display window usually denotes the starting point for the hierarchy, which gets rendered. The stop level for a display window usually denotes the last level of the hierarchy which is rendered. A user typically has control over changing these start/stop levels values dynamically, thereby causing the EDA application to show/hide design details being rendered. An EDA application may allow the user to directly edit the visually perceivable lower levels of the hierarchy from within the higher levels itself. This feature is known as the Edit-In-Place (EIP) operation.

Referring to FIG. 10, the user may apply a constraint between, for example, x1 and x2 in all instances of lib.cell: view. In that case, the constraint's storage will be in lib.cell.view. The member names x1 and x2 are not fully qualified, i.e., the names do not begin with a '/' character. That is an example of a cell-constraint. Note that a constraint member is an object, such as a design object, to which a constraint applies. When a cellview that has a cell constraint is instantiated, all instances of that cellview, i.e., master, inherit the cell constraints. That is, the cell constraint applies to all occurrences of the objects in the master design. In such as case, if the user opens a window displaying the top cellview, then descends into either i1 or i2, they will see the same constraint being visualized using transparent halos (either displayed as an overlay or as an underlay). The Constraint Visualization Engine also supports the visualization of cell constraints, which apply to all occurrences of the objects in design. A cell constraint can be associated with a cell. As described above with respect to FIG. 1D, a cell is, in one aspect, a template from which a set of design objects can be replicated on the design canvas multiple times. A cell constraint constrains instances inside the cell. The cell constraint automatically applies to any other instance of the cell that appears in the of design hierarchy, and constrains the design objects inside each such instance. For example, a cell constraint that constrains two instances inside a cell may be represented as a tuple (sub-constraint, cell, instance a, instance b). For each instance of the cell in the design, the sub-constraint will be applied to both instance a and instance b.

In addition, if a user specifies a second constraint (of different type) between/i1/x1 and /i1/x2, such that the storage of the constraint is within the top level cellview lib.cell.view, and the member names, e.g., /i1/x1 and /i2/x2, are fully qualified, i.e., begin with a '/' character, then this constraint is an example of an occurrence constraint. If a user opens two windows, both starting from the top level, with one window descending into i1 and the other window descending into i2, for the window on i1, the user will see two constraints, while the other window on i2 will only display one constraint.

Given that the constraints can be placed on either specific occurrences (an occurrence of instances, nets, terminals or pins) in a design or on all occurrences of objects in a design, the constraint visualization technique is able to support occurrence-specific figures. If the user has created a constraint for one particular occurrence, then it will only appear in windows opened on the design which have that particular occurrence.

Figure 11:
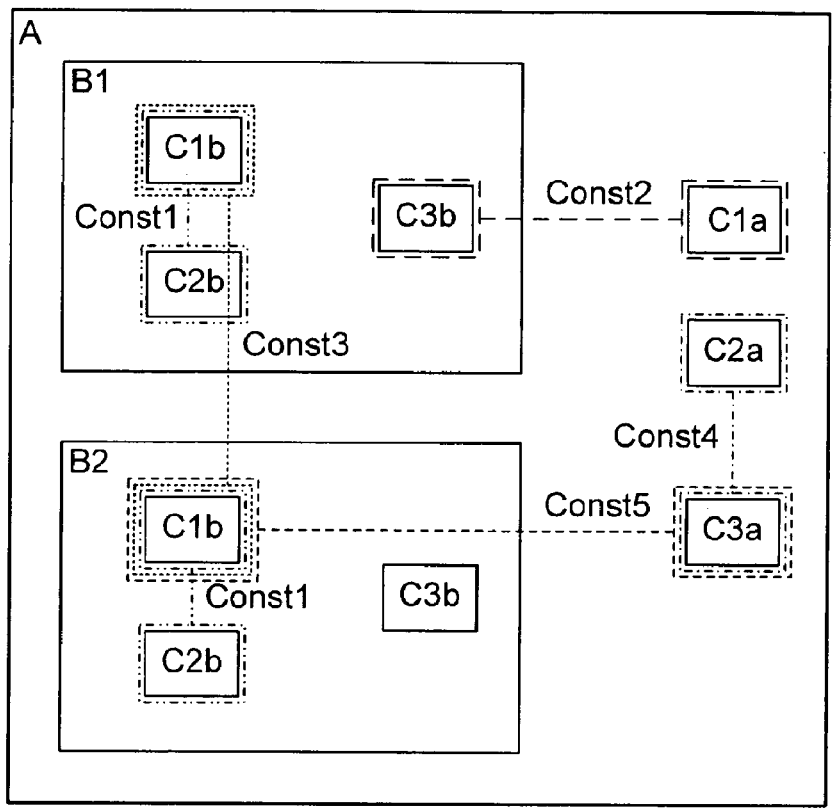
FIG. 11 is an illustrative drawing of cell constraints and occurrence constraints in accordance with some embodiments of the invention.

FIG. 11 is an illustrative drawing of cell constraints and occurrence constraints in accordance with some embodiments of the invention. An occurrence constraint is a constraint that is defined on a particular design object. A cell constraint is a constraint that is defined on a cell and applies to instances of that cell. FIG. 11 shows an example flattened schematic hierarchy for illustrative purposes, with a top level Cell A, which has two instances of Cell B, named B1 and B2, and three instances of Cell C, named C1a, C2a, and C3a. In Cell B1, there are three instances of Cell C: C1b, C2b and C3b. Cell B2 also has three instances of Cell C: C1b, C2b, and C3b, which are different from the instances of C in B1. Therefore, the instances of C in B1 can be referred to as A/B1/C1b, A/B1/C2b, and A/B1/C3b, and the instances of C in B2 can be referred to as A/B2/C1b, A/B2/C2b, and A/B2/C3b.

The following constraint relationships, which all have two members, have been defined in FIG. 11:

---

Const1: {B}C1b -> C2b
Const2: {A}C1a -> B1/C3b
Const3: {A}B1/C1b -> B2/C1b
Const4: {A}C2a -> C3a
Const5: {A}B2/C1b -> C3a

---

The name in braces is the Cell where the constraint is defined, i.e., where the constraint has its storage. For example, Const1 is defined in Cell B. For the sake of simplicity, references to the Library which contains the Cell have been omitted.

In the symbolic diagram shown in FIG. 11, each of the constraints has been drawn as a separate box around the instances, with interconnect halo segments shown crossing the boundaries, and with a different color for each constraint (as would occur when each constraint is of a different type). However, this appearance might not be the way that the constraints will be visualized in a schematic. A user typically may not see multiple levels simultaneously, and the overlay boxes would be overlapping and alpha-blended halos around the instances. FIG. 11 is shown for explanatory purposes, and, like the other figures, is not necessarily an exact representation of a display view generated by an EDA tool. Multiple design levels such as A, B1, and C1b are generally not displayed simultaneously in an EDA tool, and the overlay boxes would be overlapping and alpha-blended halos around the instances. Note that in layout views or schematic views, when the user has performed an edit-in-place, or set has the display stop levels, interconnect halo segments typically will be displayed as shown in FIG. 11. As before, the boxes would be the composite of the transparent halos.

Figure 12:
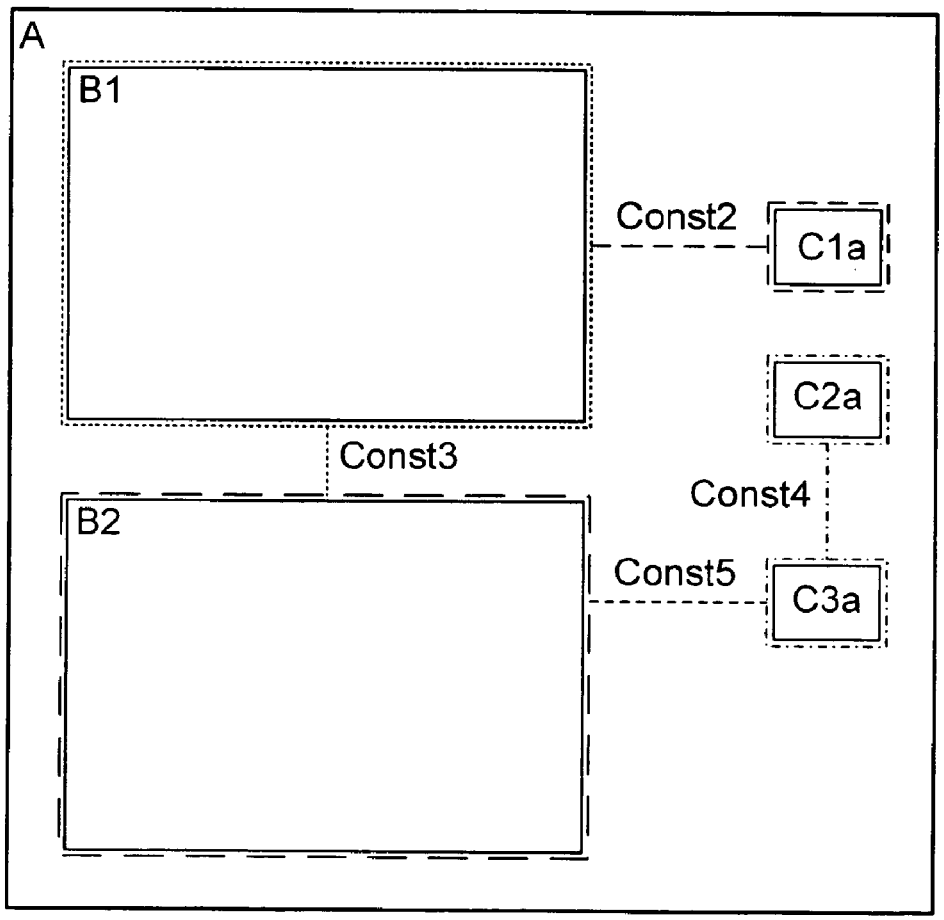
FIG. 12 is an illustrative drawing of constraint visualization in a cell in accordance with some embodiments of the invention.

FIG. 12 is an illustrative drawing of constraint visualization in a cell in accordance with some embodiments of the invention. FIG. 12 shows how the constraints in a top level Cell A will be visualized if B1 and B2 are instances of symbols. Instances are displayed in the user interface of the EDA tool as rectangular boxes. The contents of the instances are typically not displayed at the hierarchy level in which the instances are located, although the user can expand the instances to view their contents by selecting a command, which will typically display a lower design level. Accordingly, at the design level corresponding to A, the contents of the two B Cells cannot be seen, and only the individual constraints at the top level can be seen, with overlapping halos.

Figure 13A:
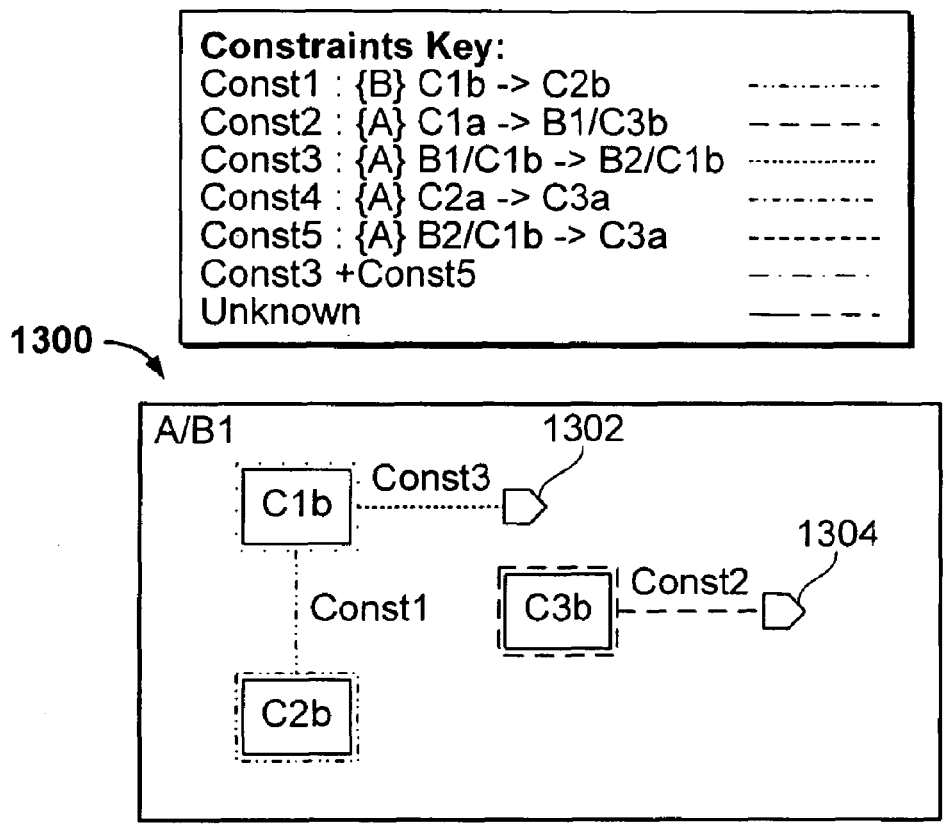
FIGS. 13A and 13B are illustrative drawings of constraint visualization in occurrences in accordance with some embodiments of the invention.
Figure 13B:
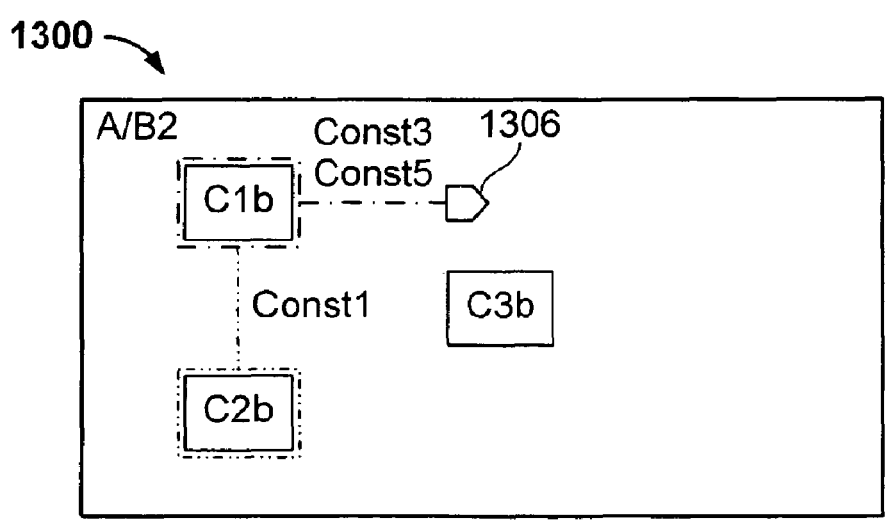

FIGS. 13A and 13B are illustrative drawings of constraint visualization in occurrences in accordance with some embodiments of the invention. If the user descends into instance B1, they will see the constraints as shown in the symbolic diagram of FIG. 13A. At this level of the design hierarchy, the user will see Const1, Const2 and Const3, with up-connectors 1302, 1304 shown for the latter two because those two occurrences are associated by constraints with occurrences that can be reached by passing up through the design hierarchy. In particular, Const2 is associated with the design object C1a in A, which is located one level above B1 in the hierarchy. Const3 is associated with the design object C1b in B2, which can be reached by passing up through A and then back down to B2. In the user interface, if the user were to ascend, and then descend into B2, they will see the different display, as shown in the symbolic diagram of FIG. 13B. In this case, the user will still see Const1 and Const3, but will not see Const2, which is occurrence specific to A/B1 and will see Const5. Rather than displaying an up-connector per constraint instance (e.g. C1b could have had two up-connectors because it is associated with two constraints), only one up-connector 1306 is typically displayed attached to each instance. An up-connector that leads to multiple instances is typically displayed in a blend of colors, with multiple labels.

Figure 13C:
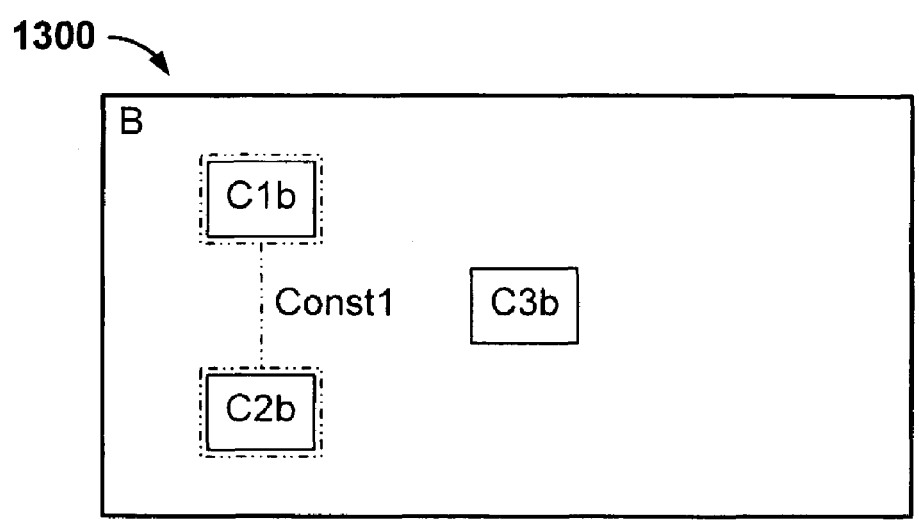
FIG. 13C is an illustrative drawing of constraint visualization in a cell opened as a new top level in accordance with some embodiments of the invention.

FIG. 13C is an illustrative drawing of constraint visualization in a cell opened as a new top level in accordance with some embodiments of the invention. If the user were to open up Cell B directly, it would become the new design top-level. Const1 would be the only constraint defined, and the display would be as shown in FIG. 13C.

Figure 14:
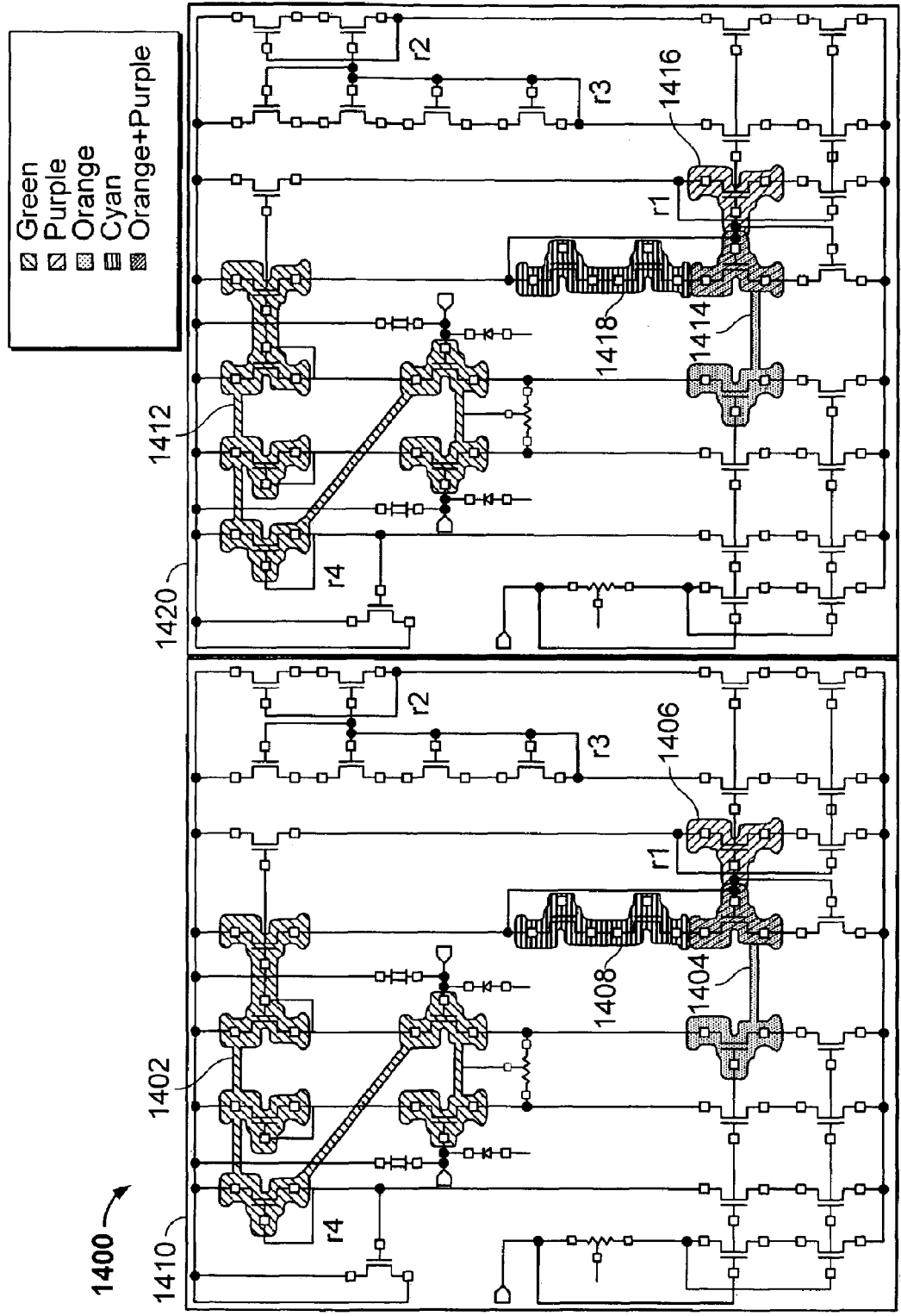
FIG. 14 is an illustrative drawing of cell constraint visualization in a schematic diagram view in accordance with some embodiments of the invention.

FIG. 14 is an illustrative drawing of cell constraint visualization in a schematic diagram view in accordance with some embodiments of the invention. FIG. 14 shows a schematic that has two schematic instances, a left instance 1410 and a right instance 1420, of a master cell (not shown). An EDA application displays the details of the instances' master design. In FIG. 14, the master design has four cell constraints. In one aspect, the cell constraints apply to all occurrences of the constrained instances in the master design. The constraint is entered once, when the master cell is defined, but is automatically associated with each instance of the master. In this example, the constraint has automatically been associated with the left instance 1410 and the right instance 1420. There is computer program code to achieve this automatic association. An attempt to visualize these four cell constraints at the top level design cause eight large halos to be generated with each instance displaying four large halos. The left instance 1410 shows four large halos 1402 1404, 1406 and 1408 and the right instance 1420 also shows four large halos 1412 1414, 1416 and 1418 after an attempt is made to visualize the four cell constraints.

There is computer program code to support visualization of occurrence constraints, and there is computer program code to support visualization of cell constraints. An occurrence constraint is a constraint that is defined on a particular design object. A cell constraint is a constraint that is defined on a cell and applies to instances of that cell. Unlike occurrence constraints in which the visualization only appear in windows opened on the designs which have the desired occurrence, for cell constraints, all occurrences of the cell constraint are searched in all windows and each occurrence is then visualized separately.

Figure 15:
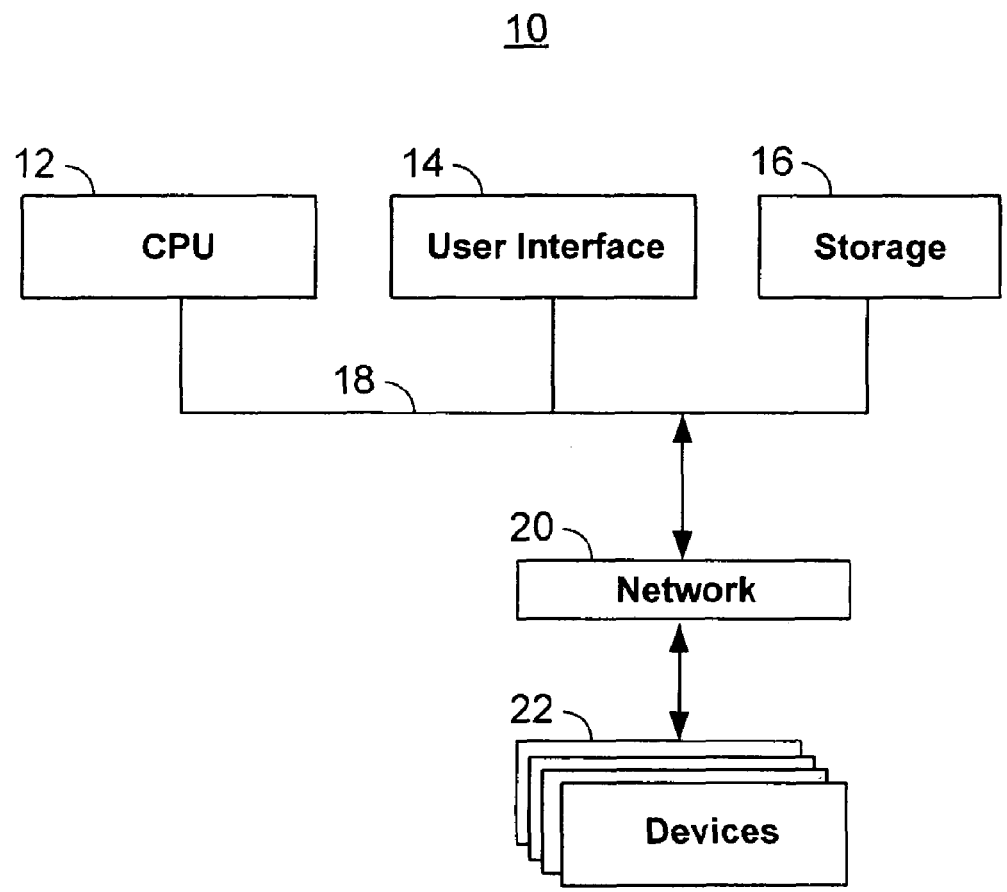
FIG. 15 is an illustrative schematic diagram of a computer system that can provide constraint visualization in accordance with some embodiments of the invention.

FIG. 15 is an illustrative schematic diagram of a computer system that can provide constraint visualization in accordance with some embodiments of the invention. The computer system 10 includes one or more central processing units (CPU's) 12, a user interface 14, computer readable storage media 16, a system bus 18, and one or more bus interfaces for connecting the CPU, user interface, memory and system bus together. The computer system also includes a network interface 20 for communicating with other devices 22 on a computer network.

Figure 18A:
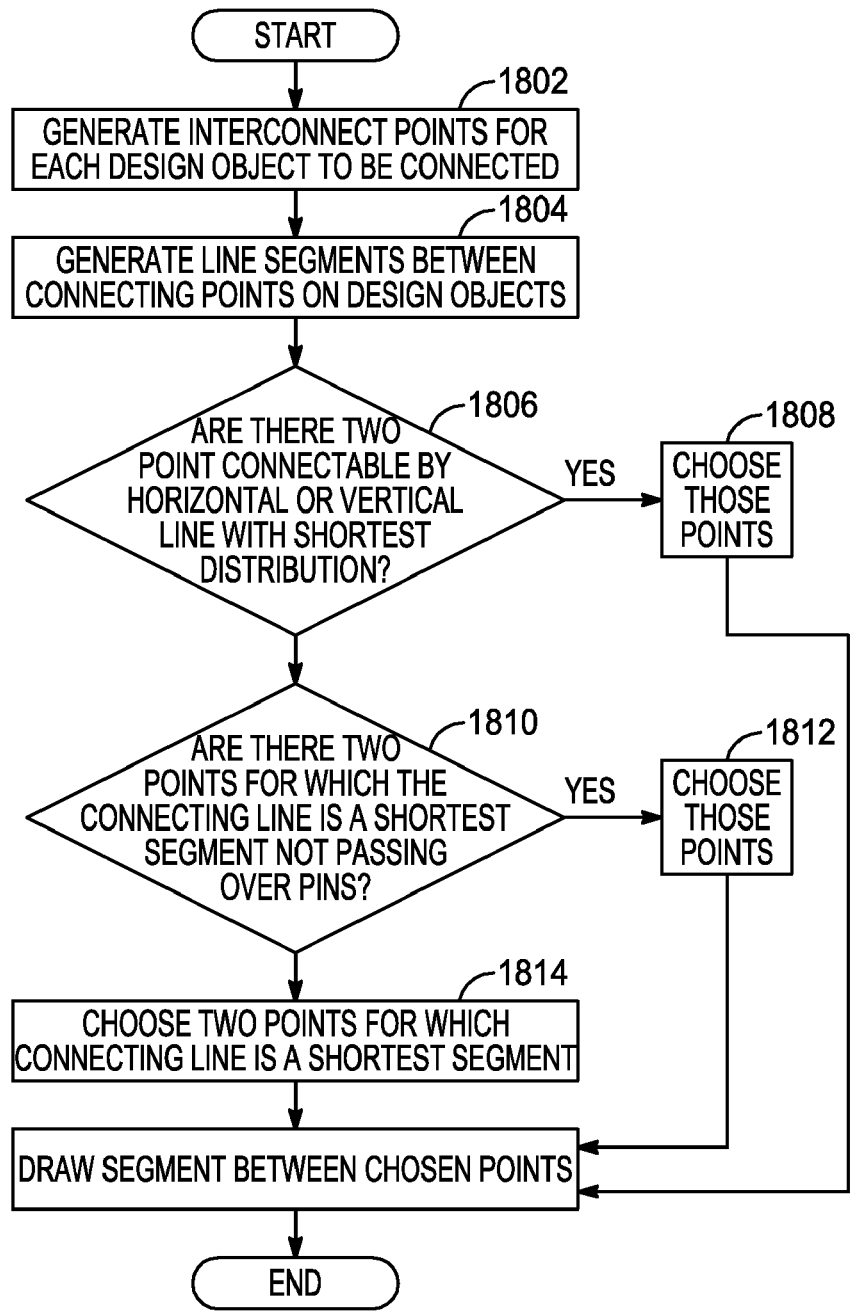
FIG. 18A is an illustrative flow diagram of a computer program based process to generate interconnect halo segments to visually connect design objects in accordance with some embodiments of the invention.

Computer-readable code such as code for implementing the interconnect halo segment generation process of FIG. 18A or the highlight generation process of FIG. 18B and FIGS. 19A-19C can be stored in the storage memory 16 and used to control the CPU 12. The computer program instructions can cause the CPU 12 to produce highlighted regions such as the transparent halos of FIGS. 1B, 1C, and 1D in the user interface of an EDA tool.

Figure 16:
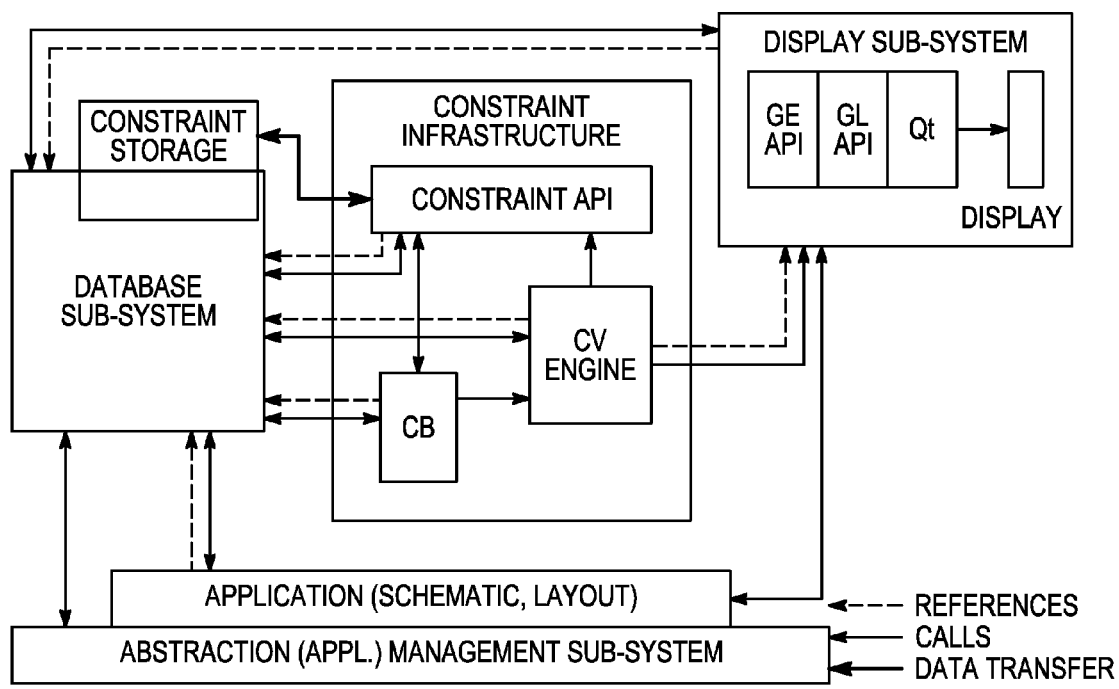
FIG. 16 is an illustrative block diagram of a system architecture that provides constraint visualization in accordance with some embodiments of the invention.

FIG. 16 is an illustrative block diagram of a system architecture that provides constraint visualization in accordance with some embodiments of the invention. The system architecture is implemented in computer program code to be executed on a computer system. The main components of this constraint infrastructure include a constraint application programming interface (API), a constraint manager, a constraint visualization engine, and a graphics layer. The constraint API provides routines for constraint entry at the logical (schematic abstraction) as well as physical (layout abstraction) level. No restriction has been imposed on the hierarchical nature of the constraint members i.e., the constraint members can map to design objects that may be placed at the same or different levels of design hierarchy. The constraint API also provides routines for constraint transformation from logical to physical design abstractions and vice-versa.

The constraint manager is, for example, a table based widget that uses the constraint API to allow accelerated constraint entry plus constraint browsing and editing capabilities. The browser allows the designers to specify constraint members, by way of canvas selections. It invokes the constraint visualization engine, described next, to display constraints and constraint members selected in the constraint browser.

The constraint visualization engine allows the constraints to be displayed on the canvas using transparent halos. Transparent halos are a graphics technique provided by a Graphics Layer (GL) library and are made available by a Graphics Editor (GE) package through a hilight infrastructure, which allows design objects placed at various levels of design hierarchy to be highlighted. The GL/GE API draws on the highlight plane with a special pen to produce the halo effect. In addition, the GL/GE API provides routines for setting the halo attributes such as its transparency (0%-100%), position (underlay or overlay), color, and width (thin, normal, thick, or any other width). Other graphics libraries such as OpenGL could be used to equal effect without departing from the spirit of the present invention.

Figure 17:
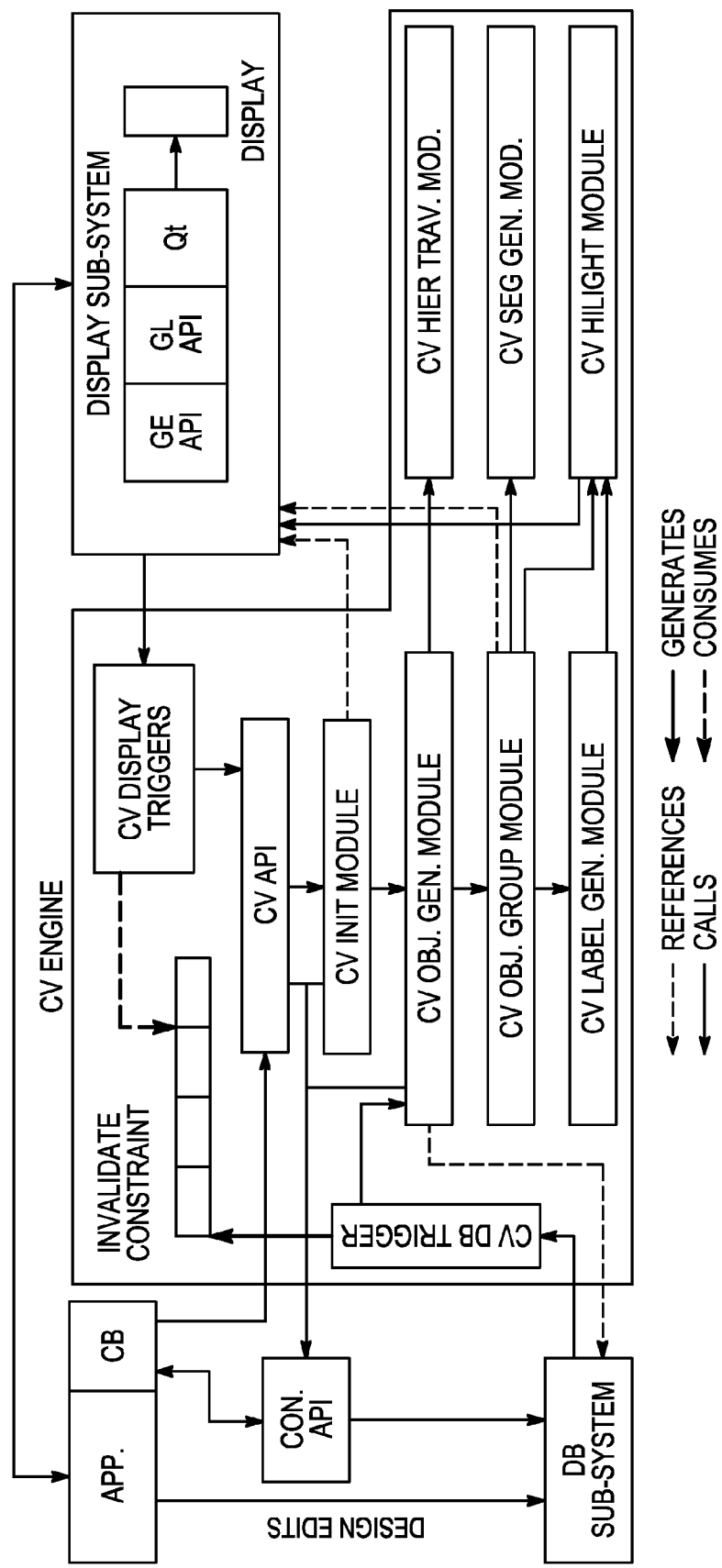
FIG. 17 is an illustrative block diagram of a constraint visualization engine architecture in accordance with some embodiments of the invention.

FIG. 17 is an illustrative block diagram of a constraint visualization engine architecture in accordance with some embodiments of the invention. The visualization engine architecture is implemented in computer program code to be executed on a computer system. With respect to FIG. 15, the constraint visualization engine is a computer program encoded on a computer readable medium that runs on the CPU 12 and generates portions of the user interface 14. Selections made in the Constraint Manager causes the Constraint Visualization API to be called to visualize the selected constraints. Interactive design edits are tracked by the constraint visualization engine's triggers. The visualization technology is not limited visualization of schematic or layout objects.

The visualization engine includes an application programming interface (API), an initialization module, an object generation module, a hierarchy traversal module, an object grouping module, a segment generation module, a label generation module, an object highlight module, and constraint visualization triggers. The Constraint Visualization Engine exports its capabilities through an API and is best used in conjunction with another widget such as a Constraint Manager. Selections made in the Constraint Manager, or explicit Constraint Visualization API calls, cause the constraint to be visualized on the EDA tool's design canvas. The API includes routines for performing the following operations: visualization of constraints in a display window, removal of visualized constraints from a display window, visualization of all or only some members of a constraint, and specifying values for the display attributes (width, transparency, color) of transparent halos. The initialization module processes a constraint specified by an identifier (ID) by calling the constraint API to generate information about the constraint and its members. The initialization modules verifies the API arguments, registers the constraint name and storage information to be accessed later, and also calls the GE API to create empty highlight sets, which will be populated by the Object Grouping Module.

As the constraint information is represented internally by textual data (constraint name, member name, hierarchy path, etc.), the Object Generation Module, uses the textual data, e.g., constraint member names such as MP12, to generates actual design object identifiers that correspond to constraint members. The object generation module may map constraint member type to various design objects. For example, if the constraint member type is instance, the modules generates the corresponding design instance object and if the constraint member is of type "net, terminal, or pin", then the object generation module generates all the images corresponding to that "net, terminal or pin."

For names that are hierarchical in nature such as (TOP/INV/MP0), the object generation module parses the entire name string and attempts to generate the design object(s), as per the visible hierarchy. For example, if the constraint member to be visualized is TOP/INV/MP0, where TOP is the top level schematic and INV is an inverter schematic instantiated inside TOP, the object generation module would generate the instance ID of MP0 in INV and would return the ID and the hierarchical path and the effective transformation. The transformation would include a location, an orientation, and a magnification. However, if INV is an inverter symbol instead of an inverter schematic, the module would return the instance ID of the symbol instance INV inside TOP and the associated hierarchical path and transformation.

To support the visualization of both cell constraints and occurrence constraints, the object generation module works in conjunction with the hierarchy traversal module. For cell constraints, which are recognized as constraint member names that do not begin with a leading '/' and are not fully qualified e.g. "I0/I1/I2", the hierarchy traversal module searches for all possible occurrences of the constraint cell in a given hierarchy. For each such occurrence, the hierarchy traversal module prefixes the occurrence path ahead of the constraint member name to make a fully qualified member name string, to generate actual object identifiers.

For occurrence constraints, recognized by constraint member names that begin with a leading '/' and thus are fully qualified e.g. "/TOP/I0/I1/I2", the hierarchy traversal module searches for design objects for which the constraint storage location matches the top of the design hierarchy. For both cell and occurrence constraints, the hierarchy traversal modules generates occurrence path strings on the basis of the design that is currently visible in a given window. For example, if the constraint member name is "/TOP/MID/I0", and the window is showing design TOP, the search for I0 would start from the TOP cellview. However, if the window is showing the occurrence of design /TOP/MID, the search starts from MID. Object filtering on the basis of hierarchy display start and stop levels is also done by these two modules.

After the constraint design objects have been generated, the object grouping module partitions the design objects depending upon their locations and decides how the design objects get connected to each other. The main task of this module is to generate the non-intersecting interconnect halo segments. The object grouping module uses the segment generation module to generate optimum interconnect halo segments between constraint design objects. The object grouping process is recursive. The object grouping process takes a list of constraint objects as an input and is responsible for generating interconnect halo segments for that group of objects. The object grouping process is also responsible for calling the appropriate API to display halos around objects and interconnect halo segments. The object grouping module may also draw an up-connector on the constraint design objects, and may place the up-connector in the top-right position of the display window.

The Segment Generation Module generates optimum interconnect halo segment between any two given constraint design objects. In case of constraint objects that are instances of symbols, the connecting segments do not begin (and end) at instance pins. Instance pins are avoided so that they will be free for devices' interconnections with wires. In addition, care is taken that the interconnect halo segment does not overlap with the instance pins of the two constraint objects, if any. The Segment Generation Module automatically computes a set of optimum interconnect points for a given design object, other than the pin locations.

The Label generation Module is responsible for showing the constraint name labels. The constraint name is displayed as a separate label in same style/color as the object halo. The label appears on the up-connector if it is present. If there is no up-connector, a different sophisticated approach is adopted while displaying constraint name label.

The Object Hilight Module, which includes a set of wrapper API functions over the GE Hilight API, is called to generate halos around the constrained design objects, interconnect halo segments, constraint labels, etc.

Interactive editing of the design is handled by Constraint Visualization Triggers. The engine has its own database trigger which it registers with the design database to keep itself aware of edits being done to the design in order to generate a list of constraints that need to be invalidated after edits of the circuit design have been performed. The engine also has its own display trigger which it registers with the GE. The display trigger is responsible for invalidating the constraints in the invalidate constraint list generated by the database trigger. In addition, the engine also registers an application trigger and a post-install trigger with the design editor layer, which is a layer that enables various sub-tools that allow editing of different abstractions such as schematic and layouts. The design editor layer also allows various triggers to be specified during the abstraction registration, which are responsible for various actions including the opening of design database and creation of window contexts that can be viewed and descended etc.). The application trigger is called in order to do destroy the existing visualizations before a window is closed and the post-install trigger allows the registered constraints to be visualized in new window which get opened up.

FIG. 18A is an illustrative flow diagram of a computer program based process, encoded on a computer readable medium, that generates the end points of an interconnect halo segment to visually connect two design objects in accordance with some embodiments of the invention. The segment generation process generates the end points of a segment between a given first constraint member and a given second constraint member: The segment generation process is performed for each member of the constraint. A member of a constraint is typically a design object to which the constraint applies, i.e., a design object, such as a transistor or cell, associated with the constraint.

Block 1802 determines a set of interconnect points for each constraint member. If the constraint member is a simple geometric shape such as a line, rectangle, polygon, or the like, the interconnect points are chosen based upon the type of shape. For example, if the shape is a line, the interconnect points are the line's two endpoints. If the shape is a rectangle, the interconnect points are the rectangles four corners. If the shape is a polygon, the interconnect points are the polygon's vertices. In FIG. 6A, the set of interconnect points 602, 604 for a wire represented by a line shape are encircled.

If the constraint member is an instance of a device symbol, then a set of interconnect points for the instance are generated based upon the constituent geometric shapes that make up the device representation. The interconnect points are generated for the instance master so that the points can be cached and re-used, after applying a simple geometric transformation, for all instances of the master without being recomputed for each instance. To determine the interconnect points of an instance, a subset of the constituent geometric shapes that make up the device symbol but do not directly connect its pins is generated. The interconnect points of the constituent geometric shapes form the interconnect points for the symbol. In FIG. 6B, the set of interconnect points for the transistor are shown encircled, such as a point 606. The points that were excluded are shown as squares 604,606,608. For a symbol (such as a symbol for a pin), if all shapes happen to be directly connected to pin shapes, then the points from those are cumulated to get the interconnect points for the symbol. In FIG. 6C, the interconnect points of a pin symbol 600 are encircled. To prevent discernible delays when displaying constraints, the interconnect points of a given symbol are calculated once and cached. To determine the interconnect point for an instance, the points are transformed according to the instance transform before use. An instance transform is a matrix that includes instance location, orientation, and magnification attributes.

If the constraint member is an instance of a schematic design, then a set of interconnect points for the instance are generated by generating the interconnect points for the instance master i.e., for the master schematic. The interconnect points for the master schematic are the four corners of its bounding box. To prevent discernible delays when displaying constraints, the interconnect points of a schematic are calculated once and cached. To get the interconnect point for an instance, the points are transformed according to the instance transform before use.

The process then considers all segments that could be generated between the two design objects by choosing a point on each of the two design objects to be connected. Block 1804 generates all possible line segments that can be formed between an interconnection point on the first member and an interconnection point on the second member. Block 1806 determines if there are two points for which the corresponding line segment is a horizontal/vertical line with shortest distance. If two such points exist, block 1808 chooses those points. Otherwise, if no such pair of points exists, block 1810 determine if there are two points for which the connecting line is a shortest segment that does not pass over the pins of either design object. If two such points exist, block 1812 chooses those points. Otherwise, if no such pair of points exists, block 1814 chooses a pair of points for which the connecting line is a shortest segment between the two design objects to be connected.

Figure 18B:
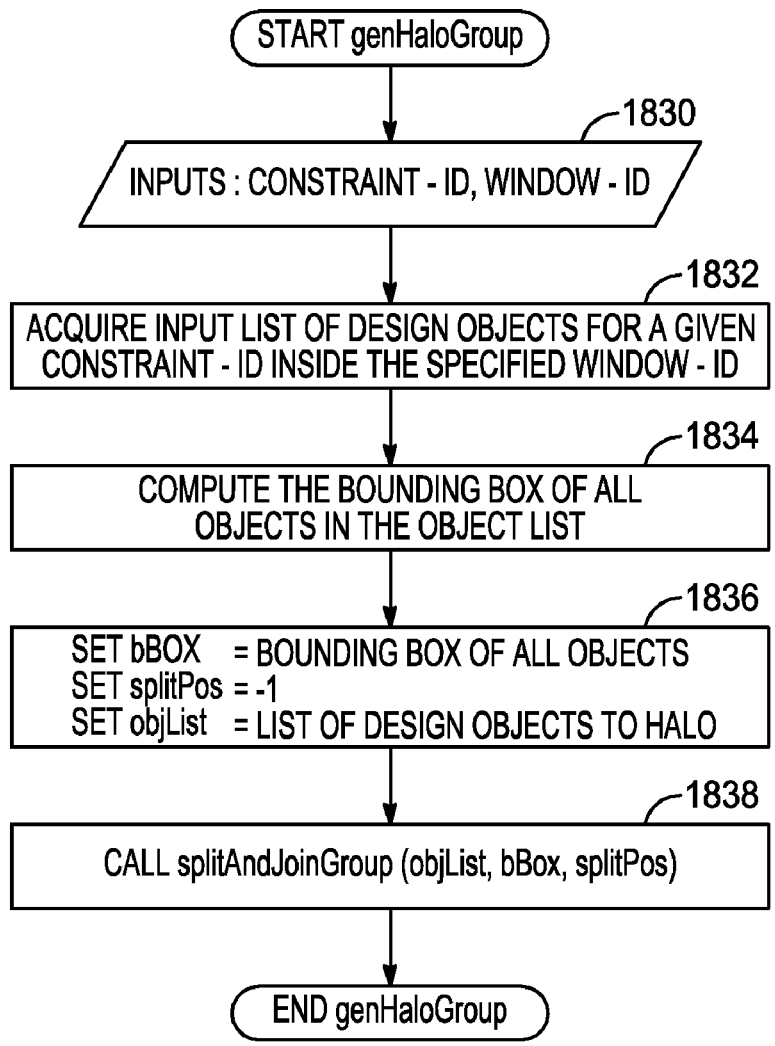
FIG. 18B is an illustrative flow diagram of a computer program based process to generate halo features for a group of design objects in accordance with some embodiments of the invention.

FIG. 18B is an illustrative flow diagram of a computer program based process to generate halo features for a group of design objects in accordance with some embodiments of the invention. The halo group generator process of FIG. 18B generates a halo around a group of objects by invoking the object grouping process of FIGS. 19A-19C. The halo group generator process accepts a constraint identifier and a window identifier at block 1830. The constraint identifier identifies the constraint for which a halo is to be generated. That is, a halo will be generated around design objects that are associated with that constraint. The window identifier identifies a user interface window on a computer display. The halo will be generated for the window specified by the window identifier.

Figure 19A:
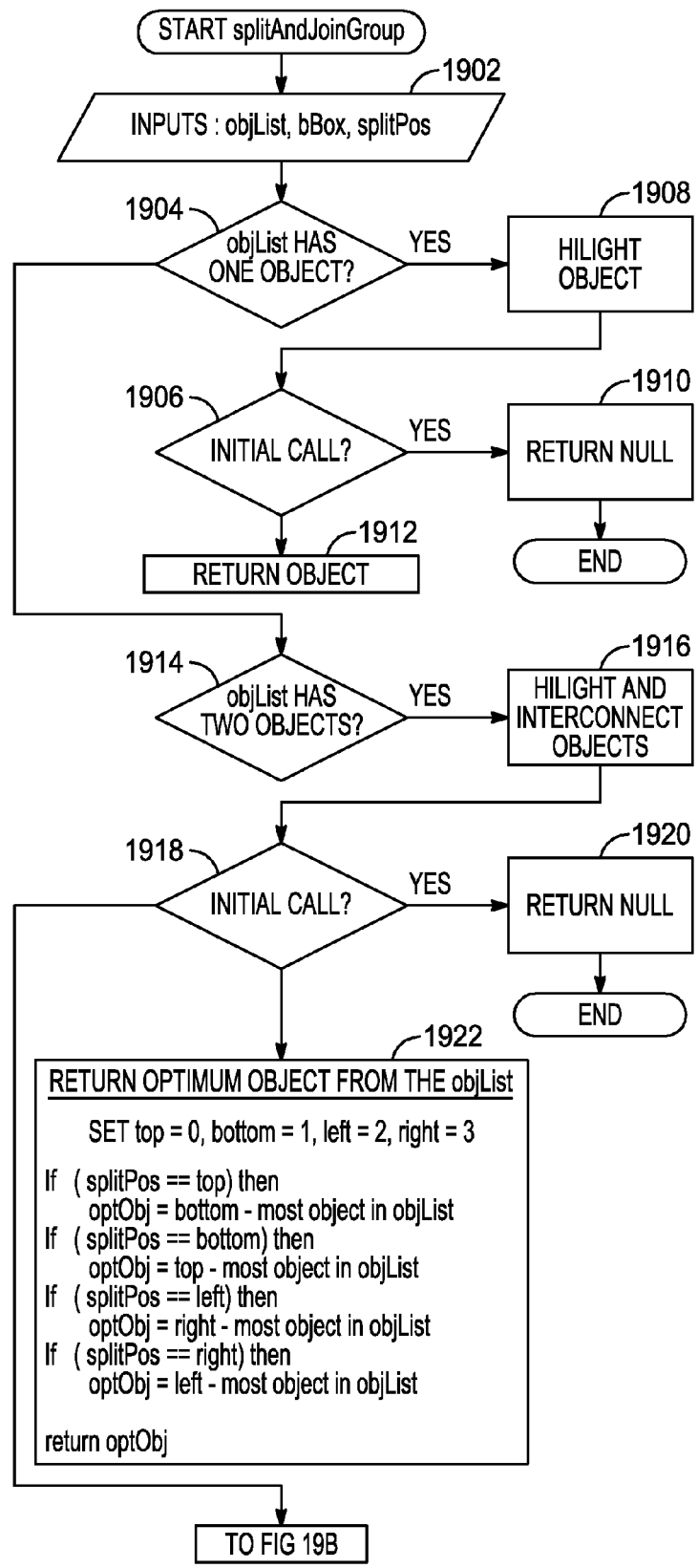
FIGS. 19A-19C are illustrative flow diagrams of a computer program based process to generate highlight features in the proximity of design objects and interconnect halo segments in accordance with some embodiments of the invention.
Figure 19B:
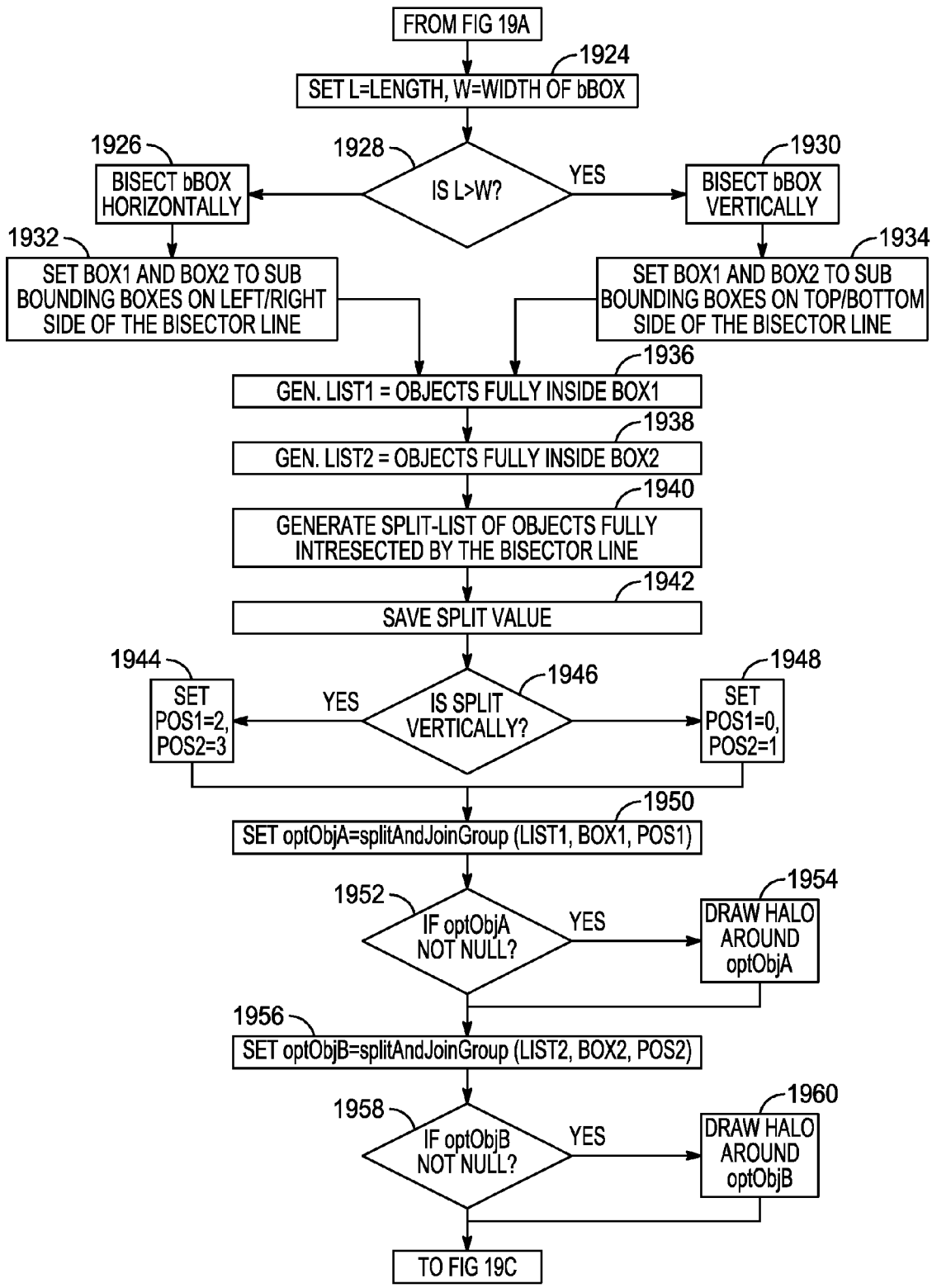
Figure 19C:
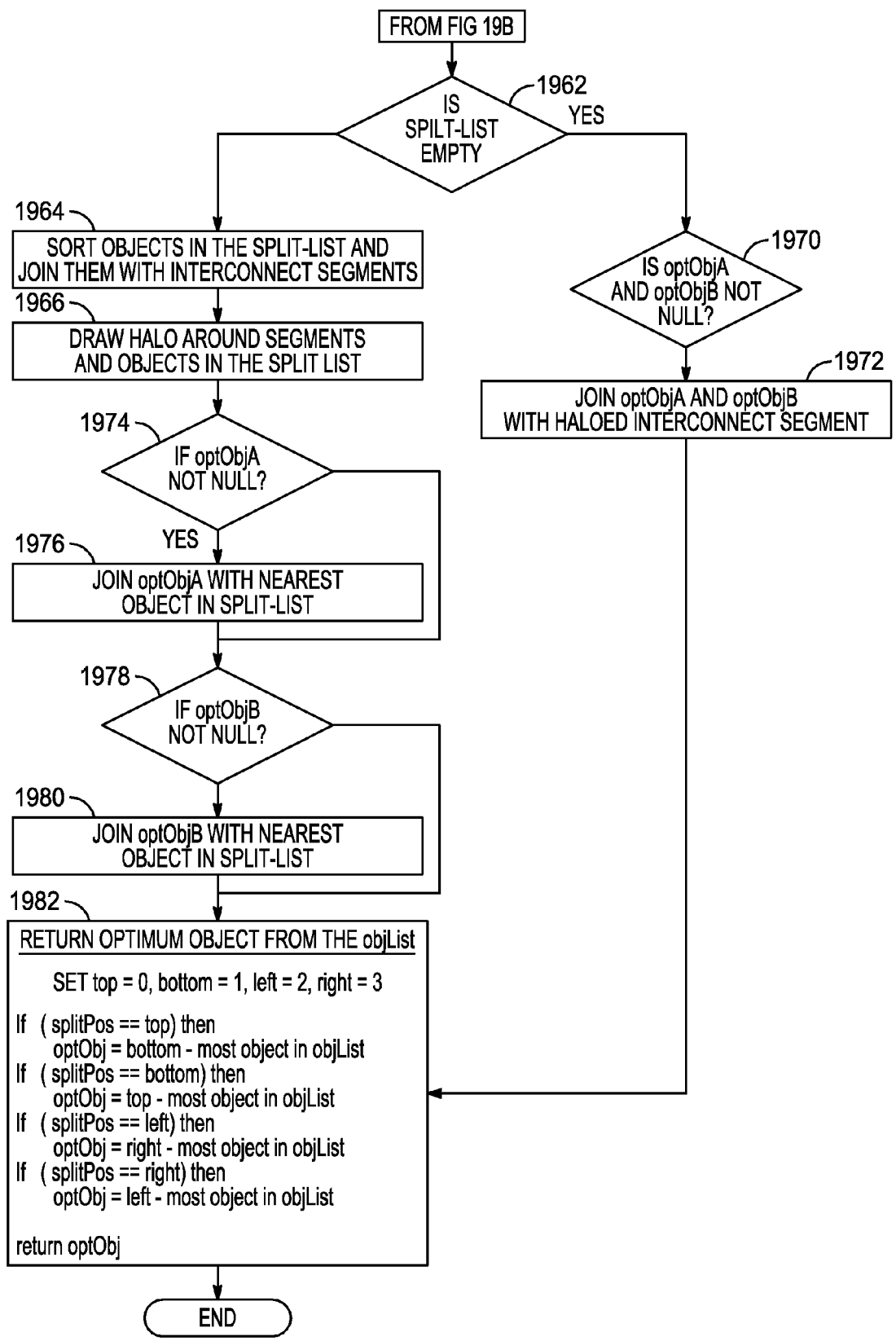

Block 1832 acquires an input list of design objects for which a halo is to be generated. The design object list may be acquired from a data structure that associates design objects with the constraint identifier. Block 1834 computes the bounding box of all objects in the design object list. The bounding box is a rectangular region that encloses the graphical representation of the objects in the design object list, as displayed on the design canvas. In one aspect, a bounding box is the smallest rectangle which entirely encloses the objects in the design object list as those objects are displayed on the design canvas. Block 1838 calls the splitAndJoinGroup subroutine, which is illustrated in FIGS. 19A-19C. Block 1838 passes the design object list, the bounding box, and a split position value of (−1) to the splitAndJoinGroup subroutine. The value (−1) indicates that this call to splitAndJoinGroup is the initial call.

FIGS. 19A-19C are illustrative flow diagrams of a computer program based process, encoded on a computer readable medium, for generating highlight features in the proximity of design objects and interconnect halo segments in accordance with some embodiments of the invention. FIG. 19A shows a first portion of the process, FIG. 19B shows a second portion of the process, and FIG. 19C shows a third portion of the process. The object grouping process accepts a list of design objects as input and generates interconnect halo segments for that group of objects. The object grouping process attempts to generate non-intersecting segments. The object grouping process calls the appropriate application programming interface (API) to generate highlight features, i.e., halos, around design objects and interconnect halo segments.

The object grouping process splits a region of the circuit design into two halves and recursively processes each half. The process may split a region either horizontally or vertically into two regions separated by a bisector line. The process uses a "split direction" state variable to represent the direction (horizontal or vertical) of a split and the side of the bisector line (left/right or top/bottom) of the split. In one example, the split direction indicates whether the split is horizontal (e.g. 0 or 1) or vertical (2 or 3). A split direction value of 0 indicates interconnection in the upper half and a value of 1 indicates interconnection in the lower half. Similarly, a value 2 indicates interconnection in the left half, and a value of 3 indicates interconnection in the right half.

When the object grouping process is initially invoked, there is one set of objects to be processed. The initial set is not a result of a prior split. Therefore, the split direction is set to a negative value (−1) in the first invocation of the process. The object grouping process returns an optimum object from the input list of objects. The optimum object is decided based upon the split direction as explained below. The object grouping process invokes itself recursively, supplying a list of objects as an input. The list of objects is generally smaller for each recursive invocation. The recursion terminates when the process is invoked with two (or fewer) objects in the input list.

The object grouping process represented as a subroutine named splitAndJoinGroup. The splitAndJoinGroup subroutine begins at block 1902 by acquiring an object list, a bounding box, and an initial split direction value. Block 1904 determines if the input list contains one object. If the input list contains more than one object, block 1904 transfers control to block 1914. If the input list contains a single object, block 1908 highlights, i.e., halos, the object. That is, a halo is drawn around, under, or over the object, as shown, for example, in FIG. 1D. Block 1908 then transfers control to block 1906. Block 1906 determines if the call is an initial call. If so, block 1910 returns NULL and processing is complete. Otherwise, if the call is not an initial call, block 1912 returns the object as a result, i.e., output, value.

Block 1914 determines if the input list contains two objects. If not, then the input list contains more than two objects, and Block 1914 transfers control to block 1924. If the input list contains just two objects, block 1916 highlights, i.e., halos, and interconnects the two objects by generating a segment using the segment generation process of FIG. 18A. Block 1918 determines if the currently-executing call of splitAndJoinGroup is an initial call. If the value of splitPos is (−1), then the call is an initial call, and block 1920 returns NULL to complete the currently-executing call. Otherwise, if the call is not an initial call, execution continues at block 1922.

Block 1922 returns the optimum object from the object list based on the splitPos, which is set in the invocations of splitAndJoinGroup at blocks 1950 and 1956, as described below. At block 1922, if splitPos has the value "top", then block 1922 sets the optimum object to the geometrically bottom-most object in the object list, as the object would be seen on the design canvas. Similarly, if split Pos has the value "bottom", then the optimum object is the top-most object in the object list. If splitPos has the value "left", then the optimum object is the right-most object in the object list. If splitPos has the value "right", then the optimum object is the left-most object in the object list. Block 1922 returns the optimum object. That is, if block 1922 is reached, it returns the optimum object, and the currently-executing call ends.

Block 1924 sets a variable named L to the length and a variable named W to the width of the overall bounding box. Block 1928 determines if L>W. If L>W, block 1930 bisects the bounding box vertically, .and block 1934 sets the variables box1 and box2 to refer to sub bounding boxes on the top and bottom side of the bisector line, respectively. Otherwise, if L<=W, block 1926 bisects the bounding box horizontally, and block 1932 sets box1 and box2 to refer to sub bounding boxes on the left and right side of the bisector line, respectively. The bisector line, which bisects the bounding box, is typically not displayed.

Block 1936 generates a list, named list1, of objects that are fully inside, i.e., enclosed within, box1. Block 1938 generates a list list2 of objects that are fully inside box2.

Block 1940 generates a list, named splitList, that contains objects that are intersected by the bisector line. Block 1942 stores the split direction, which is either vertical or horizontal, in a variable for later reference. The split direction is vertical if block 1930 bisected the bounding box vertically. The split direction is horizontal if block 1926 bisected the bounding box horizontally. Block 1946 determines if the split is vertical. If so, block 1944 sets a variable pos1 to 2 (left) and a variable pos2 to 3 (right). Otherwise, if the split was horizontal, block 1948 sets pos1 to 0 (top) and pos2 to 1 (bottom).

Block 1950 invokes the splitAndJoinGroup subroutine recursively, passing list1, box1, and pos1 as arguments, to split and join design objects in the left half (for a vertical split direction) or top half (for a horizontal split direction) of the bounding box. Block 1950 sets a variable optObjA to the result returned by the splitAndJoinGroup invocation. The result returned by splitAndJoinGroup is either NULL or a single design object that can be highlighted. If the result is a design object, block 1954 draws a halo around the design object.

Block 1956 invokes the splitAndJoinGroup subroutine recursively a second time, passing list2, box2, and pos2 as arguments, to split and join design objects in the right half (vertical split) or left half (horizontal split) of the bounding box. Block 1956 sets a variable optObjB to the result returned by the second splitAndJoinGroup invocation. If the result is a design object, block 1960 draws a halo around the design object.

Block 1962 determines if the split list generated at block 1940 is empty. If the split list is empty, and if block 1970 determines that optObjA and optObjB are not NULL, block 1972 joins optObjA and optObjB with an interconnect halo segment, and execution ends. If the splitList is not empty, block 1964 sorts the objects in splitList so that they are ordered based upon their physical positions in the vertical or horizontal direction. Block 1964 iterates over the sorted objects list and joins the objects in the list with interconnect halo segments. Block 1966 calls the GE/GL API to draw a halo around the segments and around the objects in the sorted split list.

Block 1974 determines whether optObjA is not null. If block 1974 determines that optObjA is not null, block 1976 joins optObjA with the nearest neighbor object of optObjA in the split list. If block 1978 determines that optObjB is not null, block 1980 joins optObjB with the nearest neighbor object of optObjB in the split list. Block 1982 returns the optimum object from the object list. Block 1982 uses the same process as bloc 1922 to determine the optimum object, and execution ends.

Figure 20:
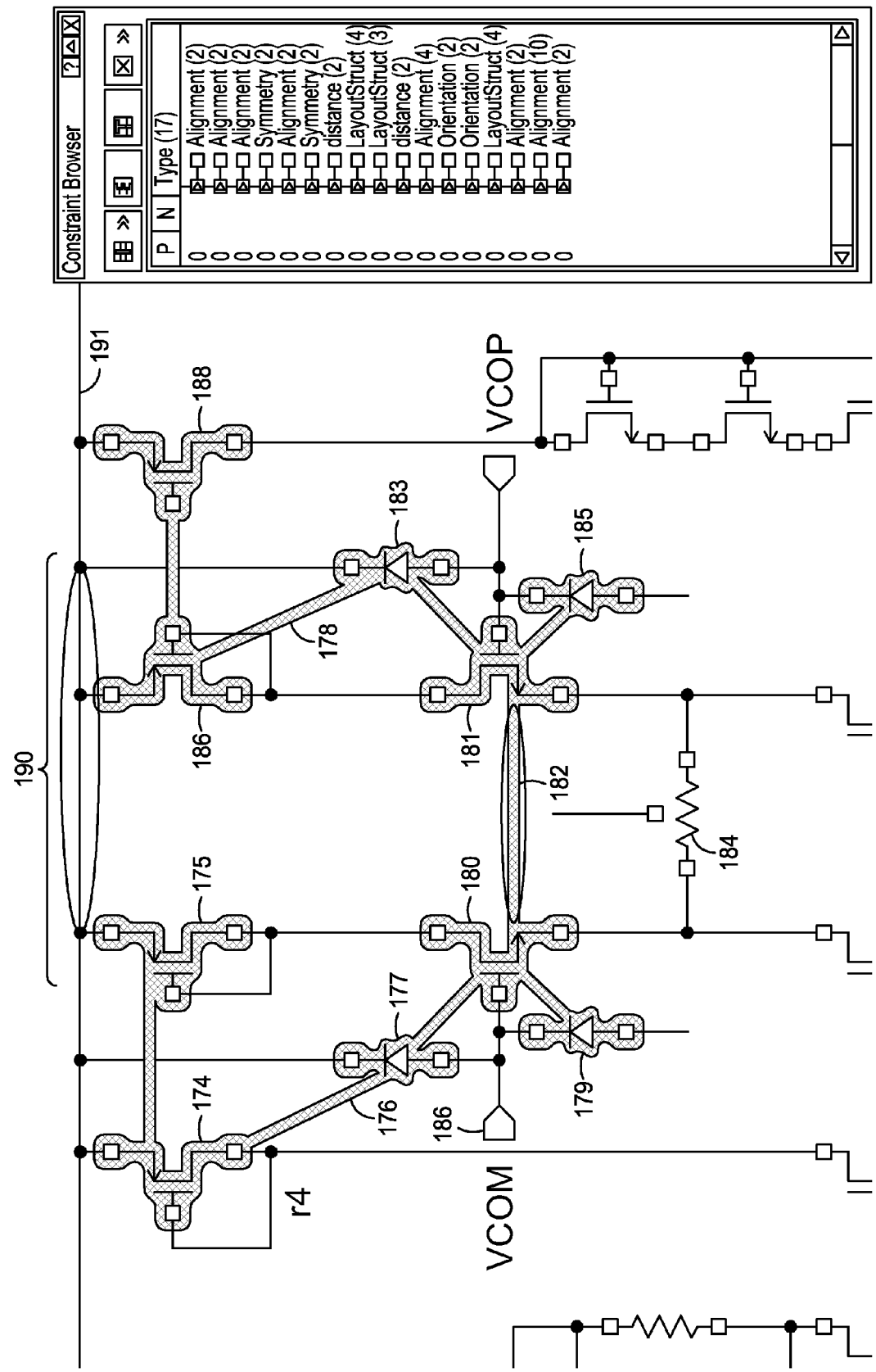
FIG. 20 is an illustrative drawing of interconnected transparent halos for visualizing constraints in accordance with some embodiments of the invention.

FIG. 20 is an illustrative drawing of interconnected transparent halos for visualizing constraints in accordance with some embodiments of the invention. FIG. 20 is a color drawing of features illustrated in FIG. 1D. FIG. 20 also shows a Constraint Browser user interface feature. An Alignment (10) constraint displayed in the Constraint Browser is highlighted with a black background and white letters to indicate that the Alignment (10) constraint is highlighted in the circuit design canvas to the left of the Constraint Browser. The number (10) indicates that 10 devices are members of the constraint. Although Alignment constraint typically contains a maximum of two members that need to stay aligned, for the purpose of explaining the invention, some of the illustrated Alignment constraints contain more than two members. The Alignment constraint appears as a green halo around the devices (transistors and diodes) that are members of the constraint, and green interconnect halo segments appear between the devices that are members of the constraint.

Figure 21A:
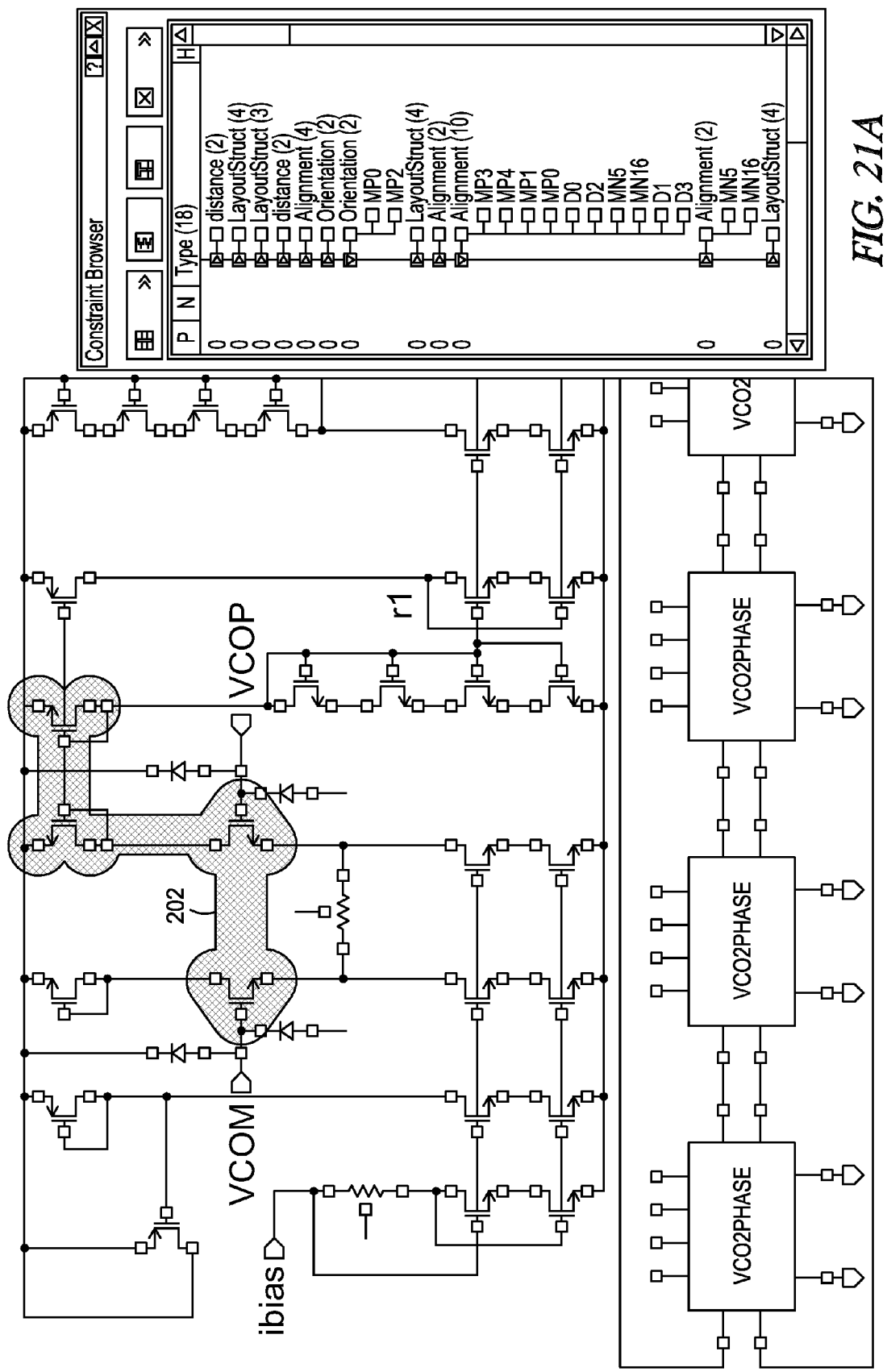
FIG. 21A is an illustrative drawing of thick halos that depict strong matching between parameters of member transistors in accordance with some embodiments of the invention.

FIG. 21A is an illustrative drawing of thick halos that depict strong matching between parameters of member transistors in accordance with some embodiments of the invention. FIG. 21A is a color drawing of features illustrated in FIG. 2A. FIG. 21A also shows a Constraint Browser user interface feature. A LayoutStruct (4) constraint name displayed in the Constraint Browser is highlighted with a black background and white letters to indicate that the LayoutStruct (4) constraint is highlighted in the circuit design canvas to the left of the Constraint Browser. The number (4) indicates that 4 devices are members of the constraint. The LayoutStruct constraint appears as a thick blue-green halo around the devices (transistors) that are members of the constraint, and blue-green interconnect halo segments appear between the devices that are members of the constraint.

Figure 21B:
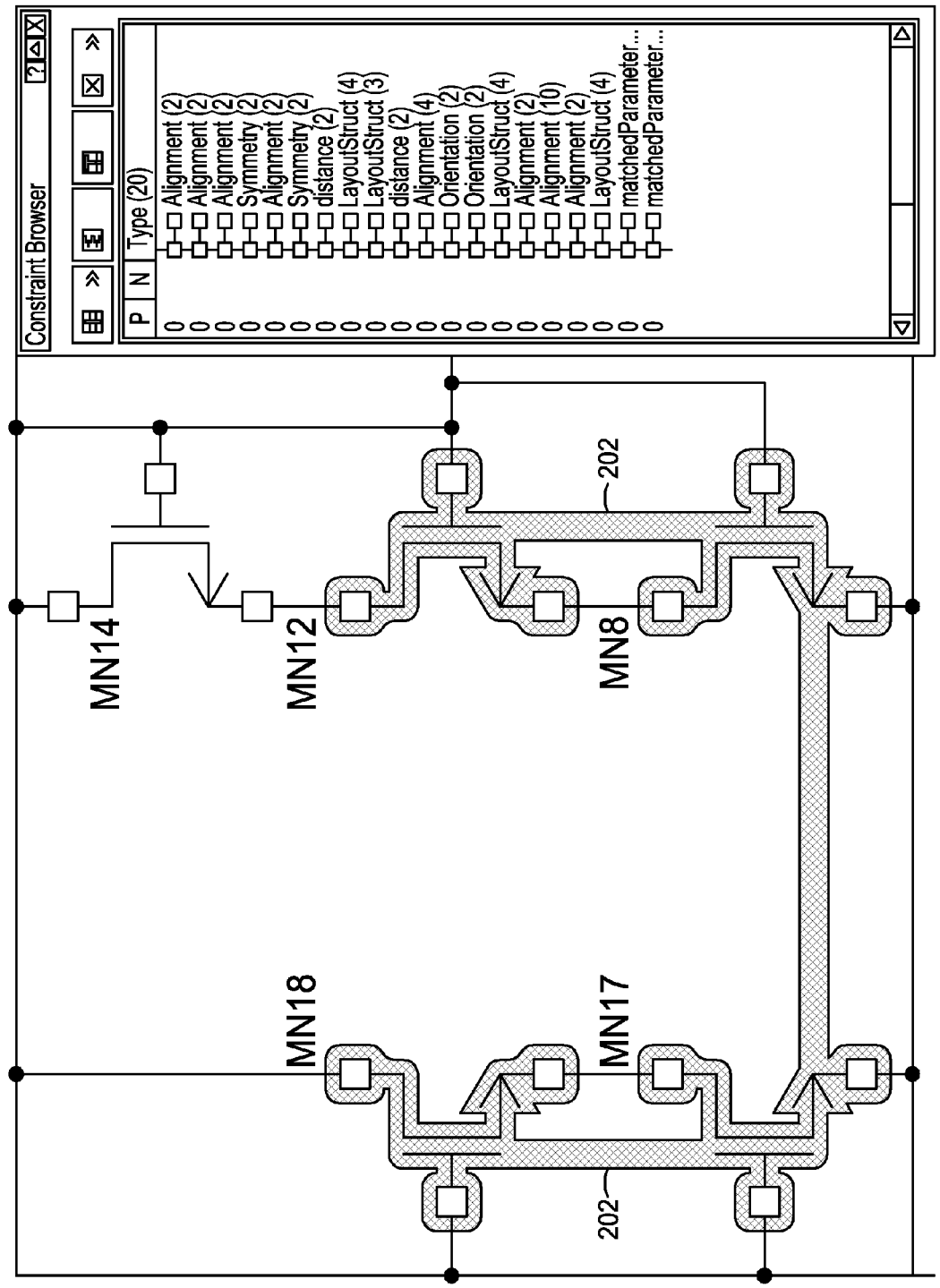
FIG. 21B is an illustrative drawing of thin, dense halos that depict weak matching between parameters of member transistors in accordance with some embodiments of the invention.

FIG. 21B is an illustrative drawing of thin, dense halos that depict weak matching between parameters of member transistors in accordance with some embodiments of the invention. FIG. 21B is a color drawing of features illustrated in FIG. 2B. FIG. 21B also shows a Constraint Browser user interface feature. A matchedParameter constraint name displayed in the Constraint Browser is highlighted with a black background and white letters to indicate that the matchedParameter constraint is highlighted in the circuit design canvas to the left of the Constraint Browser. The matchedParameter constraint appears as a thin blue-green halo around the devices (transistors) that are members of the constraint, and blue-green interconnect halo segments appear between the devices that are members of the constraint.

Figure 22:
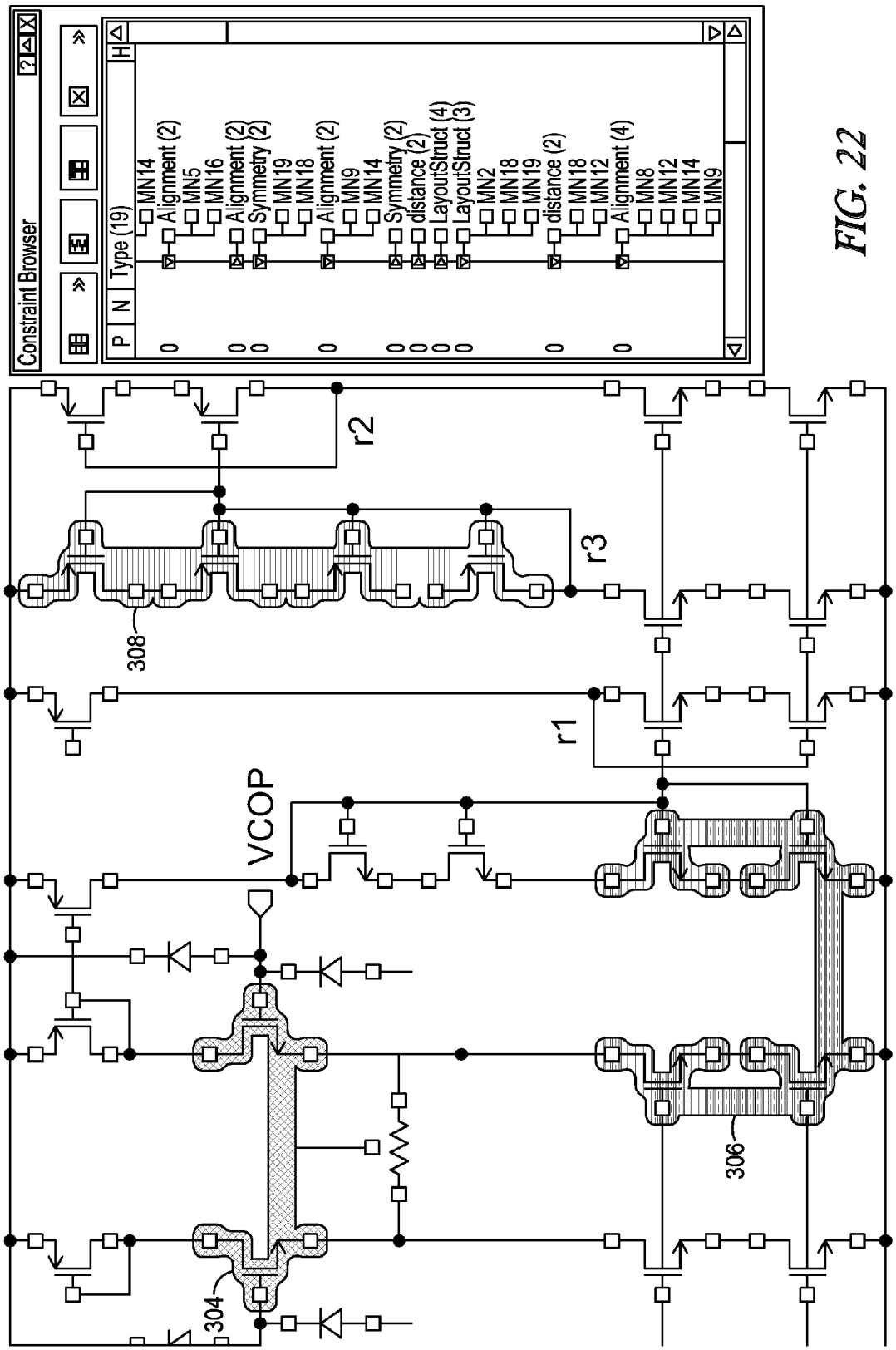
FIG. 22 is an illustrative drawing of different color transparent halos that depict constraints of different types in accordance with some embodiments of the invention.

FIG. 22 is an illustrative drawing of different color transparent halos that depict constraints of different types in accordance with some embodiments of the invention. FIG. 22 is a color drawing of features illustrated in FIG. 3. FIG. 22 also shows a Constraint Browser user interface feature. An Alignment(2) constraint name and a LayoutStruct (4) constraint name displayed in the Constraint Browser are highlighted with black backgrounds and white letters to indicate that the Alignment (2) and LayoutStruct (4) constraints is highlighted in the circuit design canvas to the left of the Constraint Browser. The Alignment (2) constraint has two members, as indicated by the number (2) in the constraint's name. The Alignment (2) constraint appears as a blue-green halo 304 around the devices (transistors) that are members of the constraint, and a blue-green interconnect halo segments appears between the devices that are members of the constraint. The Alignment (2) constraint has two members, as indicated by the number (2) in the constraint's name. The Layout Structure (4) constraint appears as a brown halo 308 around the devices (transistors) that are members of the constraint, and a brown interconnect halo segments appears between the devices that are members of the Layout Structure (4) constraint. The lilac halo 306 is associated with another constraint which is hilighted in the Constraint Browser but not visible in FIG. 22.

Figure 23:
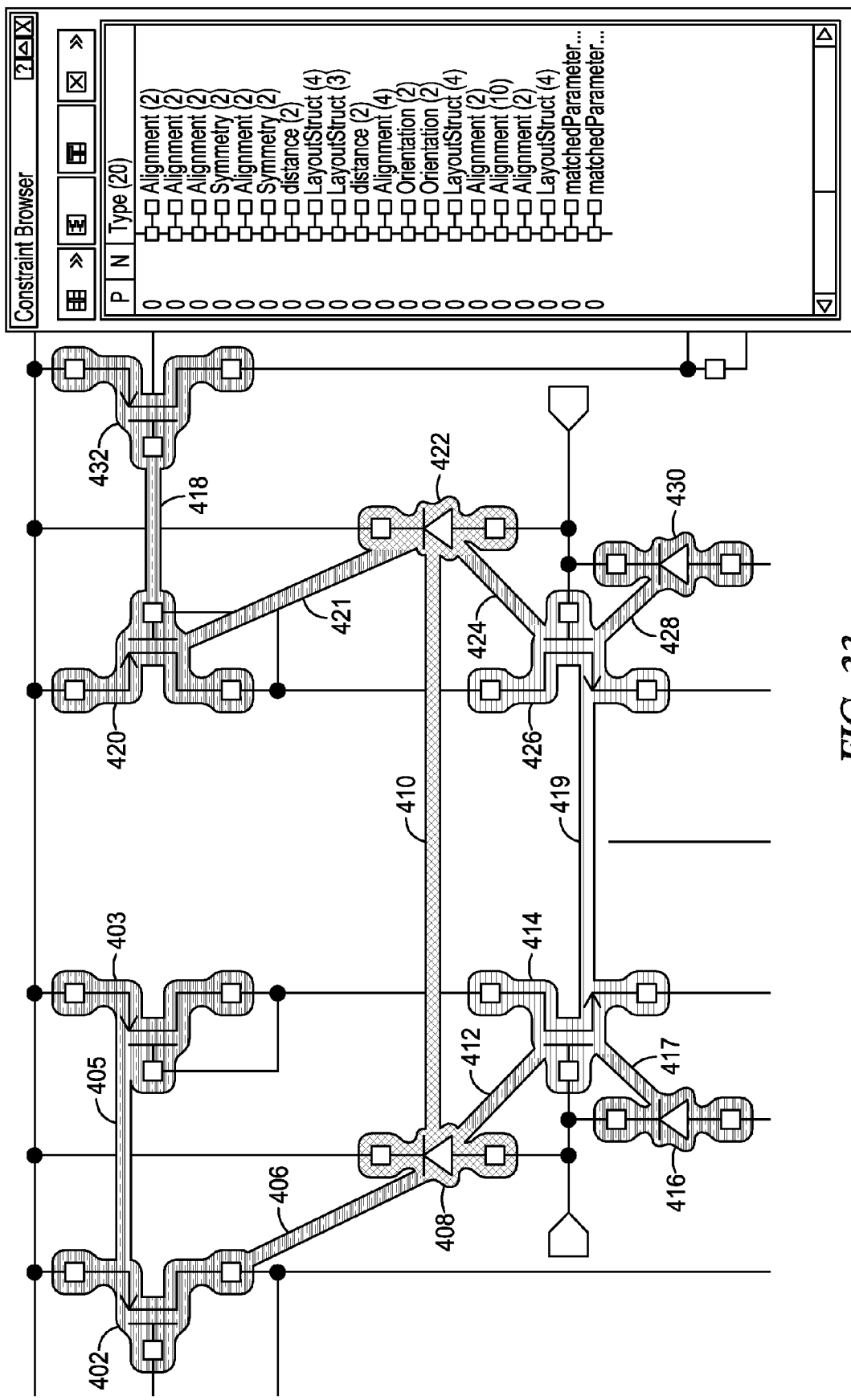
FIG. 23 is an illustrative drawing of color blending of different color transparent halos that depict constraints of different types in accordance with some embodiments of the invention.

FIG. 23 is an illustrative drawing of color blending of different color transparent halos that depict constraints of different types in accordance with some embodiments of the invention. FIG. 23 is a color drawing of features illustrated in FIG. 4. Diode devices 408, 422 are members of two constraints, and are highlighted with halos in a blended color, which is a blend of lilac (for the constraint associated with interconnect halo segment 406) and green (for the constraint associated with interconnect halo segment 410). Transistor devices 414, 426 are also members of two constraints, and are highlighted with halos in a blended color which is a blend of lilac (for the constraint associated with interconnect halo segment 412) and cyan (for the constraint associated with halo interconnect segment 419).

Figure 24:
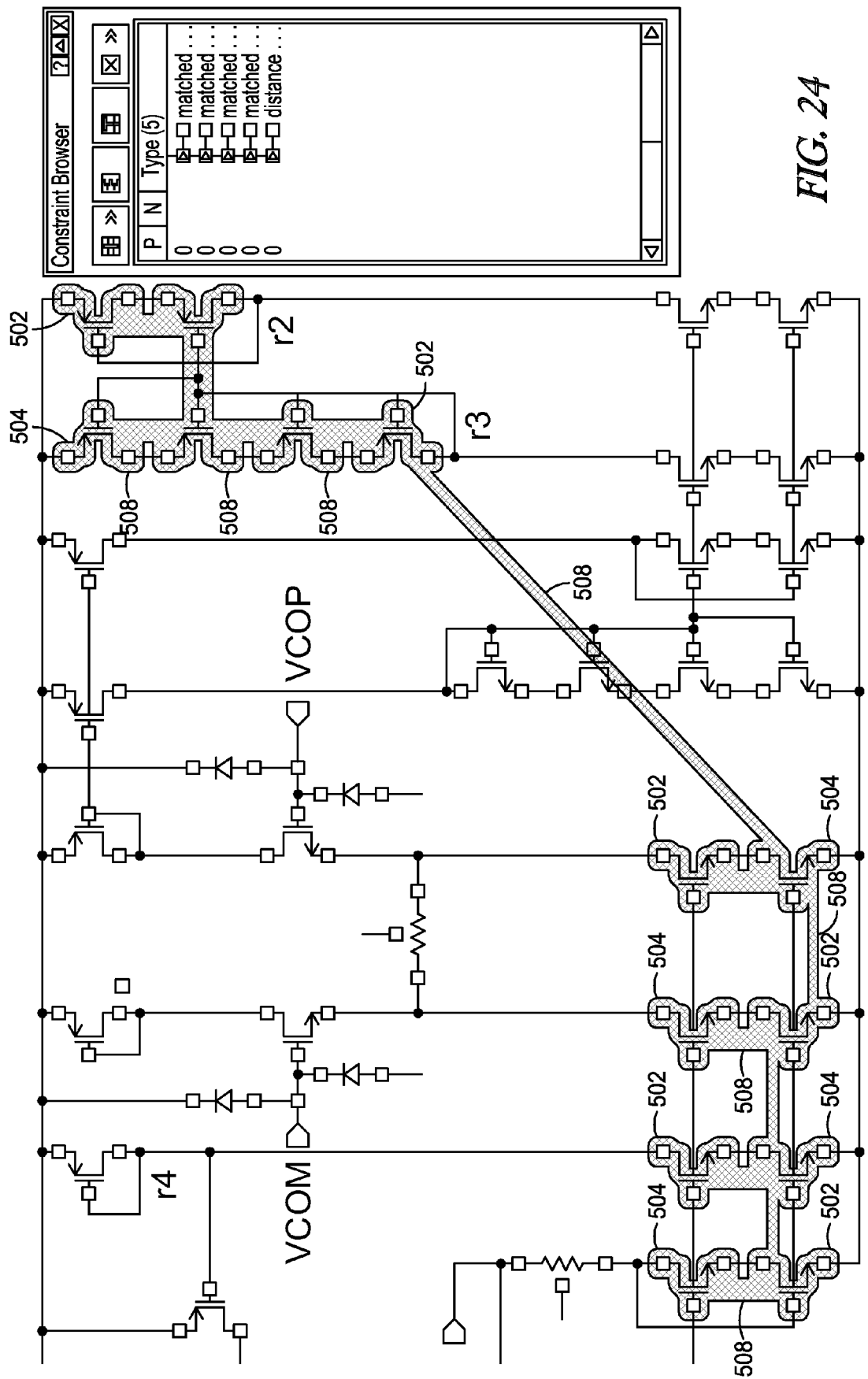
FIG. 24 is an illustrative drawing of halos displayed around design objects, with connecting segments joining each object to its nearest neighbor in accordance with some embodiments of the invention.

FIG. 24 is an illustrative drawing of halos displayed around design objects, with connecting segments joining each object to its nearest neighbor in accordance with some embodiments of the invention. FIG. 24 is a color drawing of features illustrated in FIG. 5. The halos and interconnect segments are all the same color, indicating that the devices highlighted by the halos are all members of the same constraint, which is a matchedParameters constraint, as shown in the Constraint Browser.

Figure 25A:
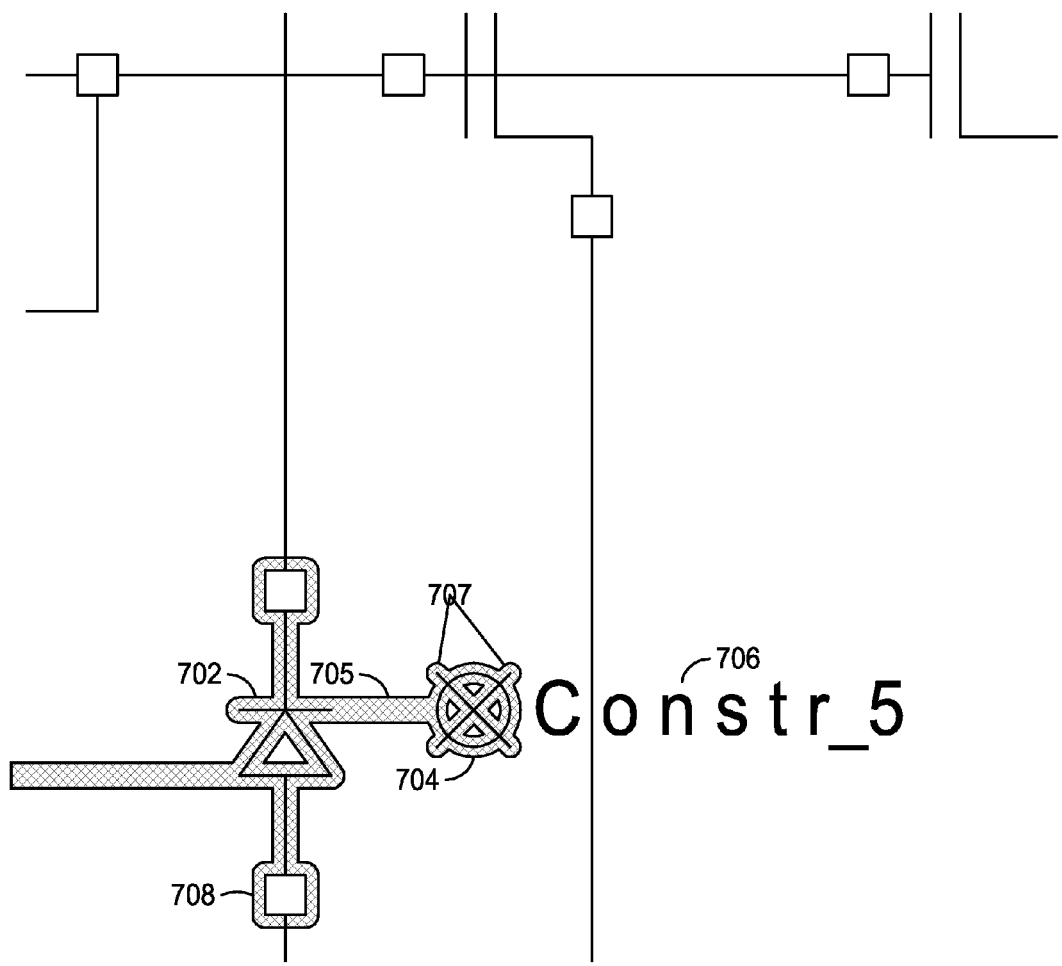
FIG. 25A is an illustrative drawing of a design object and an up-connector highlighted with a halo in accordance with some embodiments of the invention.

FIG. 25A is an illustrative drawing of a design object and an up-connector highlighted with a halo in accordance with some embodiments of the invention. FIG. 25A is a color drawing of features illustrated in FIG. 7A. The up-connector 704 and label 706 are shown in a lilac color.

Figure 25B:
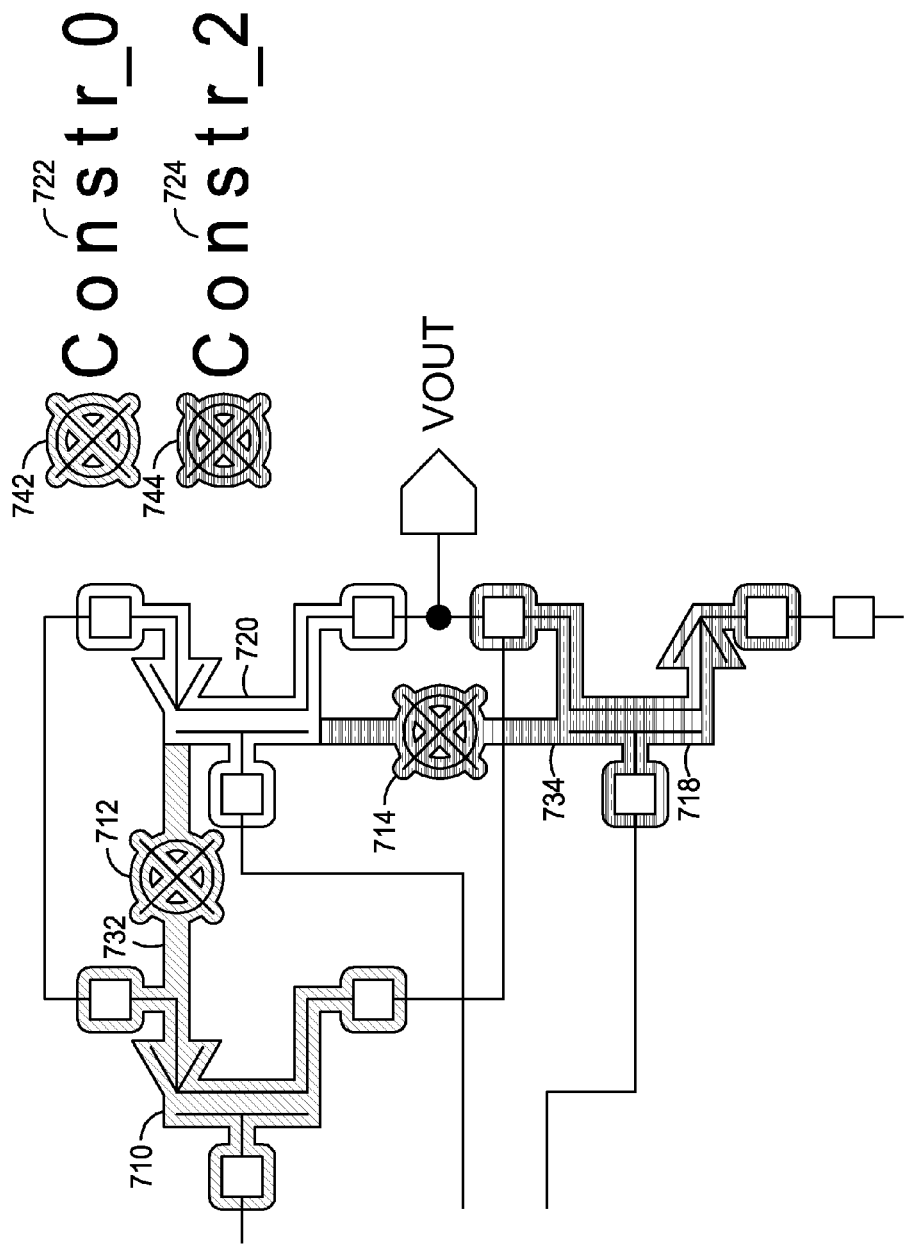
FIG. 25B is an illustrative drawing of circular legend symbols and associated constraint names in accordance with some embodiments of the invention.

FIG. 25B is an illustrative drawing of circular legend symbols and associated constraint name annotations in accordance with some embodiments of the invention. FIG. 25B is a color drawing of features illustrated in FIG. 7B. The transistor 710 is a member of the constraint named Constr_0, which and is shown in cyan. The transistor 718 is a member of the constraint named Constr_2, and is shown in brown. The transistor 720 is a member of both constraints, and is shown in a green color produced by blending cyan with brown. The circular legend symbol 714 is associated with Constr_2 and is shown in brown. The circular legend symbol 712 is associated with Constr_0 and is shown in cyan.

Figure 25C:
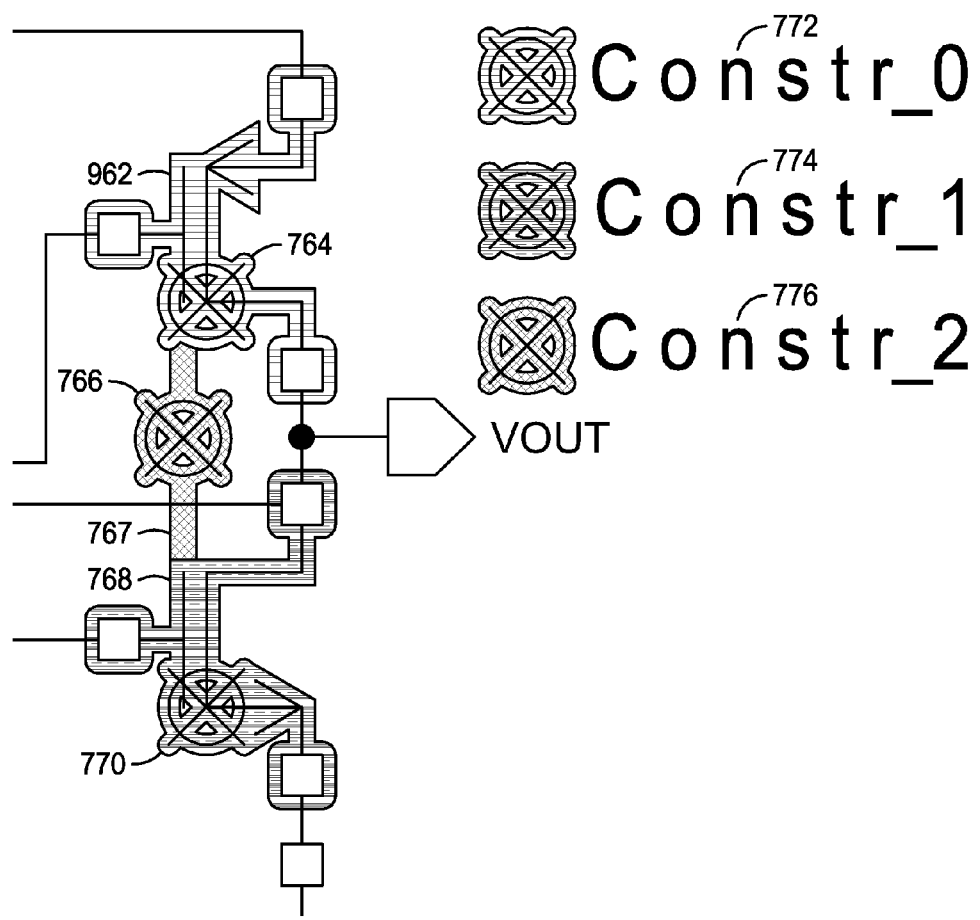
FIG. 25C is an illustrative drawing of three circular legend symbols placed on interconnection points in accordance with some embodiments of the invention.

FIG. 25C is an illustrative drawing of three circular legend symbols 764, 766, 768 placed on interconnection points in accordance with some embodiments of the invention. FIG. 25C is a color drawing of features illustrated in FIG. 7C. Two transistors 762, 768 are members of a constraint named Constr_2, which is shown in lilac. The circular legend symbol 766 has been placed on the interconnect segment 767 because the interconnect segment 767 exists between the two transistors 762, 768, and the two transistors 762, 768 are members of a constraint named Constr_2. Furthermore, because the top transistor 762 is a member of another constraint Constr_0, for which the transistor 762 is the only member being visualized, the circular legend symbol 764 has been placed on one of the interconnect points of the transistor 762. Similarly, a circular legend symbol 770 has been placed on one of the interconnect points of the lower transistor 768 because the transistor 768 is the only visualized member of Constr_1.

Figure 25D:
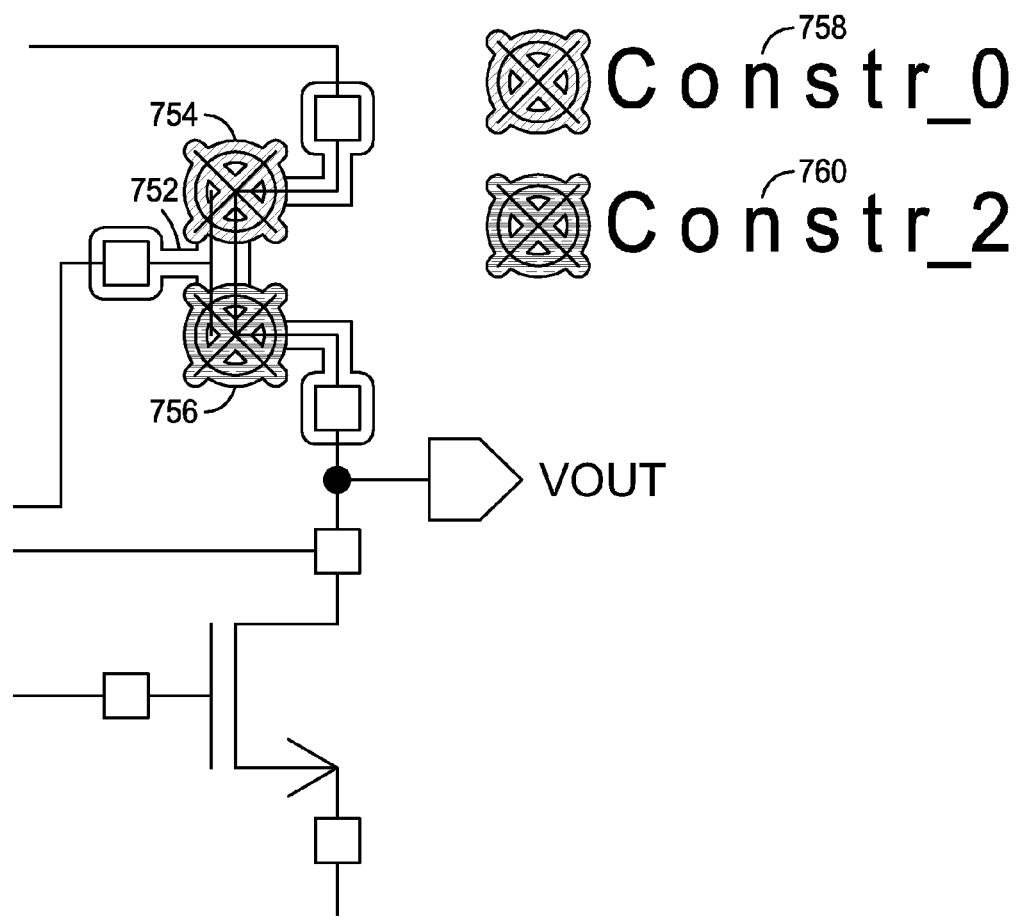
FIG. 25D is an illustrative drawing of two design constraints being visualized using transparent halos in accordance with some embodiments of the invention.

FIG. 25D is an illustrative drawing of two design constraints being visualized using transparent halos in accordance with some embodiments of the invention. FIG. 25C is a color drawing of features illustrated in FIG. 7D. The transistor 752 is a member of two different constraints, Constr_0 and Constr_2, and is the only member of the constraint displayed, so the circular legend symbols 754, 756 for the two separate constraints ConstrO and Constr_2 have been placed on two different interconnect points of the transistor 752.

Figure 26:
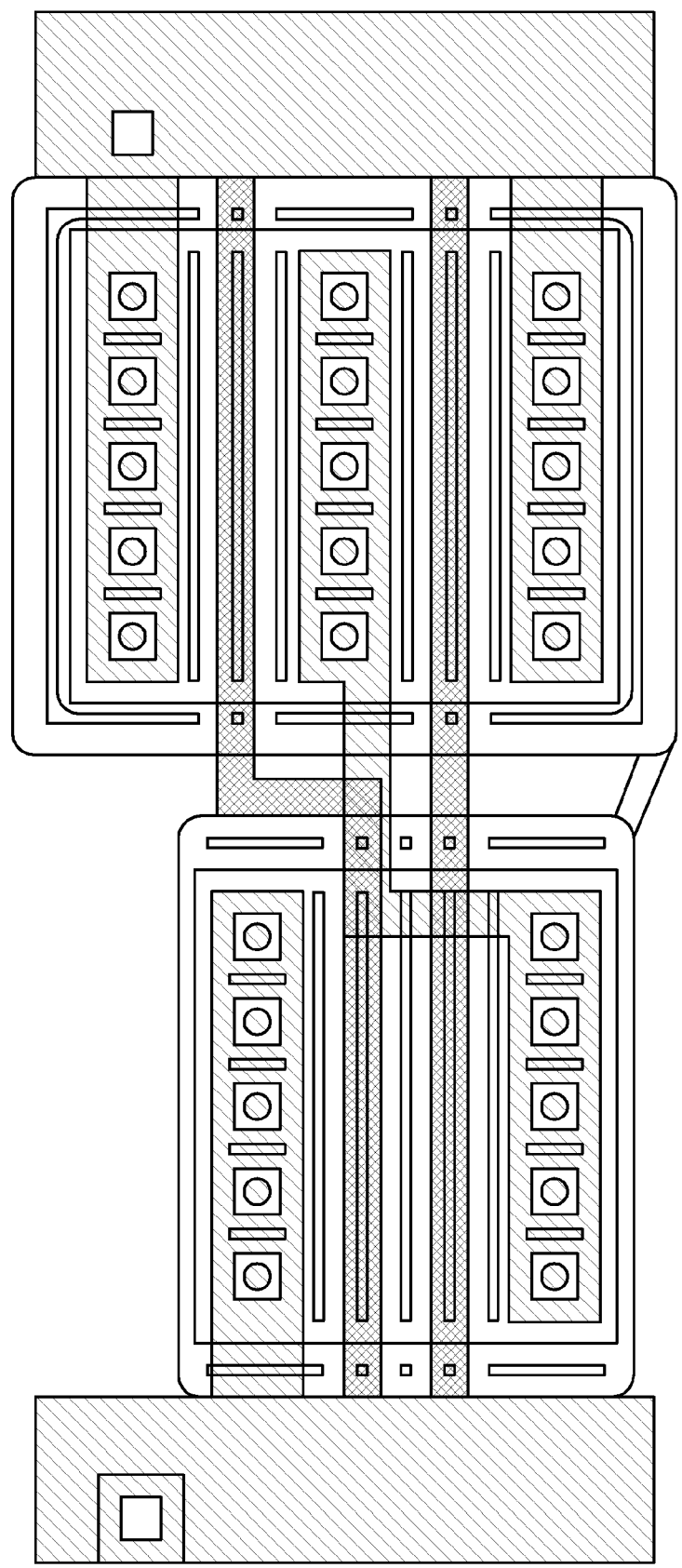
FIG. 26 is an illustrative drawing of interconnected transparent halos that appear as on overlay in a layout diagram in accordance with some embodiments of the invention.

FIG. 26 is an illustrative drawing of interconnected transparent halos that appear as an overlay in a layout diagram in accordance with some embodiments of the invention. FIG. 26 is a color drawing of features illustrated in FIG. 8B.

Figure 27A:
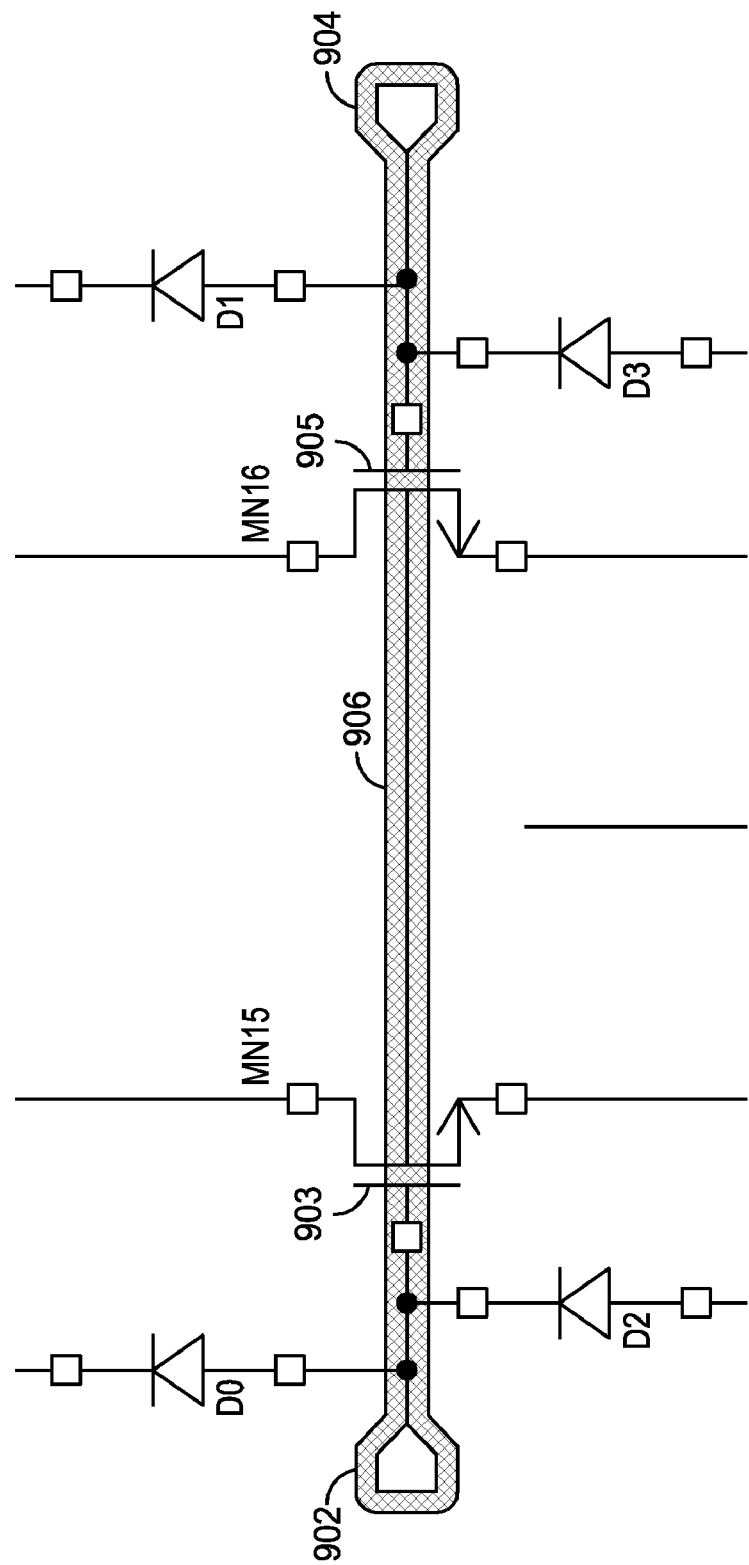
FIG. 27A is an illustrative drawing of a halo between two pins associated with a distance constraint in a schematic diagram in accordance with some embodiments of the invention.

FIG. 27A is an illustrative drawing of a halo between two pins associated with a distance constraint in a schematic diagram in accordance with some embodiments of the invention. FIG. 27A is a color drawing of features illustrated in FIG. 9A. The distance constraint is shown as a green halo 906 around the pins 902 and 904, with a green interconnect halo segment 906.

Figure 27B:
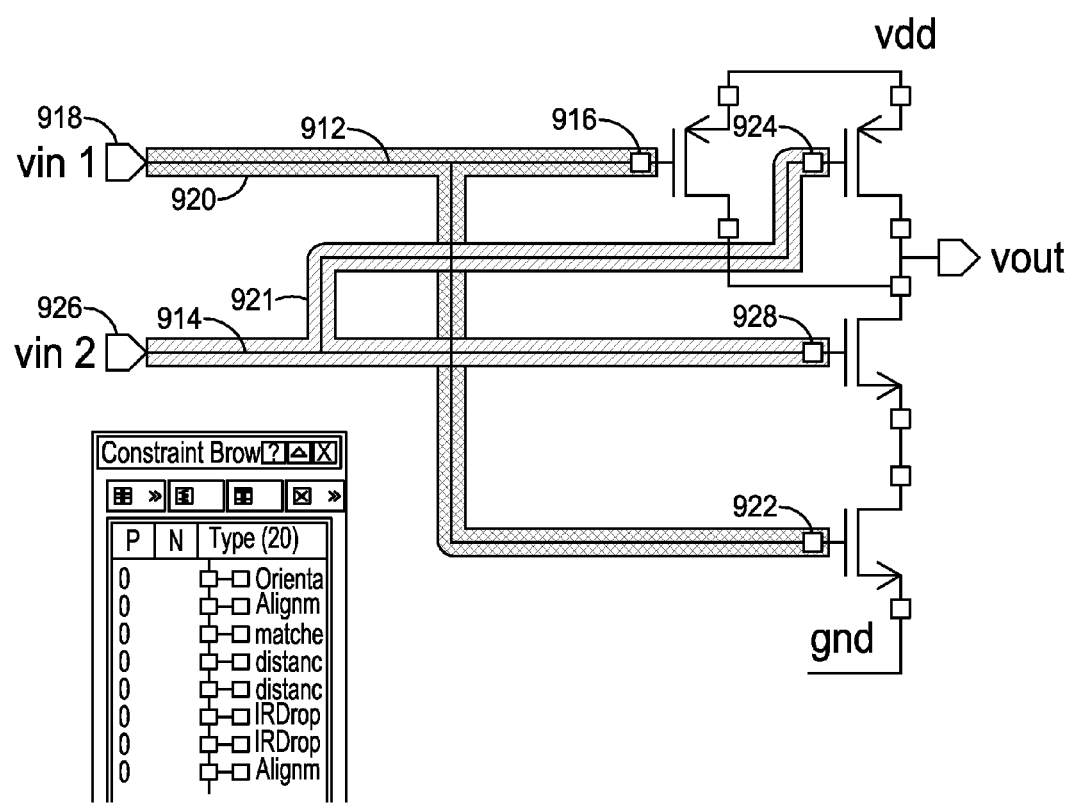
FIG. 27B is an illustrative drawing of a halo around two nets associated with a constraint in a schematic diagram in accordance with some embodiments of the invention.

FIG. 27B is an illustrative drawing of a halo around two nets associated with a constraint in a schematic diagram in accordance with some embodiments of the invention. FIG. 27B is a color drawing of features illustrated in FIG. 9B. A blue halo 920 is displayed on a net 912. The net 912 joins the pins 918, 916, 922. A brown halo 921 is displayed on a net 914. The net 914 joins the pins 924, 926, 928.

Figure 27C:
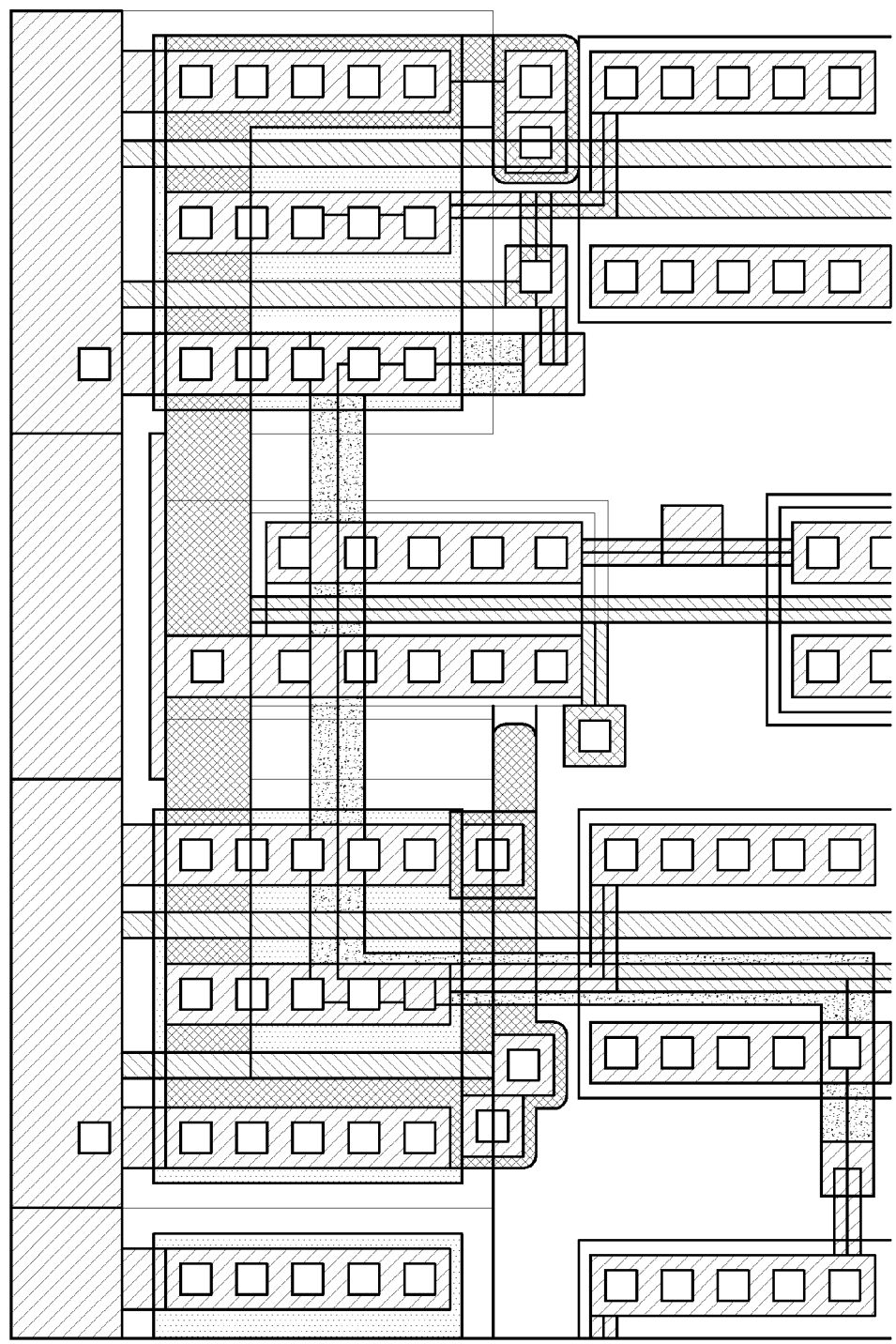
FIG. 27C is an illustrative drawing of a halo around a net associated with a constraint in a layout diagram in accordance with some embodiments of the invention.

FIG. 27C is an illustrative drawing of a halo around a net associated with a constraint in a layout diagram in accordance with some embodiments of the invention. FIG. 27C is a color drawing of features illustrated in FIG. 9C. A blue halo is displayed as an overlay above and around the design objects on the layout diagram.

Figure 27D:
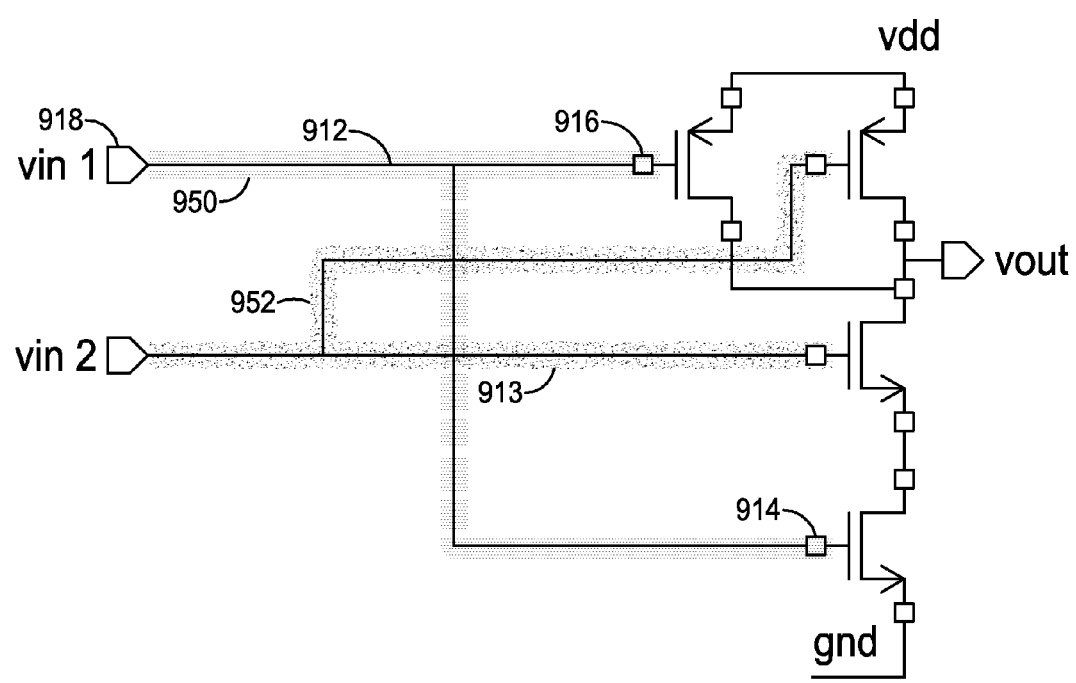
FIG. 27D is an illustrative drawing of a halo formed by randomized highlighting in a schematic diagram in accordance with some embodiments of the invention.

FIG. 27D is an illustrative drawing of a halo formed by randomized highlighting in a schematic diagram in accordance with some embodiments of the invention. FIG. 27D is a color drawing of features illustrated in FIG. 9D. The randomized highlighting halo 950 is shown in cyan, and the randomized highlighting halo 952 is shown in brown.

FIG. 27E is an illustrative drawing of a halo formed by a dashed line in a schematic diagram in accordance with some embodiments of the invention. FIG. 27E is a color drawing of features illustrated in FIG. 9E. The dashed line halos 960, 962 are shown in red color.

Figure 28:
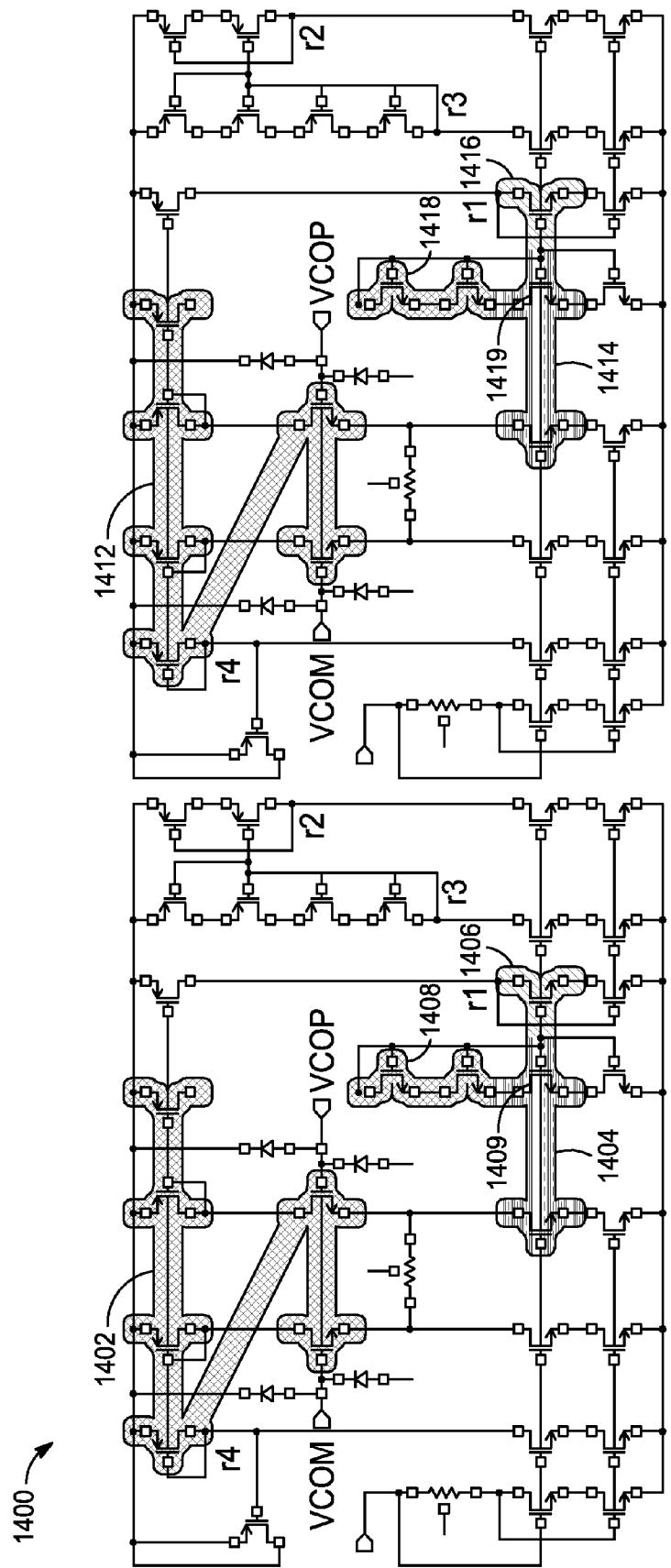
FIG. 28 is an illustrative drawing of cell constraint visualization in a schematic diagram view in accordance with some embodiments of the invention.

FIG. 28 is an illustrative drawing of cell constraint visualization in a schematic diagram view in accordance with some embodiments of the invention. FIG. 28 is a color drawing of features illustrated in FIG. 14. The halos 1402, 1412 are shown in green. The halos 1404, 1414 are shown in brown. The halos 1408, 1418 are shown in cyan. The halos 1406, 1416 are shown in lilac. The transistors 1409, 1419 are members of the constraints associated with the brown, cyan, and lilac halos, so the halo near the transistors 1409, 1419 is shown in a blended color produced by blending brown, cyan, and lilac.

In summary, the constraint visualization features help designers to more quickly understand the constraint relationships in a circuit, and to more efficiently debug problems related to the constraints. The visualization system concurrently improves both the front end and back end designer's understanding of the design, and improves design for manufacture-ability leading to higher yielding designs.

The above description is exemplary only and it will be apparent to those of ordinary skill in the art that numerous modifications and variations are possible. For example, various exemplary methods and systems described herein may be used alone or in combination with various other computer and computer peripheral systems and methods. Additionally, particular examples have been discussed and how these examples are thought to address certain disadvantages in related art. This discussion is not meant, however, to restrict the various examples to methods and/or systems that actually address or solve the disadvantages.

What is claimed is:

1. A computer-enabled method to produce a display of a design constraint, the method comprising:

producing a display of a first highlight feature in the proximity of a first design object, wherein the first highlight feature represents an association of a constraint with the first design object, at least a portion of the first design object remains visible while the first highlight feature is displayed, and the visual appearance of the first highlight feature indicates an attribute of the constraint;

producing a display of a second highlight feature in the proximity of a second design object, wherein the second highlight feature represents the association of the constraint with the second design object, and at least a portion of the second design object remains visible while the second highlight feature is displayed; and using a computer for generating an interconnect halo segment that visually connects the first highlight feature to the second highlight feature, wherein the visual appearance of the second highlight feature and the visual appearance of the segment indicate the type of the constraint.

2. The method of claim 1, the first highlight feature having a color, wherein the color indicates the type of the constraint, and wherein the first highlight feature is transparent.

3. The method of claim 1, the first highlight feature having a fill style, wherein the fill style indicates the type of the constraint, and wherein the fill style comprises cross-hatching, randomized stippling, a dashed line style, or a combination thereof.

4. The method of claim 1, wherein the first highlight feature is displayed as a transparent overlay on top of the first design object.

5. The method of claim 1, wherein the first highlight feature is displayed as a transparent underlay under the first design object.

6. The method of claim 1, wherein the first highlight feature is displayed adjacent to the first design object.

7. The method of claim 1, wherein the first highlight feature is superimposed on the design object, and appears as a transparent underlay under the first design object.

8. The method of claim 1, wherein the first highlight feature surrounds the first design object.

9. The method of claim 1, wherein the first design object comprises a representation of a transistor, wire, resistor, diode, pin, terminal, net, or combination thereof.

10. The method of claim 1, wherein the first design object comprises an active electrical component, a passive electrical component, a geometric shape, a representation of the physical form of an object in a circuit design, or a combination thereof.

11. The method of claim 1, wherein the first design object comprises a cell instance that contains a constrained design object, and the constrained design object is associated with the constraint.

12. The method of claim 1, wherein the first highlight feature is a merged highlight feature that represents a plurality of constraints, and the method further comprises:

setting the color of the merged highlight feature by blending a plurality of colors that indicate the types of the constraints.

13. The method of claim 12, wherein blending comprises alpha blending the colors.

14. The method of claim 1, wherein the segment comprises a horizontal line, a vertical line, a diagonal line, or a combination thereof.

15. The method of claim 1, wherein the first highlight feature is generated in response to selection of the constraint from a list of constraints presented in a constraint list user interface component.

16. The method of claim 1, wherein the thickness of the first highlight feature is proportional to a strength attribute of the constraint.

17. The method of claim 1, wherein the fill density of the first highlight feature is proportional to a strength attribute of the constraint.

18. The method of claim 1, wherein generating an interconnect halo segment comprises:
determining a first set of interconnect points for a first design object;
determining a second set of interconnect points for a second design object;
generating line segments between each point in the first set and each point in the second set, wherein the line segments measure distances between corresponding points;
if there is a first line segment between two points, wherein the first line segment has the shortest distance and the first line segment is horizontal or vertical, choosing the first line segment; otherwise,
if there is a second line segment between two points, wherein the second line segment has the shortest distance and the second line segment does not pass over a pin, choosing the second line segment; otherwise,
choosing a third line segment between two points, wherein the third line segment has the shortest distance; and
drawing the chosen line segment.

19. A computer-enabled method to produce a display of a design constraint, the method comprising:
producing a display of a first highlight feature in the proximity of a first design object, wherein the first highlight feature represents an association of a constraint with the first design object, at least a portion of the first design object remains visible while the first highlight feature is displayed, and the visual appearance of the first highlight feature indicates an attribute of the constraint;
producing a display of an up-connector, wherein the constraint is associated with a second design object that is on a higher level of the design hierarchy than the first design object, and the up-connector represents an association with the higher level of the design hierarchy; and
using a computer for generating an interconnect halo segment that visually connects the first highlight feature to the up-connector, wherein the visual appearance of the up-connector and the visual appearance of the segment indicate the type of the constraint.

20. The method of claim 19, further comprising:
if the up-connector is selected by a user, displaying the higher design hierarchy level.

21. The method of claim 19, the first highlight feature having a color, wherein the color indicates the type of the constraint, and wherein the first highlight feature is transparent.

22. The method of claim 19, the first highlight feature having a fill style, wherein the fill style indicates the type of the constraint, and wherein the fill style comprises cross-hatching, randomized stippling, a dashed line style, or a combination thereof.

23. The method of claim 19, wherein the first highlight feature is displayed as a transparent overlay on top of the first design object or under the first design object.

24. The method of claim 19, wherein the first highlight feature is a merged highlight feature that represents a plurality of constraints, and the method further comprises:
setting the color of the merged highlight feature by a plurality of colors that indicate the types of the constraints.

25. The method of claim 19, wherein blending comprises alpha blending the colors.

26. A computer-enabled method of generating highlight features and interconnect halo segments to represent a relationship between design objects, comprising:
acquiring an input list of design objects;
computing a bounding box of objects in the input list;
generating a first list of objects fully inside a first portion of the box, wherein the first portion is separated from a second portion of the box by a bisector line that bisects the bounding box;
generating a second list of objects fully inside the second portion of the box;
generating a split list of objects, wherein the split list includes objects intersected by the bisector line;
using a computer for generating highlighted interconnect halo segments between objects in the split list;
setting a first optimum object to an object fully inside the first portion of the box;
setting a second optimum object to an object fully inside the second portion of the box;
if the split list is empty, generating an interconnect halo segment to join the first optimum object to the second optimum object;
if the split list is not empty, generating an interconnect halo segment to join the first optimum object with a nearest split object in the split list, wherein the nearest split object is the member of the split list closest to the first optimum object;
recursively invoking this method of generating highlight features and interconnect halo segments on the first list; and
recursively invoking this method of generating highlight features and interconnect halo segments on the second list.

27. The method of claim 26, further comprising:
if the length of the box is greater than the width of the box, bisecting the box vertically; otherwise, bisecting the box horizontally, to produce a bisector line.

28. The method of claim 26, wherein generating a split list comprises:
sorting the split list so that the objects in the split list are ordered based upon their positions in the split direction.

29. The method of claim 26, wherein generating highlighted interconnect halo segments includes:
for each split object in the split list, generating an interconnect halo segment between the split object and a nearest neighbor object, wherein the nearest neighbor object is the split list member closest to the split object;
highlighting each generated interconnect halo segment; and
highlighting each object in the split list.

30. A system for producing a display of a design constraint on a computer screen in an Electronic Design automation tool, comprising:
a first highlighting means for producing a display of a first highlight feature on the screen in the proximity of a first design object, wherein the first highlight feature represents the association of a constraint with the first design object, at least a portion of the first design object remains visible while the first highlight feature is displayed, and the visual appearance of the first highlight feature indicates an attribute of the constraints;
a second highlighting means for producing a display of a second highlight feature on the screen in the proximity of a second design object, wherein the second highlight feature represents the association of the constraint with the second design object, at least a portion of the second design object remains visible while the second highlight feature is displayed; and an interconnect generating means for interconnecting an interconnect halo segment that visually connects the first highlight feature to the second highlight feature, wherein the visual appearance of the second highlight feature and the visual appearance of the segment indicate the type of the constraint.

31. A machine-readable storage medium carrying one or more sequences of instructions which, when executed by one or more processors, causes performance of a method to produce a display of a design constraint, the method comprising:

producing a display of a first highlight feature in the proximity of a first design object, wherein the first highlight feature represents an association of a constraint with the first design object, at least a portion of the first design object remains visible while the first highlight feature is displayed, and the visual appearance of the first highlight feature indicates an attribute of the constraint;

producing a display of a second highlight feature in the proximity of a second design object, wherein the second highlight feature represents the association of the constraint with the second design object, and at least a portion of the second design object remains visible while the second highlight feature is displayed; and generating an interconnect halo segment that visually connects the first highlight feature to the second highlight feature, wherein the visual appearance of the second highlight feature and the visual appearance of the segment indicate the type of the constraint.

32. A machine-readable storage medium carrying one or more sequences of instructions which, when executed by one or more processors, causes performance of a method to produce a display of a design constraint, the method comprising:

producing a display of a first highlight feature in the proximity of a first design object, wherein the first highlight feature represents an association of a constraint with the first design object, at least a portion of the first design object remains visible while the first highlight feature is displayed, and the visual appearance of the first highlight feature indicates an attribute of the constraint;

producing a display of an up-connector, wherein the constraint is associated with a second design object that is on a higher level of the design hierarchy than the first design object, and the up-connector represents an association with the higher level of the design hierarchy; and generating an interconnect halo segment that visually connects the first highlight feature to the up-connector, wherein the visual appearance of the up-connector and the visual appearance of the segment indicate the type of the constraint.

33. A system for producing a display of a design constraint on a computer screen in an Electronic Design automation tool, comprising:

a first highlighting means for producing a display of a first highlight feature on the screen in the proximity of a first design object, wherein the first highlight feature represents the association of a constraint with the first design object, at least a portion of the first design object remains visible while the first highlight feature is displayed, and the visual appearance of the first highlight feature indicates an attribute of the constraint;

a second highlighting means for producing a display of an up-connector, wherein the constraint is associated with a second design object that is on a higher level of the design hierarchy than the first design object, and the up-connector represents an association with the higher level of the design hierarchy; and an interconnect generating means for interconnecting an interconnect halo segment that visually connects the first highlight feature to the up-connector, wherein the visual appearance of the up-connector and the visual appearance of the segment indicate the type of the constraint.

\* \* \* \* \*

UNITED STATES PATENT AND TRADEMARK OFFICE
CERTIFICATE OF CORRECTION

PATENT NO. : 7,865,857 B1  
APPLICATION NO. : 11/657659  
DATED : January 4, 2011  
INVENTOR(S) : Amit Chopra et al.

Page 1 of 1

It is certified that error appears in the above-identified patent and that said Letters Patent is hereby corrected as shown below:

On Sheet 29 of 47, Box. 1940, Figure 19B, delete "INTRESECTED" and insert -- INTERSECTED --, therefor.

In column 3, line 24, delete "ConstrO" and insert -- Constr_0 --, therefor.

In column 20, line 54, delete "Constr2" and insert -- Constr_2 --, therefor.

In column 23, lines 48-49, delete "lib.cell:view." and insert -- lib.cell1.view. --, therefor.

In column 23, lines 49-50, delete "lib.cell.view." and insert -- lib.cell1.view. --, therefor.

In column 32, line 9, delete "boxl" and insert -- box1 --, therefor.

In column 32, line 12, delete "boxl" and insert -- box1 --, therefor.

In column 32, line 17, delete "boxl" and insert -- box1 --, therefor.

In column 32, line 30, delete "boxl" and insert -- box1 --, therefor.

In column 35, line 2, delete "ConstrO" and insert -- Constr_0 --, therefor.

In column 37, line 21, in Claim 18, delete "distanceand" and insert -- distance and --, therefor.

Signed and Sealed this  
Eighth Day of March, 2011

David J. Kappos  
*Director of the United States Patent and Trademark Office*